United States Patent
Nakaoka

(10) Patent No.: US 8,590,824 B2
(45) Date of Patent: Nov. 26, 2013

(54) SEATBELT RETRACTOR

(75) Inventor: Takatoshi Nakaoka, Osaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 402 days.

(21) Appl. No.: 12/922,483

(22) PCT Filed: Mar. 27, 2009

(86) PCT No.: PCT/JP2009/057000
§ 371 (c)(1),
(2), (4) Date: Nov. 12, 2010

(87) PCT Pub. No.: WO2009/123321
PCT Pub. Date: Oct. 8, 2009

(65) Prior Publication Data
US 2011/0057065 A1     Mar. 10, 2011

(30) Foreign Application Priority Data
Mar. 31, 2008 (JP) .................................. 2008-093269

(51) Int. Cl.
*B60R 22/28* (2006.01)
*B60R 22/36* (2006.01)

(52) U.S. Cl.
USPC ........................................ 242/376; 242/379.1

(58) Field of Classification Search
USPC ............... 242/376, 379.1, 407, 587.1, 587.2; 280/805, 807; 297/470–472, 475–478
See application file for complete search history.

(56) References Cited

U.S. PATENT DOCUMENTS

| | | | | |
|---|---|---|---|---|
| 4,322,046 A | * | 3/1982 | Tanaka et al. | 242/379.1 |
| 5,722,611 A | * | 3/1998 | Schmid et al. | 242/376 |
| 5,984,223 A | * | 11/1999 | Hiramatsu | 242/379.1 |
| 6,336,606 B1 | * | 1/2002 | Smithson et al. | 242/376 |

(Continued)

FOREIGN PATENT DOCUMENTS

| | | |
|---|---|---|
| EP | 0 919 747 A2 | 6/1999 |
| GB | 2 354 208 A | 3/2001 |

(Continued)

OTHER PUBLICATIONS

International Search Report issued in International Patent Application No. PCT/JP32009/057000, dated Oct. 6, 2009.

(Continued)

*Primary Examiner* — Sang Kim
*Assistant Examiner* — Scott Haugland
(74) *Attorney, Agent, or Firm* — Oliff & Berridge, PLC

(57) ABSTRACT

A torsion bar is mounted inside a take-up drum with its one end fixed thereto for disabling its relative rotation with respect to the take-up drum. A slit is formed in parallel to rotational axis of the take-up drum and allows one end of the webbing to pass through. At one end of the webbing, there is provided a slip-off prevention member. Length consisting of the slip-off prevention member's diameter and thickness of the webbing surrounding the slip-off prevention member is longer than distance between outer-diameter-side surface of the slit at the take-up drum and outer diameter surface of the torsion bar inside the take-up drum so as to prevent escape of the slip-off prevention member therefrom. The slip-off prevention member's load to depress the take-up drum in fully-pulled-out state of webbing is received by both the torsion bar and the take-up drum.

2 Claims, 41 Drawing Sheets

(56) References Cited

U.S. PATENT DOCUMENTS

| | | | |
|---|---|---|---|
| 6,343,522 B1 | 2/2002 | Hori et al. | |
| 2001/0023904 A1* | 9/2001 | Kanamori et al. | 242/379.1 |
| 2002/0190151 A1* | 12/2002 | Bell et al. | 242/376 |
| 2003/0010858 A1 | 1/2003 | Wier | |
| 2007/0120002 A1 | 5/2007 | Hori | |

FOREIGN PATENT DOCUMENTS

| | | |
|---|---|---|
| JP | A-11-157416 | 6/1999 |
| JP | A-2004-74882 | 3/2004 |
| JP | A-2006-327556 | 12/2006 |
| JP | A-2007-145275 | 6/2007 |
| KR | A 10-1999-0077665 | 10/1999 |

OTHER PUBLICATIONS

May 16, 2012 Korean Office Action issued in Korean Patent Application No. Oct. 2010-7023941 (with translation).

Feb. 12, 2013 Office Action issued in Japanese Application No. 2008-093269 (with translation).

* cited by examiner

SEATBELT RETRACTOR

TECHNICAL FIELD

The present invention relates to a seatbelt retractor which restrains a vehicle occupant for securing his/her safety with the aid of a webbing. More particularly, it relates to a seatbelt retractor which facilitates attachment of a webbing to a take-up drum.

BACKGROUND ART

A webbing winding device disclosed in JP Laid-open Patent Publication No. 2004-74882 includes an insertion hole at its spool main body. The insertion hole divides the spool into two parts: a large-sized part that includes a rotation shaft of the spool; and a small-sized part that does not include the rotation shaft. A recessed part is provided at the periphery of the large-sized part.

A webbing goes out from one of sides of the insertion hole along the periphery of the large-sized part on the spool main body in a webbing-winding direction and reaches the inside of the recessed part where a webbing stopper shaft connects the webbing to the recessed part. The recessed part is located to form an approximately 35-degree angle in the webbing winding direction with reference to an insertion directional line of the insertion hole.

JP Laid-open Patent Publication No. 2004-74882 as conventional art also discloses that one of openings provided at the spool is made wider than the insertion hole so as to fix the webbing stopper shaft there.

In JP Laid-open Patent Publication No. 2004-74882, the webbing coupled with the webbing stopper shaft is fixed at a position where the webbing is taken up by approximately 35 degrees in the webbing-take-up direction through the insertion hole. Accordingly, even when the webbing is intended to be fully pulled out, a little part of the webbing remains as being taken up in the spool. Therefore, intensity can be assured by making the tensile force on the webbing disperse. In view of effective use of a webbing, existence of unused part thereof is problematic.

Further, attachment of the webbing to the take-up drum requires a series of complicated processes as follows: firstly, the webbing is pulled out from one of openings of the insertion hole; next, an end portion of the webbing is folded so as to surround the webbing stopper shaft; and the folded end portion of the webbing with surrounding the webbing stopper shaft is fitted in a concave portion formed on an outer periphery of the large-sized part.

In JP Laid-open Patent Publication No. 2004-74882, the stopper shaft gets engaged with one of the openings of the insertion hole. Therefore, there is no part to be taken up until the front end of the webbing reaches the stopper shaft. There is no part of the webbing which is not included in the pulled-out length of webbing. Further, the folded end portion of the webbing with surrounding the webbing stopper shaft does not need fitting in the concave portion formed on an outer periphery of the large-sized part. However, since the stopper shaft is positioned at one of the openings of the insertion hole, tensile force of the webbing directly works on the stopper shaft when the webbing is fully pulled out. The spool disclosed in the background art is made of metal such as aluminum of which load bearing is poor. Therefore, there arises a fear that the spool itself cannot bear the tensile force working on the stopper shaft. That is, there arises the fear that the insertion hole is forcedly widened as much as the stopper shaft may slip out. This is problematic because strength of an attachment portion when the webbing is fully pulled out (termed as attachment-portion strength) may not be ensured.

DISCLOSURE OF THE INVENTION

The present invention has been made in view of the above-described problems and an object thereof is to provide a seatbelt retractor which includes a configuration of a take-up drum with a torsion bar being inserted therein, is capable of streamlining attachment of a webbing to a take-up drum, and is capable of ensuring attachment-portion strength when the webbing is fully pulled out, by making use of strength of a torsion bar.

The seatbelt retractor of the present invention which achieves the above-described object comprises a take-up drum that takes up and stores a webbing, a slit which is formed in parallel to a rotational axis of the take-up drum and allows one end of the webbing to pass through, and a slip-off prevention member which is provided at the one end of the webbing and prevents the webbing from going out the slit, wherein the seatbelt retractor further comprises a torsion bar which is mounted inside the take-up drum co-axially with the rotational axis of the take-up drum with one end of the torsion bar being fixed to the take-up drum so that relative rotation with respect to the take-up drum is disabled, and a length consisting of a diameter of the slip-off prevention member and thickness of the webbing that surrounds the slip-off prevention member is longer than a distance between an outer-diameter-side surface of the slit at the take-up drum and an outer diameter surface of the torsion bar housed inside the take-up drum.

In the seatbelt retractor, the torsion bar is mounted inside a take-up drum with its one end being fixed thereto for disabling its relative rotation with respect to the take-up drum. The slit is formed in parallel to the rotational axis of the take-up drum and allows the one end of the webbing to pass through. At one end of the webbing, there is provided a slip-off prevention member. The length consisting of the slip-off prevention member's diameter and thickness of the webbing surrounding the slip-off prevention member is longer than the distance between outer-diameter-side surface of the slit at the take-up drum and outer diameter surface of the torsion bar inside the take-up drum so as to prevent the slip-off prevention member from going out the slit. Attachment of the webbing to the take-up drum requires only a few steps as follows: firstly, the webbing is inserted in the slit of the take-up drum; and next, the webbing is set in the take-up drum by folding the end of the webbing so as to surround the periphery of the slip-off prevention member. Thereby, the webbing attachment to the take-up drum can get more efficient. In case the webbing is fully pulled out and the slip-off prevention member is pulled and eventually pressing the take-up drum in a webbing-pull-out direction, the slip-off prevention member's load to depress the take-up drum is received by both the take-up drum and the torsion bar, because they are arranged to make a smaller gap than the total thickness of the slip-off prevention member. As a result, the attachment-portion strength when the webbing is fully pulled out can be improved.

In such a seatbelt retractor, it is preferable to provide a large diameter portion in the torsion bar which is mounted on the take-up drum so that the torsion bar is fixed to the take-up drum without relative rotation of the torsion bar with respect to the take-up drum. Even though a large load is added to the take-up drum when the webbing is fully pulled out, the load is applied to the large diameter portion which is an end portion of the torsion bar. Since the load is not applied to a central portion of the torsion bar, i.e., the energy absorption portion of it, the energy absorption function of the torsion bar is not affected.

In such a seatbelt retractor, it is preferable that the take-up drum is made of an aluminum material and the torsion bar is made of an iron material. For reduction in weight, an aluminum material is used for the take-up drum. In case the torsion bar is housed in an inner space of the take-up drum including a rotational axis area therein, weight reduction of the take-up drum can be done more efficiently by making some lightening portions in the aluminum material. However, this may make strength of the take-up drum poor. It is the torsion bar made of an iron material that receives the slip-off prevention material together with the take-up drum when the webbing is fully pulled out. Therefore, the torsion bar can compensate the strength poverty of the take-up drum.

Effects of the Invention

The seatbelt retractor according to the present invention includes a configuration of a take-up drum with a torsion bar being inserted therein and is capable of ensuring attachment-portion strength to be exhibited when the webbing is fully pulled out by allowing the take-up drum and the torsion bar to receive tensile force on the fully pulled out webbing.

BEST MODES FOR CARRYING OUT THE INVENTION

Hereinafter, one embodiment of the seatbelt retractor according to the present invention will be described in detail while referring to the accompanying drawings.

[Schematic Configuration]

First, a schematic configuration of a seatbelt retractor 1 according to the present embodiment will be described based on FIG. 1 and FIG. 2.

Figure 1:
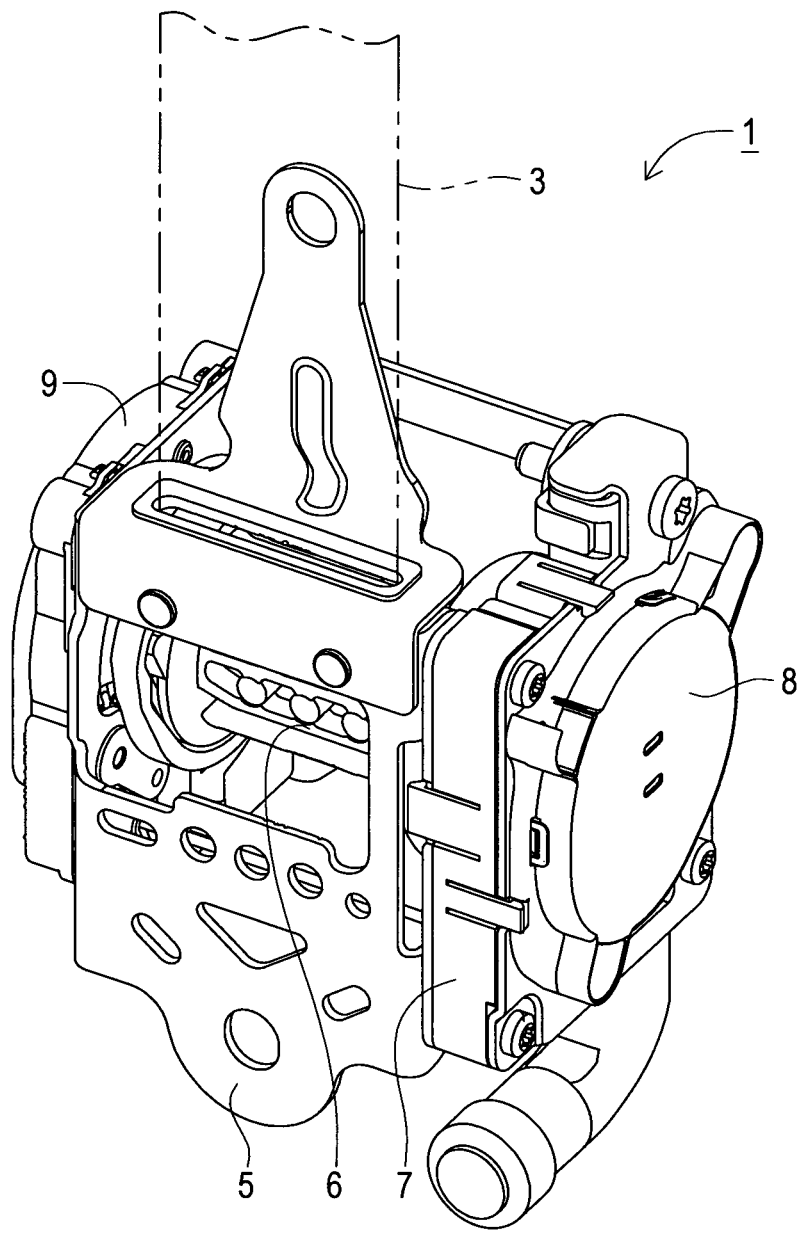
FIG. 1 is a perspective view showing an outer appearance of a seatbelt retractor according to a present embodiment.

FIG. 1 is a perspective view showing an outer appearance of a seatbelt retractor 1 according to the present embodiment. FIG. 2 is a perspective view showing the respective assemblies of the seatbelt retractor 1 in a disassembled state.

Figure 2:
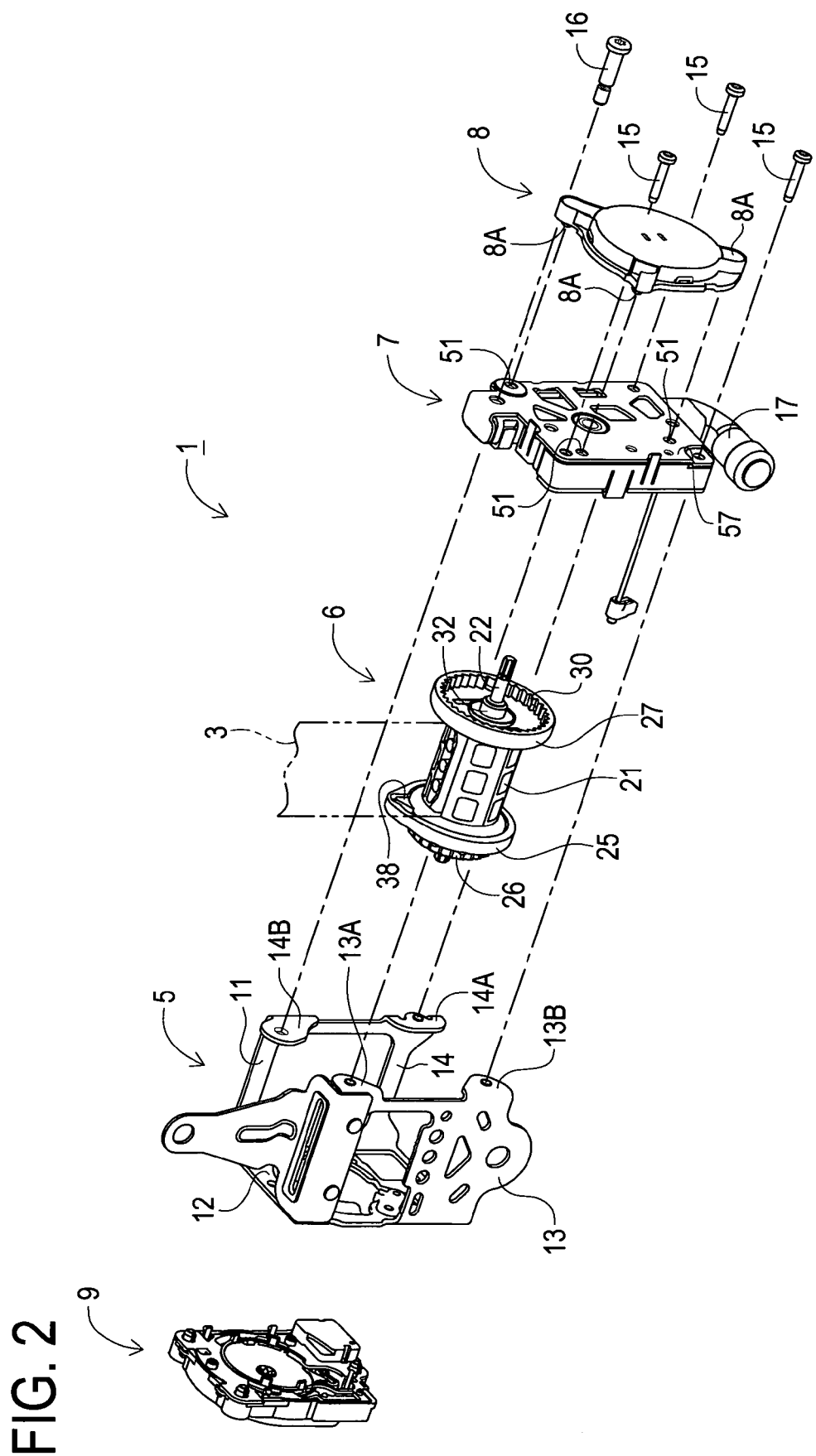
FIG. 2 is a perspective view showing respective assemblies of the seatbelt retractor in a disassembled state.

As shown in FIG. 1 and FIG. 2, the seatbelt retractor 1 is a device for retracting a vehicle webbing 3. The seatbelt retractor 1 is comprised of a housing unit 5, a take-up drum unit 6, a pretensioner unit 7, a take-up spring unit 8 and a locking unit 9.

The locking unit 9 is fixed to a side wall portion 12 of a housing 11 constituting the housing unit 5 as will be described later. The locking unit 9 carries out an actuating operation to stop pull out of the webbing 3 in response to a sudden pull out of the webbing 3 or more than predetermined acceleration of a vehicle speed.

The pretensioner unit 7 having a pretensioner mechanism 17 (refer to FIG. 6) as will be described later is mounted to the housing unit 5. To be more specific, the housing unit 5 has a substantially U-shape in plain view and has a side plate portion 13 and a side plate portion 14 which constitute opposite sides thereof. From the top and lower edge portions of the side plate portions 13 and 14, screwed portions 13A, 13B and screwed portion 14A, 14B extend inwardly from each side plate portion 13 and 14 roughly at right angle and form a screw hole separately. The pretensioner unit 7 and the housing unit 5 are screwed with three screws 15 and a stopper screw 16 at the screwed portions 13A, 13B, 14A, and 14B. Thereby, the pretensioner unit 7 constitutes the other side wall portion opposite the side wall portion 12 of the housing 11.

Figure 5:
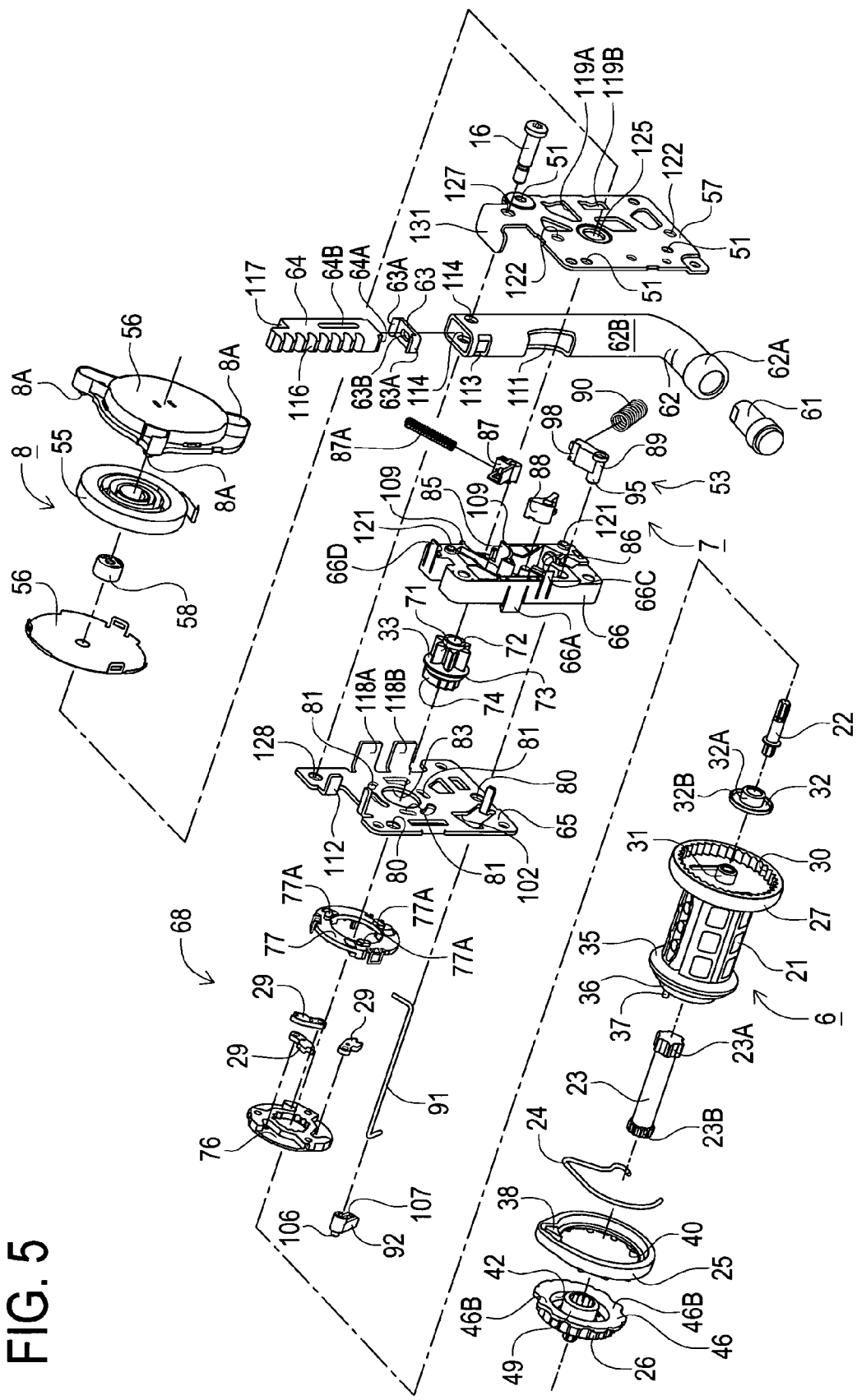
FIG. 5 is an exploded perspective view of the take-up drum unit, a pretensioner unit and a take-up spring unit.

A take-up spring unit 8 is fixed to an outer side of the pretensioner unit 7 by nylon latches 8A which are integrally formed with a spring case 56 (refer to FIG. 5).

A take-up drum unit 6 onto which the webbing 3 is wound is rotatably supported between the pretensioner unit 7 and the locking unit 9 fixed to the side wall portion 12 of the housing unit 5.

[Schematic Configuration of Take-up Drum Unit]

Next, a schematic configuration of the take-up drum unit 6 will be described based on FIG. 2 through FIG. 5.

Figure 3:
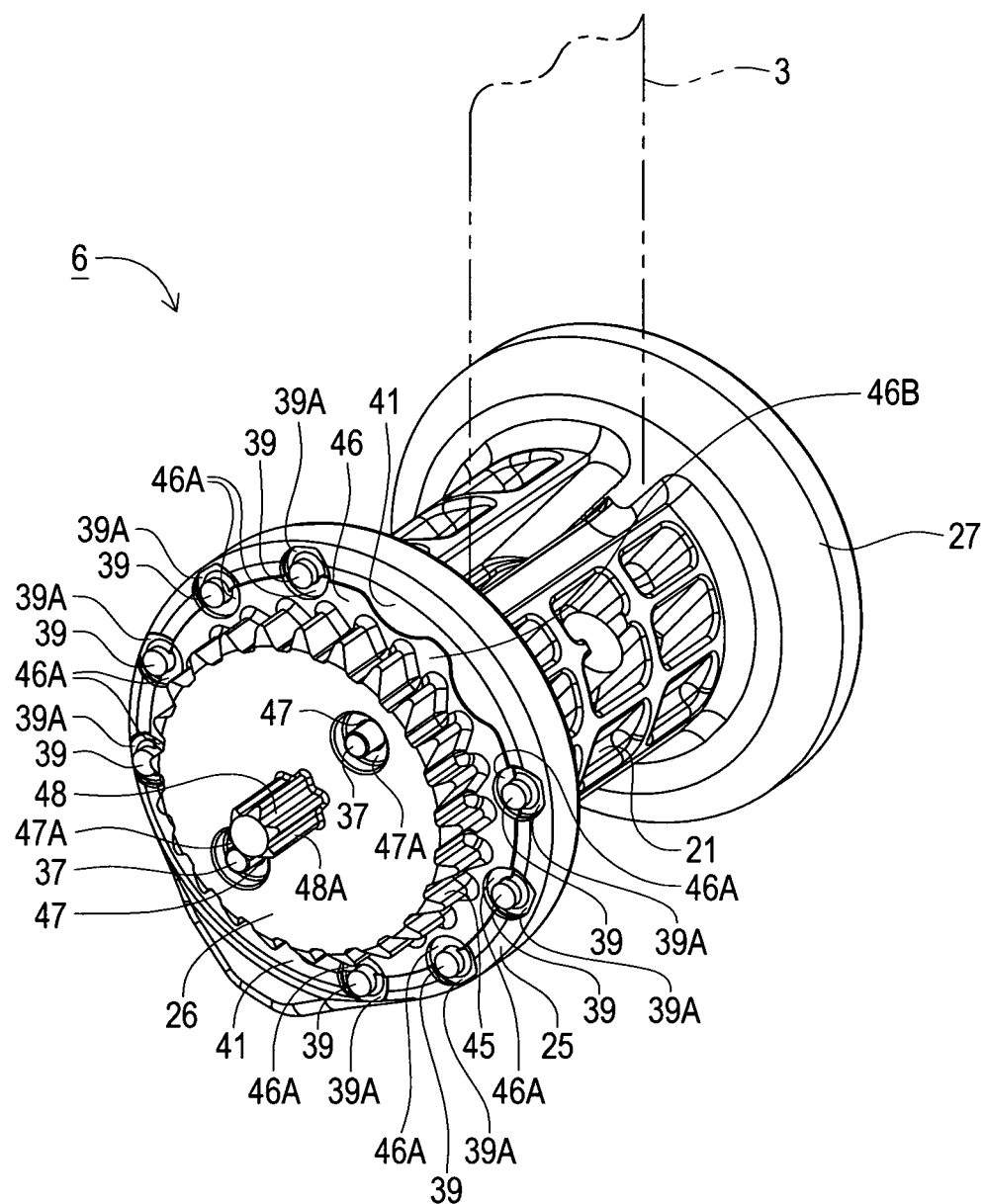
FIG. 3 is a perspective view of a take-up drum unit.
Figure 4:
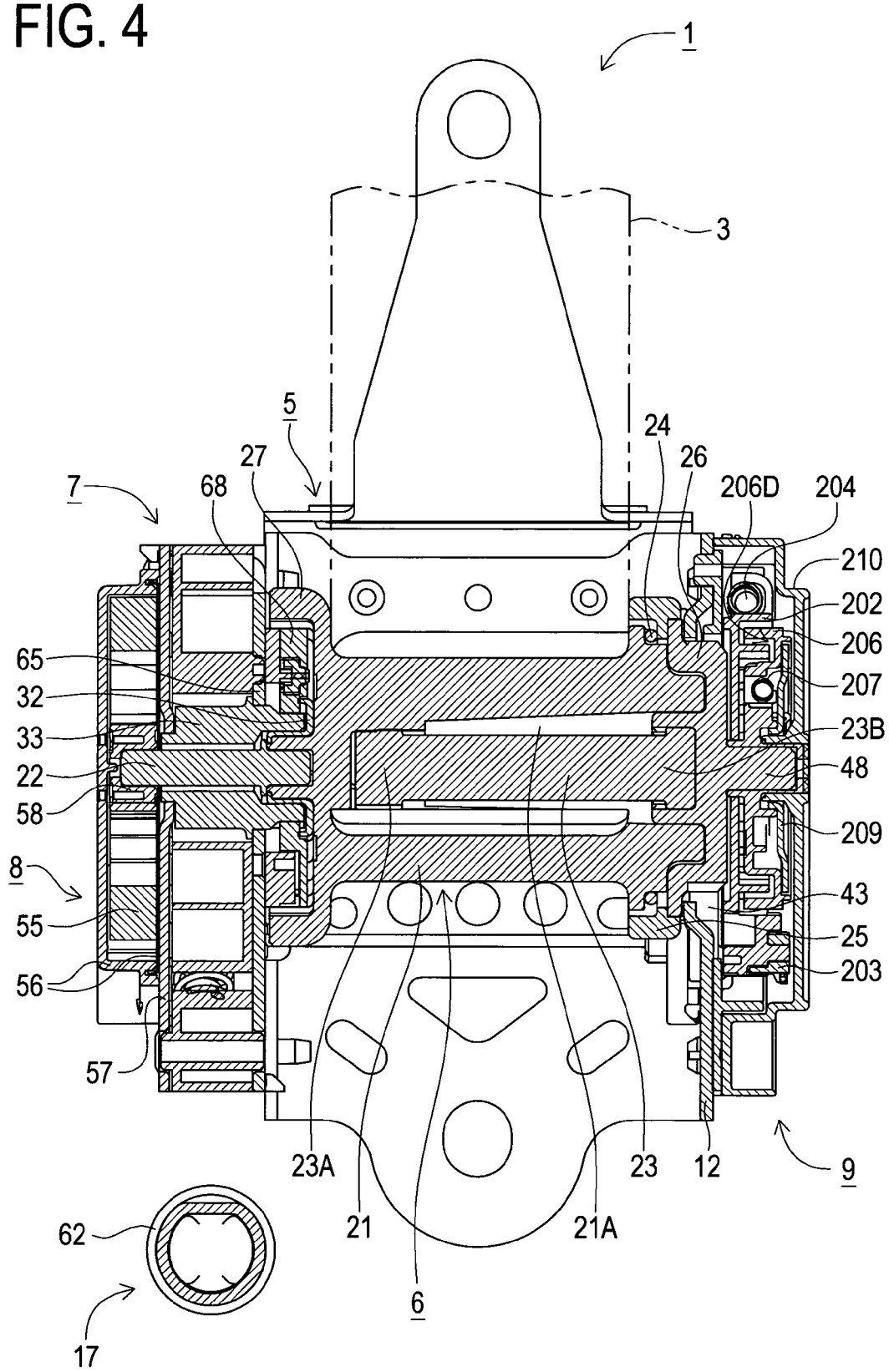
FIG. 4 is a cross-section view of the seatbelt retractor.

FIG. 3 is a perspective view of a take-up drum unit 6. FIG. 4 is a cross-section view of a seatbelt retractor 1. FIG. 5 is an exploded perspective view of the take-up drum unit 6, the pretensioner unit 7 and the take-up spring unit 8.

As shown in FIG. 2 through FIG. 5, the take-up drum unit 6 is comprised of a guiding drum 21, a drum shaft 22, a torsion bar 23, a wire 24, a wire plate 25, a ratchet gear 26 and a bearing 32.

The guiding drum 21 is made of an aluminum material or the like and is formed in a substantially cylindrical shape, with one end portion thereof facing to the pretensioner unit 7 being walled and closed. On an edge portion of a shaft central direction of the guiding drum 21 which is at the side of pretensioner unit 7, there is formed a flange portion 27 which extends radially and outwardly from an outer peripheral portion of the guiding drum 21, roughly at a right angle with its shaft central direction. A clutch gear 30 is formed in an inner peripheral face of this flange portion 27 so that the clutch gear 30 engages the respective clutch pawls 29 in case of vehicle collision as will be described later.

A cylindrical mounting boss 31 is erected at a central position in the end portion of the guiding drum 21 on the pretensioner unit 7 side. Also, a drum shaft 22 formed of a steel material or the like is mounted at the central position of this end portion by press fitting or the like. To the outer periphery of the mounting boss 31, there are fitted the bearing 32 which has a cylindrical portion 32A having substantially a cylindrical shape and being formed of a synthetic resin material such as polyacetal resin or the like, and a flanged end portion 32B which is connected at an outer periphery of a bottom end portion of the cylindrical portion 32A. The take-up drum unit 6 is rotatably supported by a shaft receiving portion 33A of a pinion gear body 33 (refer to FIG. 6 and FIG. 8) through this bearing 32. The pinion gear body 33 is formed of a steel material and the like and constitutes the pretensioner unit 7.

Inside the guiding drum 21, there is formed a shaft hole 21A which extends along a center axis thereof so as to become tapered as for the draft angle. Within the shaft hole 21A on the flange portion 27 side, there is formed a spline groove for fitting the torsion bar 23 which is made of a steel material or the like. The spline 23A side of the torsion bar 23 is inserted in the shaft hole 21A of the guiding drum 21 and is press-fitted to get in contact with the flange portion 27. As a result, the torsion bar 23 is press-fitted and fixed inside the guiding drum 21 so that relative rotation thereof with respect to the guiding drum 21 is disabled.

On the locking unit 9 side in an axial direction of the guiding drum 21, there is formed a flange portion 35 which extends slightly in a radial direction from an outer peripheral surface slightly inside an edge portion of the guiding drum 21. Also, from an outer side of the flange portion 35, there is formed a cylindrical stepped portion 36 of which outer diameter of a portion at an outer side thereof becomes tapered in an axial direction. A pair of ejector pins 37 and 37 are erected at radially opposite positions in an outer end portion of the stepped portion 36.

On an outer side surface of the flange portion 35, as will be described later, there is formed a convex portion in a predetermined shape (refer to FIG. 30 and FIG. 31). A rod-shaped wire 24 made up of a metallic material such as a stainless steel material is mounted to an outer periphery of a bottom end portion of the stepped portion 36 so as to match the shape of this convex portion.

An outer peripheral portion of the flange portion 35 is covered by a wire plate 25 which has a substantially egg-like shape in a side plan view. The wire plate 25 is made of an aluminum material or the like and has a convex portion 38 formed at an outer peripheral portion of its inner surface facing to the guiding drum 21. The convex portion 38 is fitted with a wire 24 which protrudes outward from the flange portion 35.

At a central part of the wire plate 25, there is formed a through hole 40 into which the stepped portion 36 will be inserted. On an outer edge portion of the through hole 40 at an outer side in an axial direction thereof, there are provided a pair of engaging convex portions 41 which have two convex portions formed thereon which protrude in a circular shape radially inwardly from an internal peripheral so as to oppose each other in a radial direction. On an outer edge portion at an outer side in an axial direction which is interposed between the respective engaging convex portions 41 of the through hole 40, there are erected four pairs of rivet pins 39 so as to oppose each other in a radial direction. A concave portion 39A being recessed to a predetermined depth in a semi-circular arcuate shape is formed in a bottom end portion of each rivet pin 39.

A ratchet gear 26 has a cylindrical extending portion 42 having a disk-like shape and being made of a steel material or the like. The extending portion 42 extends from an outer peripheral portion in an axial direction up to a length substantially the same with the stepped portion 36. In an outer peripheral surface of this extending portion 42, there is formed a ratchet gear portion 45 which is engaged with the pawl 43 in case of vehicle collision or vehicle emergency as will be described later (refer to FIG. 9). At an edge portion of the extending portion 42 in an axial direction on the guiding drum 21 side, there is formed a baffle flange 46 which extends from an outer peripheral portion of the extending portion 42 in a radial direction. Further, a pair of engaging concave portions 46B are provided at an outer periphery of the baffle flange 46 (refer to FIG. 5) thereon so as to oppose each other in a radial direction. The engaging concave portions 45B each have two concave portions being recessed in a circular shape inwardly in a radial direction thereof. Concave portions 46A being recessed to a predetermined depth in a semi-circular arcuate shape are formed in an outer surface in the axial direction of the baffle flange 46, so as to oppose the respective rivet pins 39.

Through holes 47 are opened in the ratchet gear 26 at positions opposite the respective ejector pins 37 erected from the guiding drum 21 for inserting the respective ejector pins 37. Concave portions 47A being recessed to a predetermined depth are formed in the circumference of the through holes 47. A shaft portion 48 is erected at a center position outside of the ratchet gear 26. A spline 48A is formed at an outer peripheral surface of the shaft portion 48. The take-up drum unit 6 is thus rotatably supported by the locking unit 9 through this shaft portion 48.

A cylindrical mounting boss 49 is erected at a central part of an inner surface of the ratchet gear 26. Spline grooves are formed at an inner peripheral surface of the mounting boss 49 for fitting the spline 23B formed at the other end of the torsion bar 23. The spline 23B formed at the other end of the torsion bar is formed so as to have an outer diameter which is approximately the same as the outer diameter of the spline 23A formed at the one end of the torsion bar 23.

Accordingly, the respective engaging concave portions 46B of the baffle flange 46 in the ratchet gear 26 are fitted with the respective engaging convex portions 41 of the wire plate 25. Thereafter, the respective rivet pins 39 are riveted so as to expand at an inner side of the concave portions 39A at a base end thereof and the concave portions 46A of the baffle flange 46 formed at opposite positions. The wire 24 is mounted to an outer surface of the flange portion 35 in the guiding drum 21 (refer to FIG. 31). Next, when the wire plate 25 and the ratchet gear 26 are applied to the outside of the flange portion 35, the spline 23B formed at the other end of the torsion bar 23 is fitted inside the mounting boss 49 while the respective ejector pins 37 of the guiding drum 21 are being inserted inside the respective through holes 47 of the ratchet gear 26. Thereafter, the respective ejector pins 37 are riveted so as to be expanded inside the concave portions 47A formed in a circumference of the through holes 47.

As a result, the ratchet gear 26 and the wire plate 25 are mounted so that relative rotation thereof is disabled. This ratchet gear 26 and the wire plate 25 are also mounted to the guiding drum 21 through the torsion bar 23 and the respective ejector pins 37 so relative rotation thereof with respect to the guiding drum 21 is disabled. The webbing 3 is wound around an outer peripheral surface between the flange portion 27 of the guiding drum 21 and the flange portion 35 and the wire plate 25.

[Schematic Configuration of Take-up Spring Unit]

Next, a schematic configuration of the take-up spring unit 8 will be described based on FIG. 2, FIG. 4 and FIG. 5.

As shown in FIG. 2, FIG. 4 and FIG. 5, the take-up spring unit 8 has a take-up urging mechanism 55 including a spiral spring, a spring case 56 for accommodating this take-up urging mechanism 55 and a spring shaft 58. The take-up spring unit 8 is fixed in the respective through holes 51 in the cover plate 57 constituting the outer side of the pretensioner unit 7 formed of a steel material or the like through nylon latches 8A provided at three locations on the spring case 56. A tip end portion of the drum shaft 22 in the take-up drum unit 6 is coupled with the spiral spring through the spring shaft 58 inside the spring case 56. Thus, the take-up drum unit 6 is urged in a retracting direction of the webbing 3 at all times owing to the urging force of the spiral spring.

[Schematic Configuration of Pretensioner Unit]

Next, a schematic configuration of the pretensioner unit 7 will be described based on FIG. 2, and FIG. 4 through FIG. 8.

Figure 6:
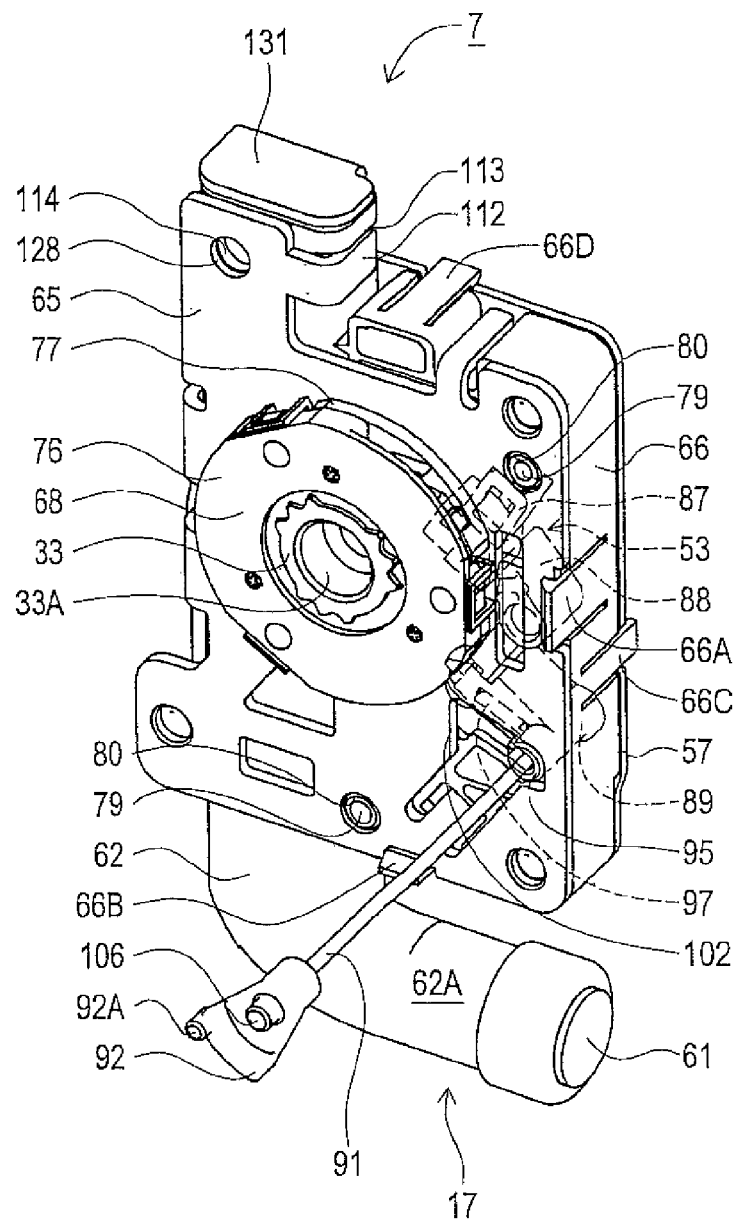
FIG. 6 is a perspective view of a pretensioner unit as seen from a housing unit mounting side thereof.
Figure 7:
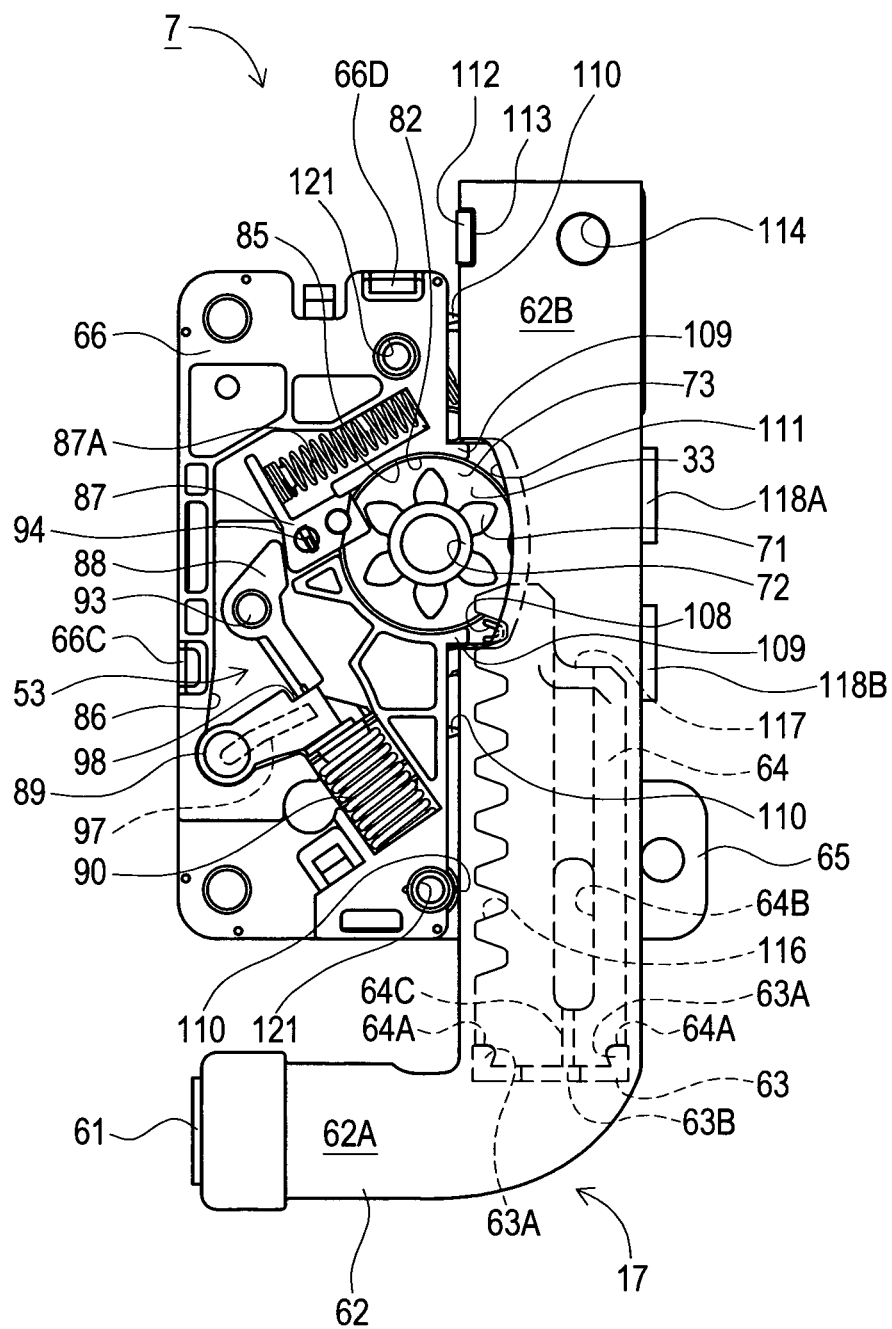
FIG. 7 is a side view showing the pretensioner unit.
Figure 8:
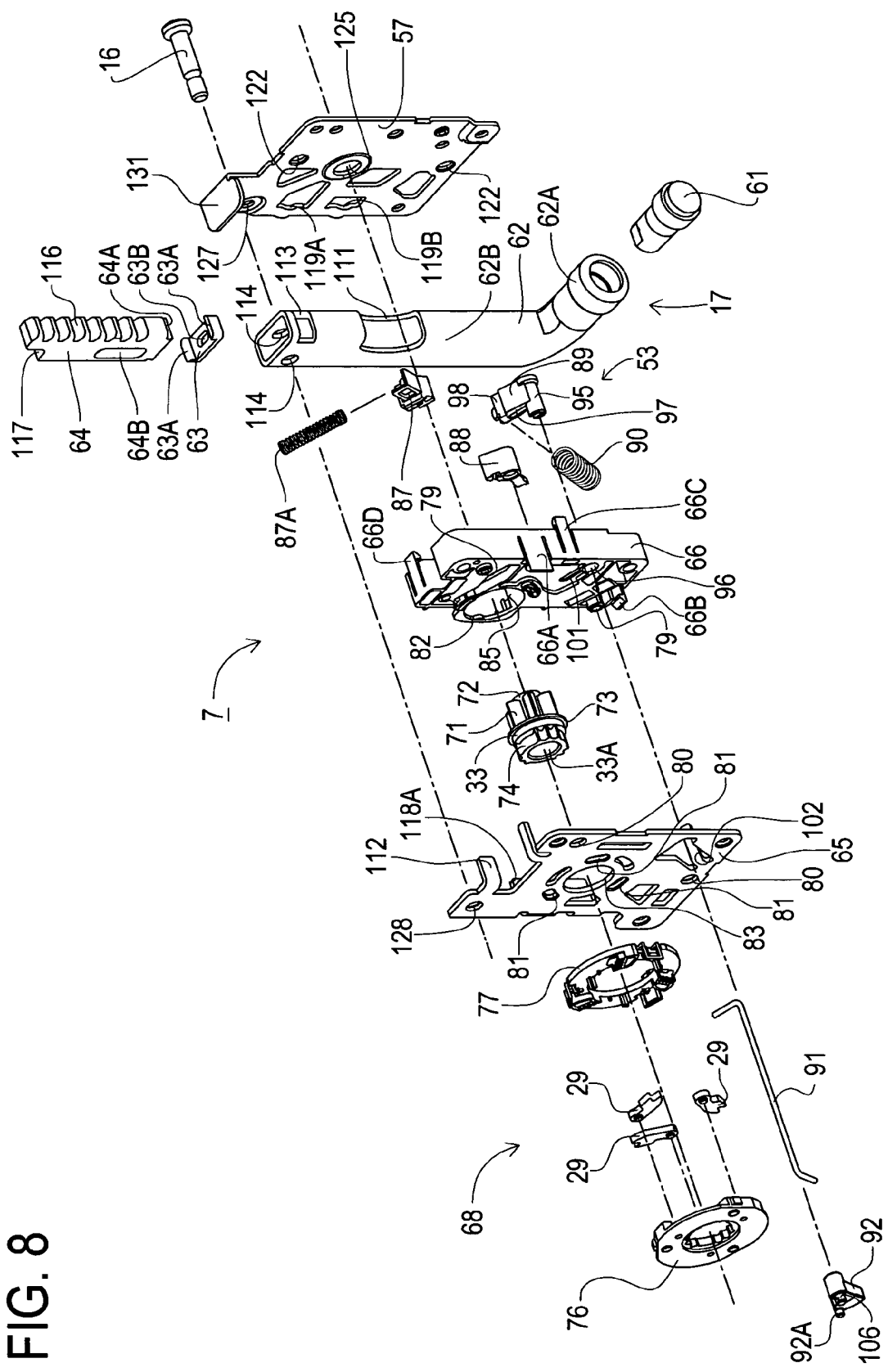
FIG. 8 is an exploded perspective view showing the pretensioner unit in FIG. 6 in a disassembled state.

FIG. 6 is a perspective view of the pretensioner unit 7 as seen from a housing unit 5 mounting side. FIG. 7 is a side view showing the pretensioner unit 7. FIG. 8 is an exploded perspective view showing the pretensioner unit 7 in FIG. 6 in a disassembled state.

As shown in FIG. 2, and FIG. 4 through FIG. 8, the pretensioner unit 7 is comprised of a pretensioner mechanism 17 and a forced locking mechanism 53 rotates a pawl 43 (refer to FIG. 9) which is rotatably supported at a side wall portion 12 of the housing unit 5.

[Pretensioner Mechanism]

As shown in FIG. 5 through FIG. 8, the pretensioner mechanism 17 activates a gas generating member 61 in case of vehicle collision. This causes the take-up drum unit 6 to rotate in the retracting direction of the webbing 3 through the flange portion 27 of the take-up drum unit 6, by using the pressure of this gas.

Here, the pretensioner mechanism 17 consists of: a gas generating member 61; a pipe cylinder 62; a sealing plate 63 and a piston 64 which move inside the pipe cylinder 62 under the gas pressure from the gas generating member 61; a pinion gear body 33 which engages a rack formed in this piston 64 and rotates; a base plate 65, with a predetermined thickness (e.g., 2.0 mm), to which the pipe cylinder 62 is mounted; a base block body 66 of a substantially rectangular shape which is in contact with the base plate 65 and mounted on a side surface of the pipe cylinder 62 on the pinion gear body 33 side; and a clutch mechanism 68 provided on a back surface of the base plate 65.

The pinion gear body 33 is provided with a pinion gear portion 71 and has a substantially cylindrical shape on an outer peripheral portion thereof. The pinion gear body 33 is made of a steel material or the like and engages the rack formed in the piston 64. The pinion gear body 33 also has a cylinder-shaped support portion 72 formed so as to extend outwardly from an end portion thereof on the cover plate 57 side, in an axial direction of the pinion gear portion 71. The support portion 72 is formed to have substantially the same length as the thickness of the cover plate 57 (e.g., 1.6 mm), with the root diameter of the pinion gear portion 71 as outer diameter. Further, thickness of the cover plate 57 is formed to be slightly thinner than that of the base plate 65.

A flange portion 73 extending in a radial direction is formed at an end portion of the pinion gear portion 71 on the base plate 65 side in the axial direction thereof. Further, on the pinion gear body 33, there is formed a boss portion 74 which has a shaft receiving portion 33A formed in a substantially cylindrical-shape in an outward direction from the flange portion 73. The shaft receiving portion 33A is adapted for inserting therein the drum shaft 22 of the take-up drum unit 6 and fitting thereon the bearing 32. Three sets of splines having the outer diameter of the bottom end portion of the boss portion 74 are formed on an outer peripheral surface of this boss portion 74 at an interval of roughly 120° central angle.

The clutch mechanism 68 has a substantially annular-shaped pawl base 76 made of a steel material or the like, three clutch pawls 29 made of a steel material or the like, and a substantially annular-shaped pawl guide 77 which is made of a synthetic resin such as polyacetal resin or the like, and the pawl guide 77 and the pawl base 76 hold the respective clutch pawls 29 therebetween as will be described later (refer to FIG. 21).

On an inner peripheral surface of the pawl base 76 there are formed three sets of spline grooves at an interval of roughly 120° central angle. The spline grooves are press-fitted with the splines formed on the boss portion 74 of the pinion gear body 33. The pawl guide 77 is formed so that an inner peripheral diameter thereof is bigger than the spline grooves in the pawl base 76. Positioning projections 77A are provided at equal angles at three locations concentrically on the outer side face of the pawl guide 77 faced to the base plate 65.

The positioning projections 77A provided on the outer side face of the pawl guide 77 in the clutch mechanism 68 are engaged with the positioning holes 81 formed in the base plate 65, to set the clutch mechanism 68 to an outer surface of the base plate 65. Next, as shown in FIG. 8, the boss portion 74 of the pinion gear body 33 is inserted into the through hole 83 formed at substantially a central part of the base plate 65. Thereafter, the respective splines formed on the boss portion 74 is press-fitted and fixed in the respective spline grooves of the pawl base 76 constituting the clutch mechanism 68. As a result, the clutch mechanism 68 and the pinion gear body 33 are set and fixed to the base plate 65 and the pinion gear portion 71 of the pinion gear body 33 is positioned, at all times, in the position shown in FIG. 7.

The base block body 66 is made of a synthetic resin such as polyacetal resin or the like. The flange portion 73 of the pinion gear body 33 is inserted inside the through hole 82 formed on the bottom surface portion of the gear housing portion 85. This gear housing portion 85 is formed so as to be recessed in a substantially semicircle shape in plain view in an inward direction from a side edge portion inside the base block body 66 and also, is formed with a bottom surface thereof protruding outward (refer to FIG. 11). Positioning bosses 79 protruding at a side portion of the base block body 66 on the base plate 65 side are inserted into the positioning holes 80 formed in the base plate 65. The base block body 66 is thus set to a surface of the base plate 65 (refer to FIG. 6).

An elastic engagement piece 66A is formed so as to extend from an outer side surface of the base block body 66 to the base plate 65 side and enables elastic deformation thereof in an outward direction. An elastic engagement piece 66B is formed so as to extend from a lower-side side surface of the base block body 66 to the base plate 65 side and enables elastic deformation thereof in an outward direction (refer to FIG. 8). The elastic engaging pieces 66A and 66B latch with the respective side end portions of the base plate 65. As a result, the base block body 66 is set to the base plate 65.

The through hole 83 formed at a substantially central portion of the base plate 65 has an internal diameter which can support an outer diameter of the bottom end portion of the boss portion 74 in the pinion gear body 33. The through hole 83 is also formed so as to rotatably support the pinion gear body 33 with one end portion thereof. The gear housing portion 85 is formed so that a height thereof is substantially the same as the sum of heights of the pinion gear portion 71 and the flange portion 73 in the pinion gear body 33.

[Forced Locking Mechanism]

Here, the forced locking mechanism 53 set inside the base block body 66 will be described based on FIG. 5 through FIG. 8.

As shown in FIG. 7, a concave portion 86 for setting the forced locking mechanism 53 is formed in the base block body 66. In the base block body 66, there are provided a push block 87, a rotating lever 88, a block urging spring 87A, a gear-side arm 89 and an urging spring 90, which constitute the forced locking mechanism 53. The block urging spring 87A urges the push block 87 in the direction of the rotating lever 88. The urging spring 90 urges the gear-side arm 89 in the direction of the rotating lever 88. As shown in FIG. 6, to the gear-side arm 89, there are connected a coupling shaft 91 and a mechanical arm 92 which constitutes the forced locking mechanism 53 from outside the base plate 65.

The rotating lever 88 is made up of a synthetic resin such as polyacetal or an aluminum material or the like and is formed in a substantially L-shape, having through holes formed in a bending portion thereof. As shown in FIG. 7, the rotating lever 88 is rotatably supported by a boss 93 which is erected on the bottom surface of the concave portion 86 provided in the base block body 66, so that one end portion of the rotating lever 88 faces the pinion gear portion 71 of the pinion gear body 33.

The push block 87 is made up of a synthetic resin such as a polyacetal resin or the like. As shown in FIG. 7, the push block 87 is positioned so that one end thereof is in the vicinity of the teeth of the pinion gear portion 71 in the pinion gear body 33 and the other end thereof is in the vicinity of the rotating lever 88, by the positioning projections 94 erected in a bottom surface of the concave portion 86. The push block 87 is urged towards the rotating lever 88 by the block urging spring 87A so as to prevent looseness and making noise.

Accordingly, when the pinion gear body 33 is rotated as will be described later, the rotating lever 88 can be rotated in an outward direction (counter-clockwise direction in FIG. 7) by the push block 87 which is pushed against the teeth of the pinion gear portion 71 (refer to FIG. 11). The push block 87 is thus prevented from returning to the pinion gear body 33 side by the block urging spring 87A.

The gear-side arm 89 is made up of a synthetic resin such as polyacetal or the like or an aluminum material or the like and is formed in a substantially flat plate-shape. A boss 95 to be inserted in the through hole 96 formed in a bottom surface of the concave portion 86 in the base block body 66 is erected at one end portion of the gear-side arm 89 which is opposite to the other portion contacting with the rotating lever 88 at the side surface of the base block body 66. In a side surface onto which the boss 95 of the gear-side arm 89 is erected, there is formed a groove portion 97 which has a predetermined depth and allows for insertion of a bent portion formed at one end of the coupling shaft 91.

As shown in FIG. 6 and FIG. 8, the gear-side arm 89 has a stepped portion 98 formed at a tip end top surface of the rotating lever 88 so as to get in contact with the other end of the rotating lever 88. The boss 95 of the gear-side arm 89 is inserted in the through hole 96 which is formed at a bottom surface of the concave portion 86, and the gear-side arm 89 is rotatably supported toward the rotating lever 88 side. Further, the other tip end lower side of the gear-side arm 89 opposite to the stepped portion 98 is urged by the urging spring 90, and the gear-side arm 89 is urged towards the rotating lever 88 side (upward in FIG. 7). As a result, the stepped portion 98 will come in contact with the other end portion of the rotating lever 88.

Accordingly, if the rotating lever 88 is rotated in a counter-clockwise direction in FIG. 7, the other end portion of the rotating lever 88 moves away from the tip end portion of the gear-side arm 89 so that the gear-side arm 89 can rotate in an outward direction (counter-clockwise direction in FIG. 7) by the urging force of the urging spring 90.

The coupling shaft 91 is formed of a wire rod made up of a steel material or the like and is bent in a substantially right angle so that the ends thereof face each other with approximately 90-degree of tilt. The straight portion of this coupling shaft 91 is slightly longer than the width of the respective side plate portions 13 and 14 (refer to FIG. 9) of the housing unit 5.

As shown in FIG. 8, a groove 101 with the bent portion at one end of the coupling shaft 91 inserted therein extends from the through hole 96 formed in the bottom surface of the concave portion 86 of the base block body 66. A through hole 102 having a bent portion at one end of the coupling shaft 91 inserted therein is formed at a portion facing the gear-side arm 89 of the base plate 65.

Accordingly, the bent portion at one end of the coupling shaft 91 is guided through the through hole 102 of the base plate 65, the through hole 96 and the groove 101 of the base block body 66 to be fitted inside the groove portion 97 of the gear-side arm 89 installed inside the concave portion 86 of the base block body 66.

The mechanical arm 92 is made of a synthetic resin such as a polyacetal resin and the like or an aluminum material or the like and has a flat-plated and substantially fan-like shape, width of the fan-like shape being narrow. On its outer surface of the narrower one of the end portions, there is erected a boss 106 which can be rotatably fitted in the through hole 105 (refer to FIG. 10) formed in the side wall portion 12 (refer to FIG. 9) of the housing unit 5. Also, a boss 92A to be fitted inside a notch portion 138 is erected on an outer surface at an outer peripheral edge portion of the mechanical arm 92 on the side wall portion 12 side. A groove portion 107 of a predetermined depth is formed along a center line in an inner surface of the mechanical arm 92.

Accordingly, as shown in FIG. 6, the bent portion at the other end of the coupling shaft 91 is fitted inside the groove portion 107 of the mechanical arm 92. The mechanical arm 92 is mounted to the other end side of the coupling shaft 91 so that the shaft center of the boss 106 erected in the outer side surface of an edge portion at the rotational axis of the mechanical arm 92 and the shaft center of the coupling shaft 91 become substantially straight.

If the pretensioner unit 7 is mounted to the housing unit 5 as will be described later, the boss 106 of the mechanical arm 92 is rotatably fitted inside the through hole 105 formed in the side wall portion 12 (refer to FIG. 10). The boss 92A of the mechanical arm 92 is inserted in the notch portion 138 formed in the side wall portion 12, so as to be rotatably mounted inside the side wall portion 12.

[Pretensioner Mechanism]

Next, the configuration and mounting of the pipe cylinder 62 constituting the pretensioner mechanism 17 will be described based on FIG. 5 through FIG. 8.

As shown in FIG. 5 through FIG. 8, the pipe cylinder 62 is formed of a steel pipe material or the like in a substantially L shape. The pipe cylinder 62 has a housing portion 62A having a substantially cylindrical shape formed at one end thereof (lower-side bent portion in FIG. 7). The pipe cylinder 62 is configured to house the gas generating member 61. This gas generating member 61 includes explosive powder which is ignited in response to an ignition signal transmitted from a control portion not shown, generating gas as a result of gas generating agent combustion.

At the other end of the pipe cylinder 62 (top-side bent portion in FIG. 7), there are formed a piston housing portion 62B having a substantially rectangular shape in cross section and a notch portion 111 at a portion thereof facing the pinion gear body 33. When the pipe cylinder 62 is installed on the base plate 65, the pinion gear portion 71 of the pinion gear body 33 is fitted inside this notch portion 111. At a top end portion of the piston housing portion 62B, there is formed a notch portion 113 which is engaged with an arm portion 112 bent at a substantially right angle from the base plate 65 at the side surface portion of the base block body 66 and functions as a slip-off prevention means of the pipe cylinder 62 in a vertical direction. A pair of through holes 114 which are relatively opposite each other and allow insertion of a stopper screw 16 are formed at opposite side surface portions of the pipe cylinder 62 and sideways from the notch portion 113. This stopper screw 16 is used for mounting the pretensioner unit 7 to the housing unit 5 and functions as a bounce-out prevention means of the piston 64.

As seen in FIG. 7 and FIG. 8, the sealing plate 63 is made of a rubber material or the like and formed as a substantially rectangular-shaped plate so as to allow insertion thereof from an top end portion of the piston housing portion 62B. The sealing plate 63 has a pair of projecting portions 63A which extend upwards at opposite edge portions in a longitudinal direction thereof and protrude inwardly over the full width of their respective top end portions. A gas releasing hole 63B is formed at a central part in the sealing plate 63.

The piston 64 is made of a steel material or the like and has an overall lengthy shape, with a substantially rectangular shape in cross section, allowing for insertion thereof from the top end portion of the piston housing portion 62B. At a lower end portion of the piston 63, there are formed engagement grooves 64A wherein respective projecting portions 63A of the sealing plated 63 are fitted from sideways. On the lower end surface of the piston 64, there is formed a thin communicating hole 64C which extends from the lower end surface of the piston 64 to a through hole 64B formed in a side surface portion of the piston 64.

After the respective projecting portions 63A of the sealing plate 63 are slid from sideways into to engagement grooves 64A of the piston 64 for fitting therein, the sealing plate 63 is installed inside and is press-fitted to the back side thereof in a depth direction from the top end of the piston housing portion 62B. The gas releasing hole 63B formed in the sealing plate 63 communicates with the through hole 64B through the communicating hole 64C of the piston 64.

Thus, in this state, the sealing plate 63 is depressed by the pressure of the gas generated in the gas generating member 61 and the piston 64 is caused to move to the top end opening portion (top end portion in FIG. 7) of the piston housing portion 62B. When the webbing 3 is pulled out again after the activation of the pretensioner as will be described later, the piston 64 drops downward due to the reverse rotation of the pinion gear body 33. The gas inside the pipe cylinder 62 is thus released through the gas releasing hole 63B of the sealing plate 63, the communicating hole 64C and the through hole 64B of the piston 64 and the piston 64 is caused to drop smoothly.

On the side surface of the pinion gear body 33 side of the piston 64, there is formed a rack 116 which engages the pinion gear portion 71 of the pinion gear body 33. At a back surface of a tip end portion of the rack 116 (top end portion in FIG. 7), there is formed a stepped portion 117 which can come in contact with the stopper screw 16. As shown in FIG. 7, in a normal state until the gas generating member 61 is activated, the piston 64 is positioned at the bottom of the piston housing portion 62B and the tip end of the rack 116 becomes disengaged from the pinion gear portion 71.

As shown in FIG. 7, the pipe cylinder 62 is installed on the base plate 65 in such a manner that the respective projecting portions 109 projecting outwardly from opposite edge portions of the gear housing portion 85 in the base block body 66 are being fitted inside the notch portion 111 of the thus configured piston housing portion 62B and the arm portion 112 of the base plate 65 is fitted inside the notch portion 113 formed in the top end portion of the piston housing portion 62B. A rack locking pin 108 having a substantially U-shape in cross section is erected in the base block body 66. The rack locking pin 108 is inserted in the gear groove at the top end of the rack 116 so as to restrain vertical movement of the piston 64. The tip end portion of the piston 64 is positioned in the vicinity of the pinion gear portion 71 of the pinion gear body 33, whereby the piston 64 is disengaged.

Thus, the opposite surfaces of the piston housing portion 62B in the pipe cylinder 62 are supported by ribs 110 and backrest portions 118A and 118B. The ribs 110 have a substantially triangular shape in cross section and are erected in a side surface of the base block body 66. The backrest portions 118A and 118B extend at a substantially right angle from portions on the side edge portions of the base plate 65 facing the pinion gear body 33. These backrest portions 118A and 118B extend slightly higher than the piston housing portion 62B and are formed so as to allow insertion thereof in the respective through holes 119A and 119B formed at side end portions of the cover plate 57 facing the backrest portions 118A and 118B.

The side edge portions of the through holes 119A and 119B facing the outside surfaces of the backrest portions 118A and 118B are recessed inwardly (leftward in FIG. 8) by a predetermined depth (for instance, approximately 1 mm deep). Thus, when the backrest portions 118A and 118B are inserted in the respective through holes 119A and 119B, the inner surface of the through holes 119A and 119B will reliably come in contact with the outside surface of the backrest portions 118A and 118B.

With the base block body 66, the forced locking mechanism 53 and the pipe cylinder 62 etc., being installed on the base plate 65, the positioning bosses 121 of this base block body 66 projecting in a side surface portion of the cover plate 57 are engaged with the respective positioning holes 122 of the cover plate 57. As a result, the cover plate 57 is installed on the top side of the base block body 66, the forced locking mechanism 53 and the pipe cylinder 62 etc. Simultaneously, a cylindrical support portion 72 of the pinion gear body 33 is fitted in a support hole 125 formed at a substantially center part in the cover plate 57.

The backrest portions 118A and 118B which extend substantially at a right angle from the side edge portions of the base plate 65 are inserted in the respective through holes 119A and 119B formed at side edge portions of the cover plate 57 facing the backrest portions 118A and 118B. Elastic engagement piece 66C and elastic engagement piece 66D are latched in the respective side end portions of the cover plate 57. The elastic engagement piece 66C extends from an outer side surface of the base block body 66 to the cover plate 57 side and is formed so as to be elastically deformable outwardly. The elastic engagement piece 66D extends from the top side surface of the base block body 66 to the cover plate 57 side and is formed so as to be elastically deformable outwardly.

Thus, the cover plate 57 is set and fixed to the base block body 65 and the pipe cylinder 62 is mounted between the cover plate 57 and the base plate 65. The support portion 72 formed at the end portion of the pinion gear body 33 is rotatably supported by the support hole 125 in the cover plate 57. Accordingly, as shown in FIG. 4, the support portion 72 and the bottom end portion of the boss portion 74 formed at opposite ends portions of the pinion gear body 33 are rotatably supported by the through hole 83 formed in the base plate 65 and the support hole 125 formed in the cover plate 57.

The through holes 114 of the pipe cylinder 62, the through hole 127 formed in the cover plate 57 at a position facing the through holes 114, and the screw hole 141B formed at a position facing the through holes 114 of the base plate 65 (refer to FIG. 9) are arranged coaxially. The stopper screw 16 formed of a steel material or the like can be inserted and threaded from the cover plate 57 side towards the base plate 65 side.

Accordingly, the pipe cylinder 62 is held between the cover plate 57 and the base plate 65 and also opposite side surfaces thereof are held by the base block body 66 and the backrest portions 118A and 118B. The top end opening of the piston housing portion 62B in the pipe cylinder 62 is covered by a cover portion 131 which extends from the top end portion of the cover plate 57 at a substantially right angle therewith. The sealing plate 63 is depressed under the pressure of the gas generated by the gas generating member 61 and the piston 64 is caused to move toward the top end opening portion (top end in FIG. 7) of the piston housing portion 62B. In this case, the stepped portion 117 of the piston 64 comes in contact with the stopper screw 16 inserted in the through holes 114 so as to stop thereat.

[Schematic Configuration of Housing Unit]

A schematic configuration of the housing unit 5 will next be described based on FIG. 9 and FIG. 10.

Figure 9:
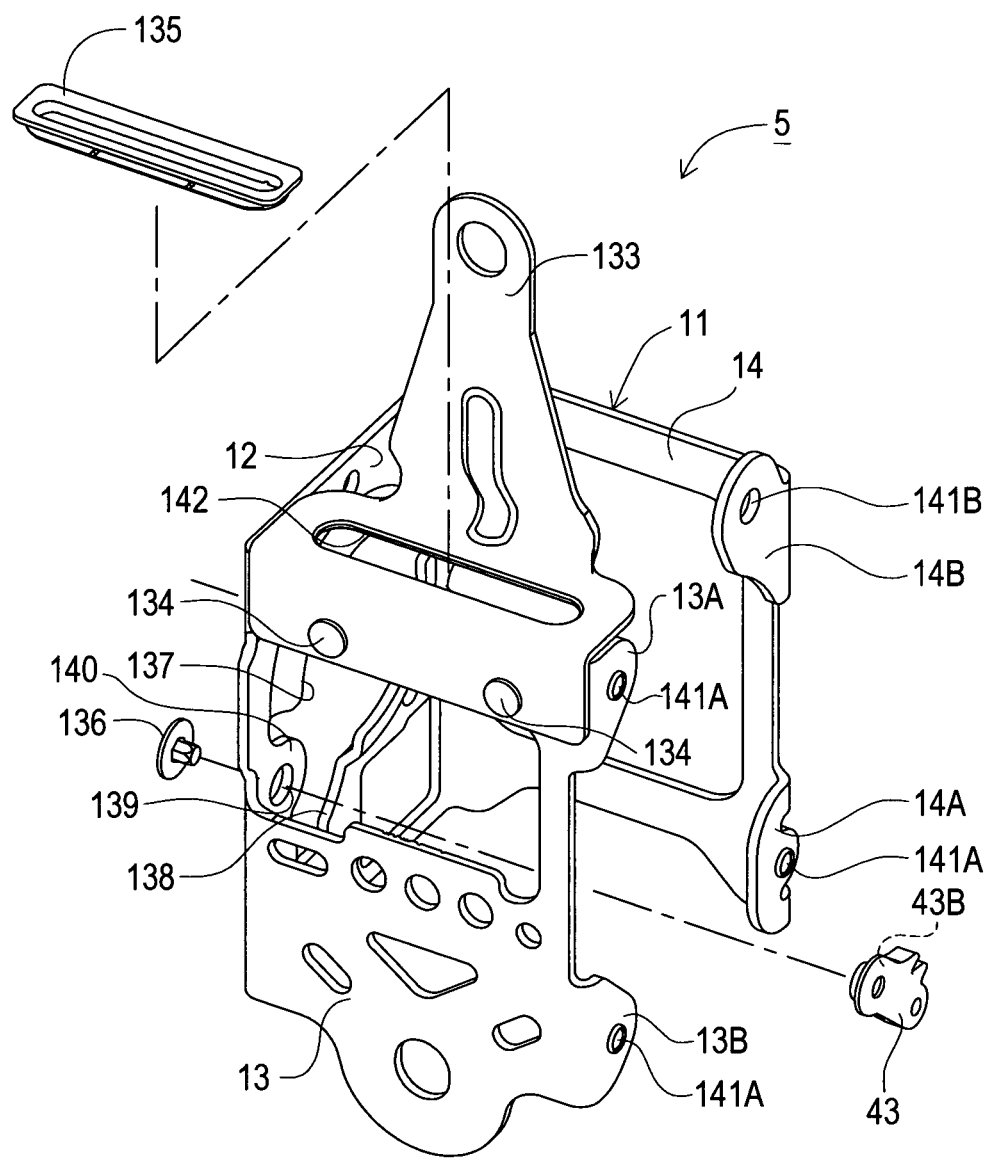
FIG. 9 is an exploded perspective view of a housing unit.

FIG. 9 is an exploded perspective view of the housing unit 5. FIG. 10 is a side view showing the seatbelt retractor 1 with the locking unit 9 removed therefrom.

Figure 10:
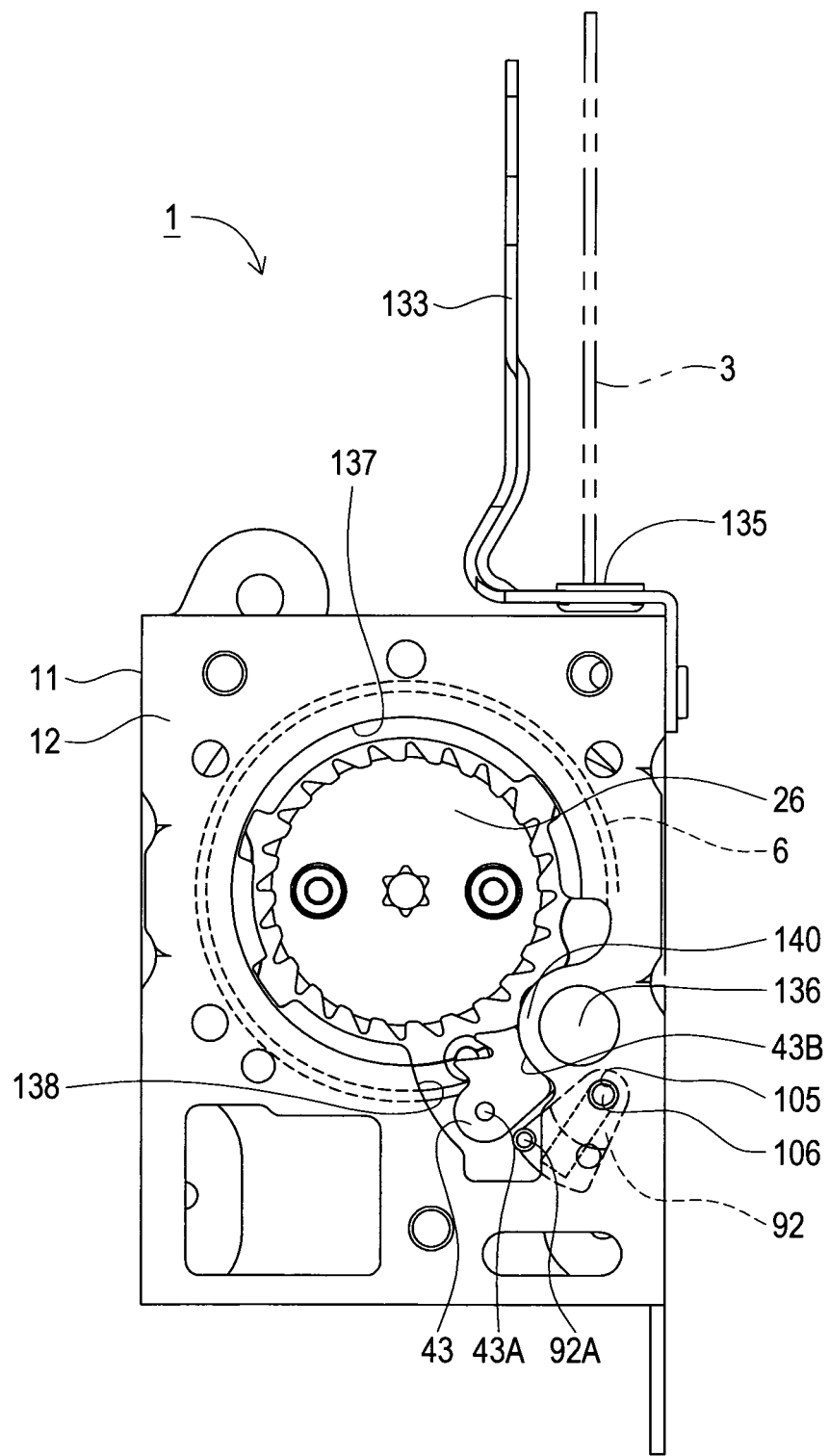
FIG. 10 is a side view showing the seatbelt retractor with the locking unit removed therefrom.

As shown in FIG. 9 and FIG. 10, the housing unit 5 is made of a housing 11, a bracket 133, a protector 135, a pawl 43 and a pawl rivet 136.

The housing 11 is made of a steel material or the like and is formed to have a substantially U-shape in plain view. In a back-side side wall portion 12 of the housing 11, there is formed a through hole 137 allowing for insertion of a tip end portion of the ratchet gear 26 in the take-up drum unit 6. A notch portion 138 is formed at an oblique lower side of the through hole 137 at a portion facing the pawl 43 so that the pawl 43 rotates smoothly. A through hole 139 is formed at the side of the notch portion 138 for mounting the pawl 43 in a rotatable fashion.

A semicircle-shaped guiding portion 140 is formed concentrically with the through hole 139 at a portion of the notch portion 138 which comes in contact with the pawl 43. The portion of the pawl 43 which comes in contact with and moves along the guiding portion 140 is formed to have approximately the same height as the thickness of the side wall portion 12. This portion has a stepped portion 43B which is recessed in a circular shape at a radius curvature which is the same as the side edge of the guiding portion 140 and is slightly higher than the thickness of the side wall portion 12. A guiding pin 43A is erected in a tip end portion of an outer side surface of the pawl 43. The guiding pin 43A is inserted in a guiding groove 202F of the clutch 202 constituting the locking unit 9 as will be described later.

Side plate portions 13 and 14 which are relatively opposite to each other extend from opposite edge portions of the side wall portion 12. Opening portions are respectively formed at a center part in the side plate portions 13 and 14 so as to reduce weight and improve efficiency of the webbing mounting operation. Screwed portions 13A, 13B, 14A and 14B are formed at the top and lower edge portions of the side plate portions 13 and 14, respectively. These screwed portions extend inwardly by a predetermined depth, substantially at a right angle with the respective plates. Screw holes 141A wherein the respective screws 15 are screwed are formed in the respective screwed portions 13A, 13B and 14A by extruding.

A bracket 133 mounted to the top edge portion of the side plate portion 13 by the respective rivets 134 is made of a steel material or the like. A horizontally long through hole 142 is formed at a portion extending from the top edge portion of the side plate portion 13 in an inward direction at a substantially right angle therewith, for pulling out the webbing 3 therefrom. A horizontally long frame-like protector 135 made of a synthetic resin such as nylon or the like is fitted inside the through hole 142.

The stepped portion 43B of the pawl 43 made up of a steel material or the like is brought in contact with the guiding portion 140 and is rotatably fixed by the rivet 136 which is inserted in a rotatable fashion from the outside of the side wall portion 12 into the through hole 139. The side surface of the pawl 43 and the side surface of the ratchet gear 26 are positioned so as to be substantially coplanar with the outside surface of the side wall portion 12.

As shown in FIG. 10, in case the pretensioner unit 7 is mounted to the housing unit 5 through the screws 15 and the stopper screws 16, the boss 106 of the mechanical arm 92 which is mounted to the bent portion formed at the other end of the coupling shaft 91 is fitted in a rotatable fashion in the through hole 105 formed in the side wall portion 12. The boss 106 is thus positioned in the vicinity of the lower side surface of the pawl 43 as positioned inside the notch portion 138. The boss 92A erected in the outer side surface of the mechanical arm 92 is inserted in the notch portion 138. The pawl 43 will be in the vicinity of the mechanical arm 92 without being engaged with the ratchet gear 26 in normal operation.

[Description of Operation of Forced Locking Mechanism and Pawl]

Next, the operation of the forced locking mechanism 53 and the pawl 43 when activated by the gas generating member 61 of the pretensioner mechanism 17 in case of a vehicle collision will be described based on FIG. 11 through FIG. 16.

Figure 11:
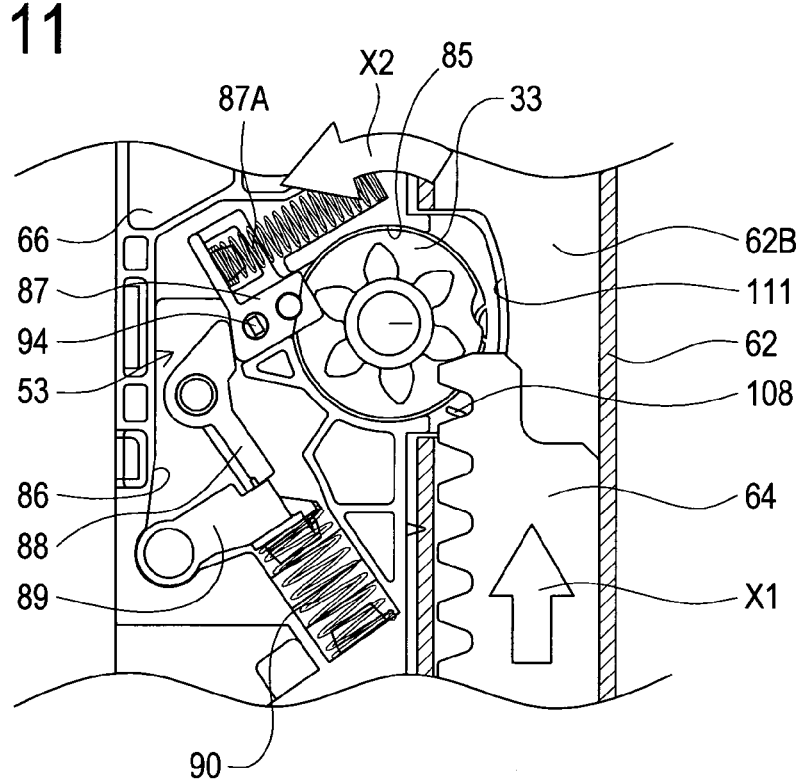
FIG. 11 is an explanatory diagram showing a state wherein a piston comes in contact with a pinion gear portion of a pinion gear body in response to activation of a gas generating member of the pretensioner mechanism.
Figure 12:
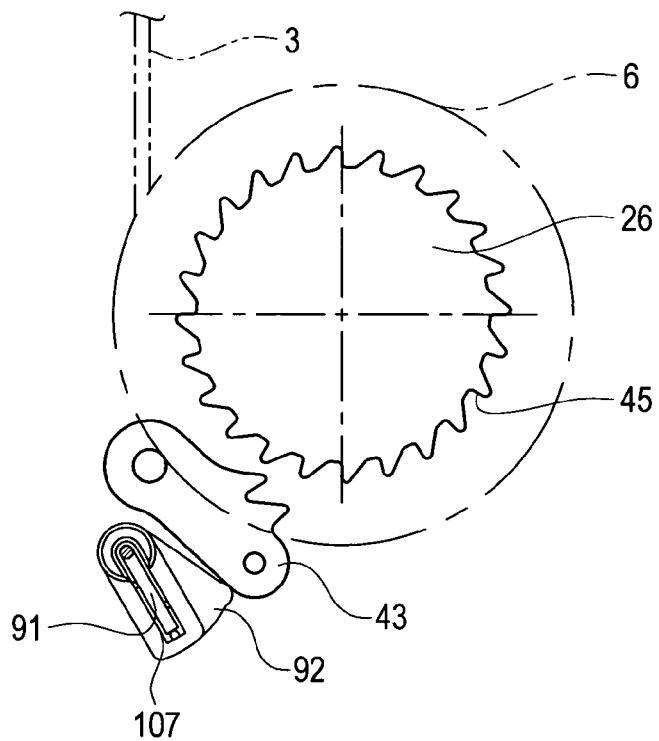
FIG. 12 is an explanatory diagram showing a pawl operation corresponding to FIG. 11.
Figure 13:
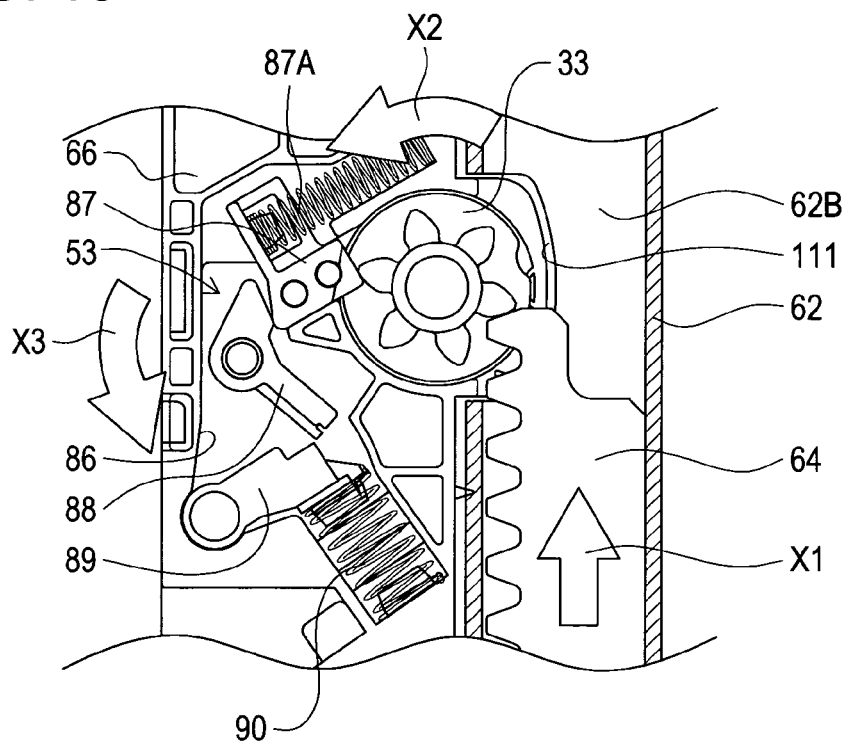
FIG. 13 is an explanatory diagram showing the moment that the piston is moved further and a lower end portion of a rotating lever is disengaged from a tip end portion of a gear-side arm.
Figure 14:
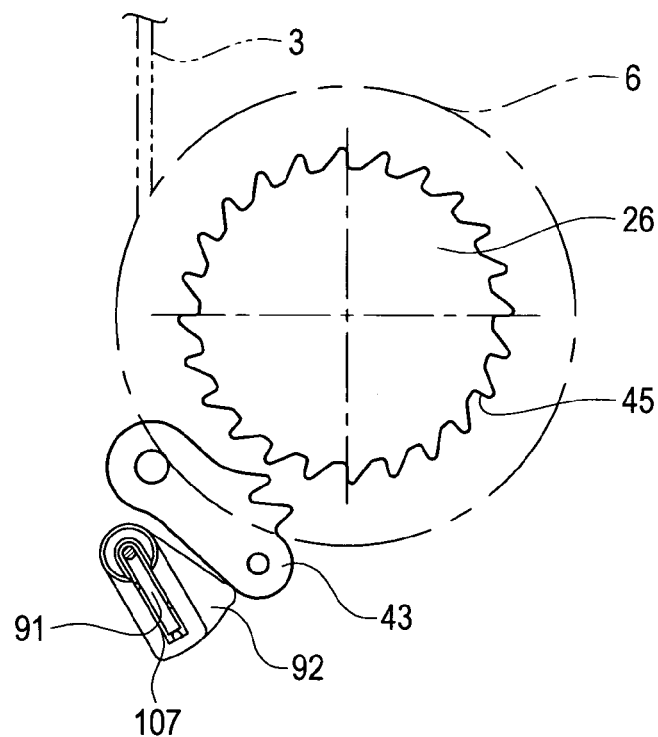
FIG. 14 is an explanatory diagram showing a pawl operation corresponding to FIG. 13.
Figure 15:
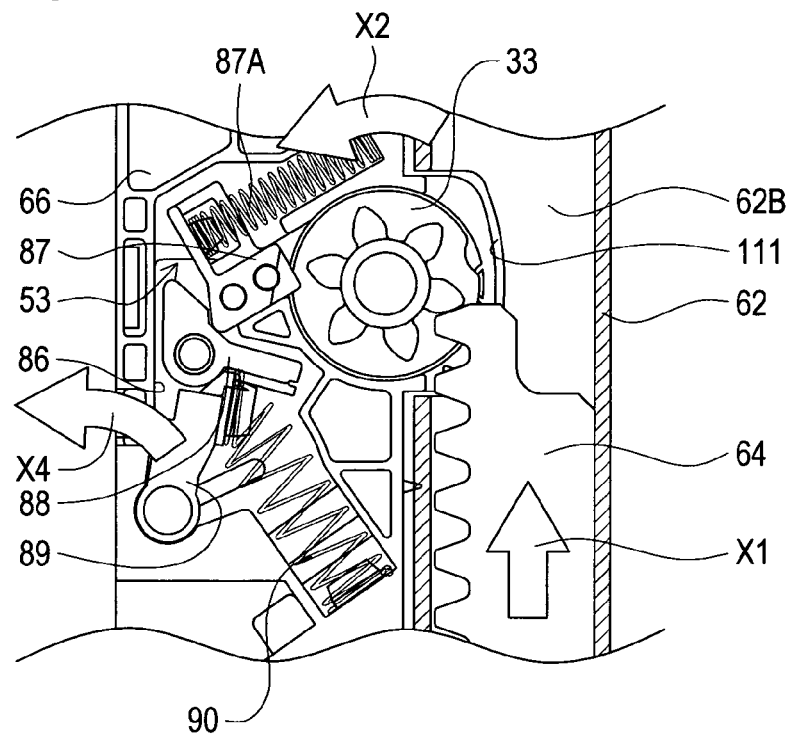
FIG. 15 is an explanatory diagram showing a state that the piston is moved further and the lower end portion of the rotating lever is disengaged from the tip end portion of the gear-side arm.
Figure 16:
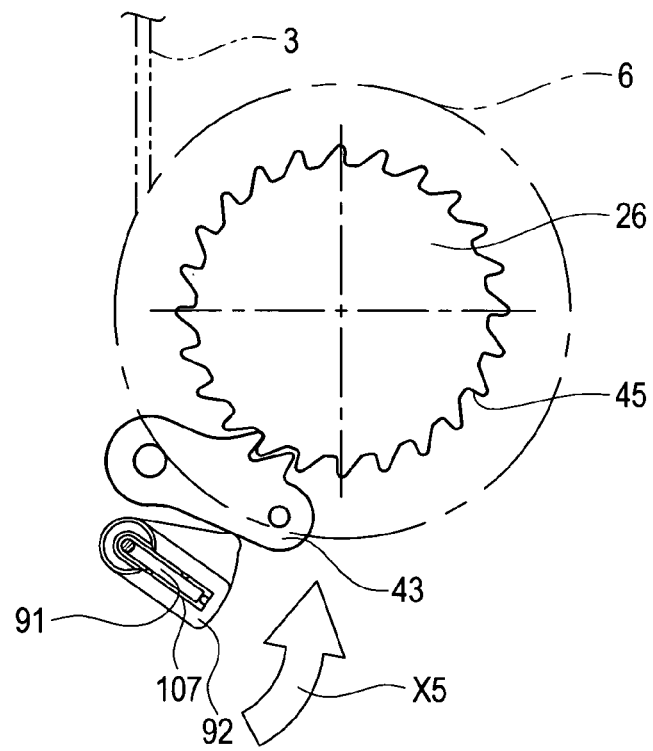
FIG. 16 is an explanatory diagram showing a pawl operation corresponding to FIG. 15.

FIG. 11 is an explanatory view showing the state wherein the piston 64 comes in contact with the pinion gear portion 71 of the pinion gear body 33 in response to the activation of the gas generating member in the pretensioner mechanism 17. FIG. 12 is an explanatory diagram showing the operation of the pawl 43 corresponding to FIG. 11. FIG. 13 is an explanatory diagram showing the moment that the piston is moved further and the lower end portion of the rotating lever 88 is disengaged from the tip end portion of the gear-side arm 89. FIG. 14 is an explanatory diagram showing the operation of the pawl 43 corresponding to FIG. 13. FIG. 15 is an explanatory diagram showing the state that the piston 64 is moved further and the lower end portion of the rotating lever 88 is disengaged from the tip end portion of the gear-side arm 89. FIG. 16 is an explanatory diagram showing the operation of the pawl 43 corresponding to FIG. 15.

As shown in FIG. 11, in case the gas generating member 61 of the pretensioner mechanism 17 is activated in case of a vehicle collision or the like, the piston 64 inside the piston housing portion 62B of the pipe cylinder 62 shears the rack locking pin 108 from a normal state as shown in FIG. 7 and moves upwards (direction arrow X1) so as to come in contact with the teeth of the pinion gear portion 71 in the pinion gear body 33. Thus, the pinion gear body 33 which is rotatably supported by the base plate 65 and the cover plate 57 starts rotating in a counter-clockwise direction in front view (direction of arrow X2).

Accordingly, the clutch mechanism 68 which is integrally fixed to the pinion gear body 33 starts rotating as well. The push block 87 is stopped by the positioning projection 94 erected in a bottom surface of the base block body 66 until the teeth of the pinion gear portion 71 come in contact with the end portion of the push block 87 on the pinion gear body 33 side constituting the forced locking mechanism 53 installed inside the concave portion 86 of the base block body 66. As the push block 87 does not depress the top end portion of the rotating lever 88, the rotating lever 88 and the gear-side arm 89 are positioned at the normal position.

As shown in FIG. 12, the lower end portion of the rotating lever 88 is in contact with the tip end portion of the gear-side arm 89, which will prevent rotation of the mechanical arm 92 coupled to the gear-side arm 89 through the coupling shaft 91. Thus, the pawl 43 is positioned in a normal position, i.e., away from the ratchet gear portion 45 of the ratchet gear 26. Specifically, the pawl 43 is not engaged with the ratchet gear portion 45 of the ratchet gear 26.

Next, as shown in FIG. 13, if the piston 64 is further moved inside the pipe cylinder 62 and the pinion gear body 33 is caused to rotate in a counter-clockwise direction in front view (direction of arrow X2), the clutch mechanism 68 which is integrally fixed to the pinion gear body 33 is further rotated. Thus, the positioning projections 77A of the pawl guide 77 constituting the clutch mechanism 68 are sheared from the outside surface of the pawl guide 77, thereby the clutch mechanism 68 and the pinion gear body 33 are caused to start rotating together in response to movement of the piston 64.

Simultaneously with the upward movement of the piston 64, the push block 87 is depressed against the teeth of the pinion gear portion 71 to move in an outer direction (leftward direction in FIG. 13), thereby the positioning projection 94 erected in the bottom surface of the base block body 66 is sheared. The push block 87 is depressed in an outward direction by the block urging spring 87A to come in contact with the top end portion of the rotating lever 88 and depress the lever in an outward direction. Thus, the rotating lever 88 is depressed against the push block 87 and rotates in a counter-clockwise direction in plain view (direction of arrow X3). As a result, the lower end portion of the rotating lever 88 moves towards the tip end portion of the gear-side arm 89.

As shown in FIG. 14, the mechanical arm 92 coupled to the gear-side arm 89 through the coupling shaft 91 is prevented from rotating until the lower end portion of the rotating lever 88 is disengaged from the tip end portion of the gear-side arm 89. Thus, the pawl 43 is positioned in a normal state, i.e., away from the ratchet gear portion 45 of the ratchet gear 26. Specifically, the pawl 43 is not engaged with the ratchet gear portion 45 of the ratchet gear 26.

Then, as shown in FIG. 15, the piston 64 is moved further inside the pipe cylinder 62 so as to cause the pinion gear body 33 to rotate in a counter-clockwise direction in front view (direction of arrow X2). As the top end portion of the rotating lever 88 is further depressed by the push block 87 which was depressed by the block urging spring 87A, the lower end portion of this rotating lever 88 is disengaged from the tip end portion of the gear-side arm 89.

The gear-side arm 89 is depressed in an outward direction by the urging spring 90 and rotated in a counter-clockwise direction in front view (direction of arrow X4). The push block 87 is depressed in an outward direction by the block urging spring 87A to be kept disengaged from the pinion gear portion 71 of the pinion gear body 33 and makes the top end portion of the rotating lever 88 kept in contact with the internal wall surface of the concave portion 86.

As shown in FIG. 16, in case the lower end portion of the rotating lever 88 is disengaged from the tip end portion of the gear-side arm 89, this gear-side arm 89 is rotated in a counter-clockwise direction in front view (direction of arrow X4). This will cause the coupling shaft 91, with the bent portion formed at one end thereof being inserted inside the groove 97 of the gear-side arm 89, to rotate in a counter-clockwise direction as seen from a front view around a center axis (direction of arrow X4).

As the bent portion at the other end portion of the coupling shaft 91 is inserted in the groove portion 107, the mechanical arm 92 is rotated in a counter-clockwise direction as seen from a front view (direction of arrow X5) in response to rotation of the gear-side arm 89. This causes the pawl 43 to engage the ratchet gear portion 45 of the ratchet gear 26. The pawl 43 and the ratchet gear portion 45 of the ratchet gear 26 are engaged so as to restrain rotation of the take-up drum unit 6 in the webbing-pull-out direction and allow rotation in the retracting direction of the webbing 3.

Accordingly, in case the pawl 43 and the ratchet gear portion 45 of the ratchet gear 26 are engaged, a locking operation is carried out to restrain rotation of the take-up drum unit 6 in a pull out direction of the webbing 3, and rotation in the retracting direction of the webbing 3 is allowed. Thus, the pawl 43 can restrain rotation of the take-up drum unit 6 in a pull out direction of the webbing 3 before the clutch mechanism 68 and the pinion gear body 33 start rotating together.

After rotation of the pinion gear body 33 is stopped following activation of the pretensioner mechanism 17, the lower end portion of the rotating lever 88 is kept away from the tip end portion of the gear-side arm 89, as shown in FIG. 15. After the pretensioner mechanism 17 has been activated, the pawl 43 and the ratchet gear portion 45 of the ratchet gear 26 are kept engaged. Thus, the ratchet gear 26 and the wire plate 25 of the take-up drum unit 6 are restrained from rotating in the pull out direction of the webbing 3.

Next, the operation of the pretensioner in case of vehicle collision will be described based on FIG. 17 through FIG. 29. The description will focus on the configuration/construction of the mechanism and its operation and effects.

[Configuration of Peripherals Including Pretensioner Unit]

Figure 17:
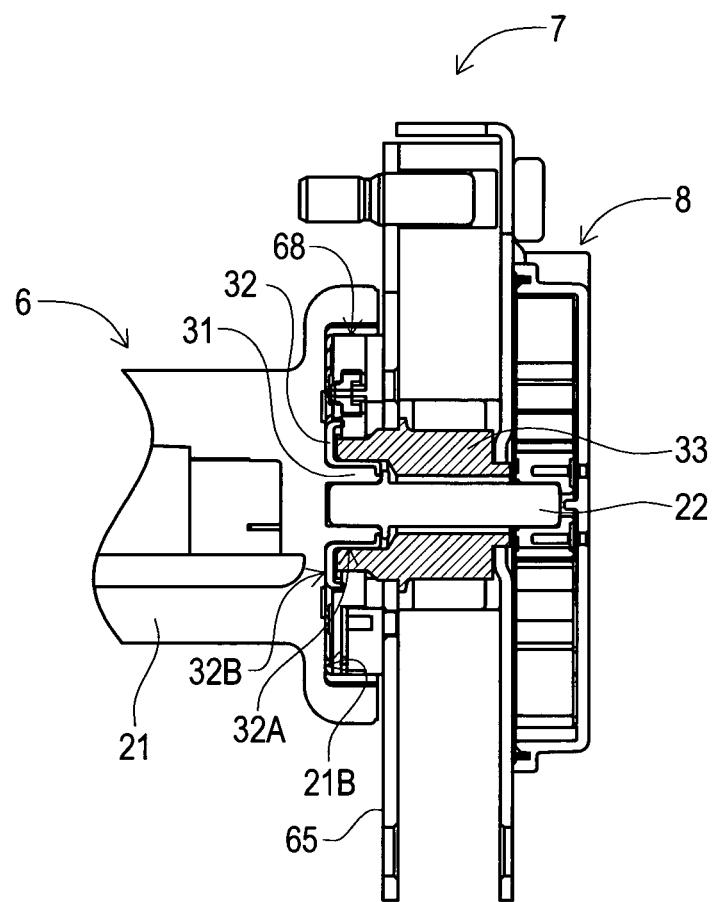
FIG. 17 is a partial sectional view showing a configuration wherein the take-up drum unit and the take-up spring unit are coupled with the pretensioner unit placed thereinbetween.

FIG. 17 is a partial cross-sectional view showing a configuration wherein the take-up drum unit 6 and the take-up spring unit 8 are coupled with the pretensioner unit 7 placed therebetween. FIG. 17 represents a view of the cross sectional diagram in FIG. 4 as seen from a back side.

As shown in FIG. 17, the guiding drum 21 is coupled coaxially with the take-up spring unit 8 through the drum shaft 22. The guiding drum 21 is always urged in a retracting direction of the webbing 3 by the take-up spring unit 8.

From the pretensioner unit 7, the ratchet mechanism 68 provided so as to protrude from the base plate 65 is stored inside the drum concave portion 21B in the guiding drum 21. A bearing 32 is provided in a freely sliding fashion between the guiding drum 21 and the pinion gear body 33. The bearing 32 has a cylindrical portion 32A which has a cylinder shape and a flanged end portion 32B provided at one end thereof and extending in the direction of the outer diameter. The bearing 32 is mounted in a freely rotating fashion between the guiding drum 21 and the pinion gear body 33.

More specifically, the inner surface of the cylindrical portion 32A and the lower surface of the flanged end portion 32B of the bearing 32 come in contact in a freely rotating fashion with the outside surface of the mounting boss 31 of the guiding drum 21 and the bottom surface of the drum concave portion 21B provided in the outside surface of the mounting boss 31. The outside surface of the cylindrical portion 32A and the top surface of the flanged end portion 32B of the bearing 32 come in contact with the inner surface and tip end portion of the pinion gear body 33 in a freely rotating fashion.

In the pretensioner unit 7, the pinion gear body 33 and the clutch mechanism 68 are in contact with the guiding drum 21 through the bearing 32 in a freely rotating fashion. As a result, the rotation of the guiding drum 21 responsive to the pull out and retracting operation of the webbing 3 is not restrained, in normal operation, by the pinion gear body 33 and the clutch mechanism 68 of the pretensioner unit 7.

Figure 18:
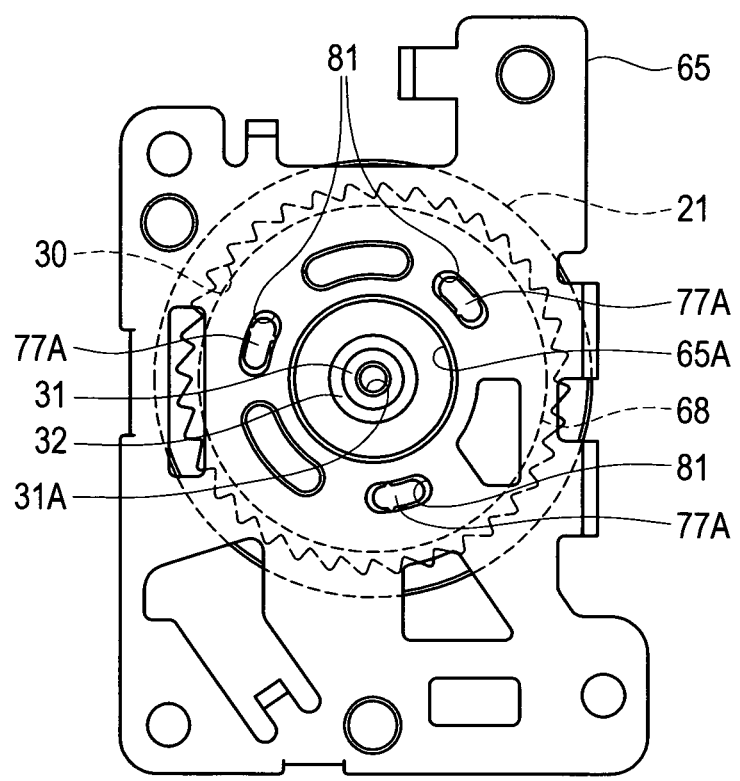
FIG. 18 is a plain view for describing a relationship between a guiding drum, a clutch mechanism and a base plate.

FIG. 18 is a plain view of the seatbelt retractor 1 as seen from the take-up spring unit 8 side. To describe the relationship between the guiding drum 21, the clutch mechanism 68 and the base plate 65, the constituting members of the pretensioner unit 7, excluding the clutch mechanism 68 and the base plate 65, the take-up spring unit 8 and the drum shaft 22 will be omitted. To show the relationship between these members, a part or all these members are shown in a see-through state (shown by a broken line), as necessary.

As shown in FIG. 18, the clutch mechanism 68 is mounted coaxially with the guiding drum 21. This is because the clutch mechanism 68 is coaxially coupled with the pinion gear body 33 through the opening 65A of the base plate 65, and is rotatably supported by the inner surface of the pinion gear body 33 and the outer surface of the mounting boss 31 through the bearing 32.

The clutch gear 30 is engraved towards the shaft center on an inner peripheral edge portion constituting the drum concave portion 21B of the guiding drum 21. As will be described later, the clutch pawl 29 housed in the clutch mechanism 68 protrudes in a pretensioner-activated state. The protruding clutch pawl 29 engages the clutch gear 30 and the guiding drum 21 is caused to rotate in the retracting direction of the webbing 3.

At a face of the clutch mechanism 68 which comes in contact with the base plate 65, there is provided a positioning projection 77A which engages the positioning hole 81 formed in the base plate 65. As a result, the clutch mechanism 68 and the base plate 65 are fixed so that relative rotation thereof is disabled in normal operation.

As will be described later, the positioning projection 77A is formed in the pawl guide 77 constituting the clutch mechanism 68. At an initial stage in normal operation and in case of a vehicle collision, the pawl guide 77 is fixed in the base plate 65 so that relative rotation thereof with respect to the base plate 65 is disabled.

When the piston 64 is depressed and driven in case of vehicle collision, the pinion gear body 33 is caused to rotate and the pawl base 76 will be relatively rotated with respect to the pawl guide 77. The clutch pawl 29 protrudes outwardly in response to this rotary motion. The driving force is maintained after the clutch pawl 29 protrudes, which means that this driving force is also applied to the pawl guide 77. Once the pawl guide 77 fails to resist this driving force, the positioning projection 77A will fracture. Thereafter, the clutch mechanism 68 becomes integral and the guiding drum 21 is caused to rotate, which in turn will result in a webbing 3 retracting operation.

An opening portion 31A is provided coaxially in the mounting boss 31 of the guiding drum 21. The drum shaft 22 is then press-fitted in this opening portion 31A.

[Description of Mechanism of Pretensioner Operation]

Figure 19:
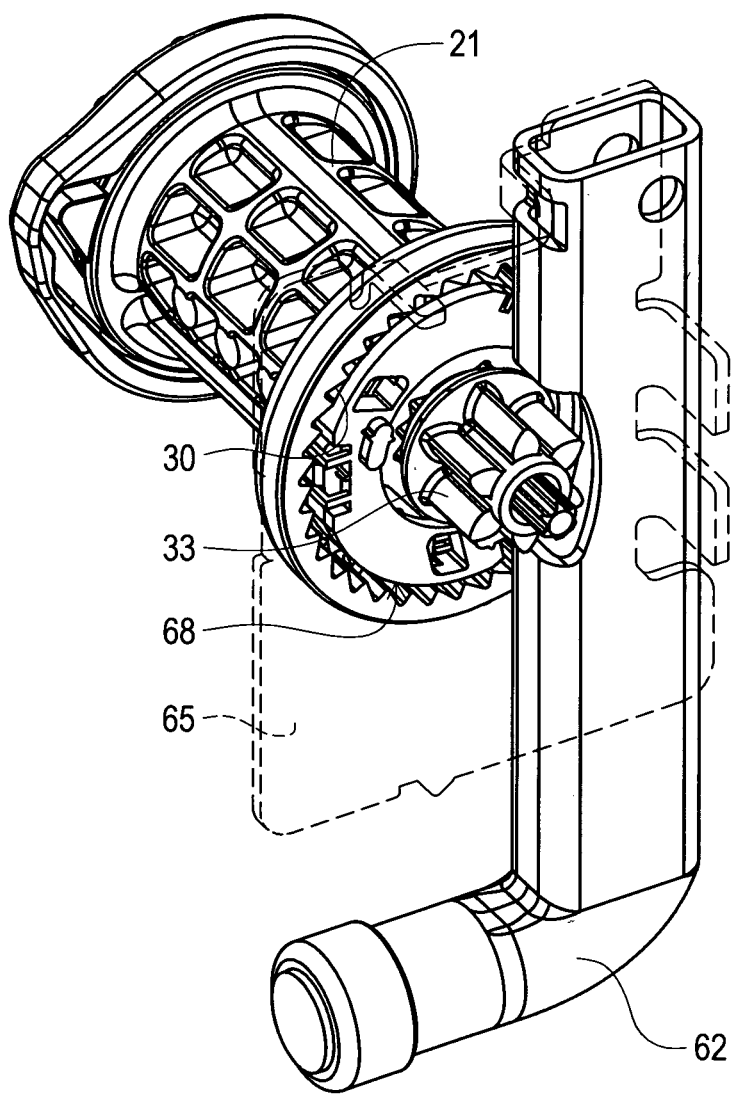
FIG. 19 is a perspective view for describing the mechanism of a pretensioner operation.
Figure 20:
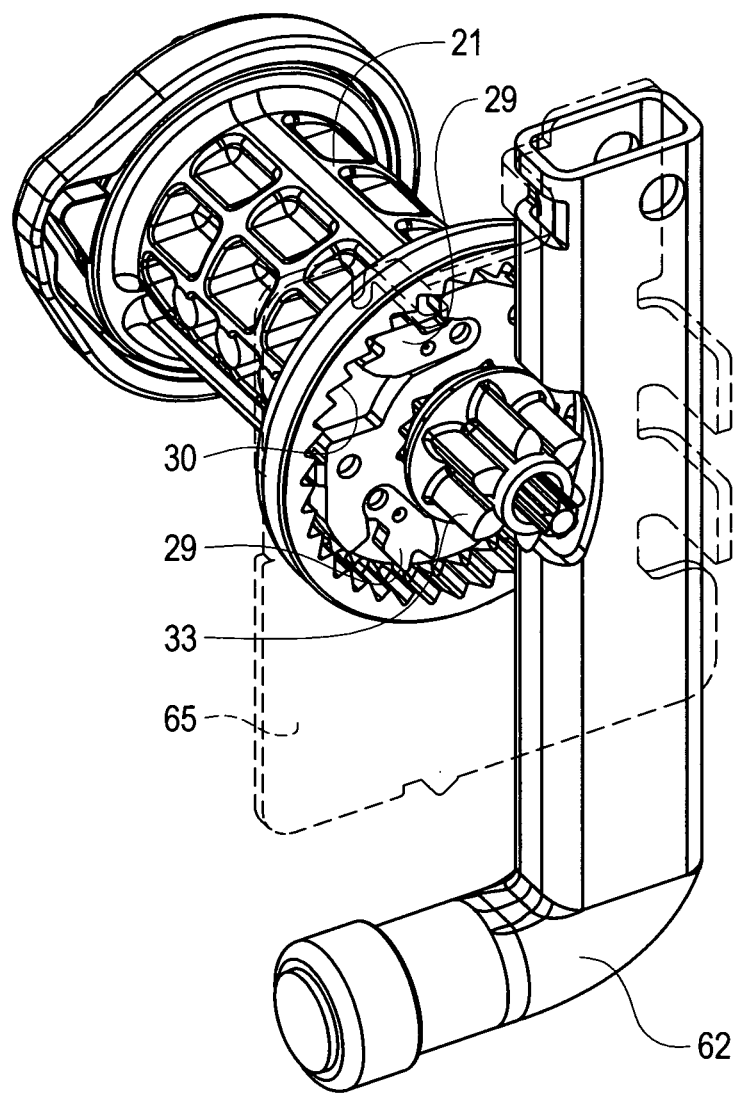
FIG. 20 is a perspective view for describing the mechanism of the pretensioner operation.

FIG. 19 and FIG. 20 are perspective views showing the webbing 3 retracing operation carried out in the pretensioner unit 7 in case of vehicle collision, i.e., these are perspective views to show the configuration of the pretensioner operation. To describe the configuration relating to the pretensioner operation, the constituting elements will be partially omitted. More specifically, from the members constituting the pretensioner unit 7, the clutch mechanism 68, the pinion gear body 33 and the pipe cylinder 62 will be left, while the rest of the members will be omitted. Here, the base plate 65 will be shown by a dotted line. The take-up spring unit 8 will be omitted as well.

As shown in FIG. 19 and FIG. 20, the clutch mechanism 68 which is coupled with the pinion gear body 33 with the base plate 65 placed therebetween, is housed in the drum concave portion 21B of the guiding drum 21. Thus, the clutch mechanism 68 is installed so that a side surface thereof faces the clutch gear 30 of the guiding drum 21. When the pretensioner is activated, the pinion gear body 33 rotates in response to the gas pressure inside the pipe cylinder 62. The clutch pawl 29 housed inside the clutch mechanism 68 protrudes outwardly from the side surface of the clutch mechanism 68 in response to rotation of the pinion gear body 33 as driven by depressing of the piston 64. The protruding clutch pawl 29 engages the clutch gear 30, then the guiding drum 21 is caused to rotate in the retracting direction of the webbing 3.

Here, a plurality of clutch pawls 29 are installed, as shown in FIG. 20. As will be described later in FIG. 21 and FIG. 22, three clutch pawls 29 are provided and get engaged with the clutch gear 30 of the guiding drum 21 at three locations. Thus, the clutch pawls 29 can evenly engage the clutch gear 30 formed at the peripheral edge portion of the drum concave portion 21B in the guiding drum 21, which enables the pinion gear body 33 to transmit its driving force to the guiding drum 21.

[Configuration of Clutch Mechanism]

Figure 21:
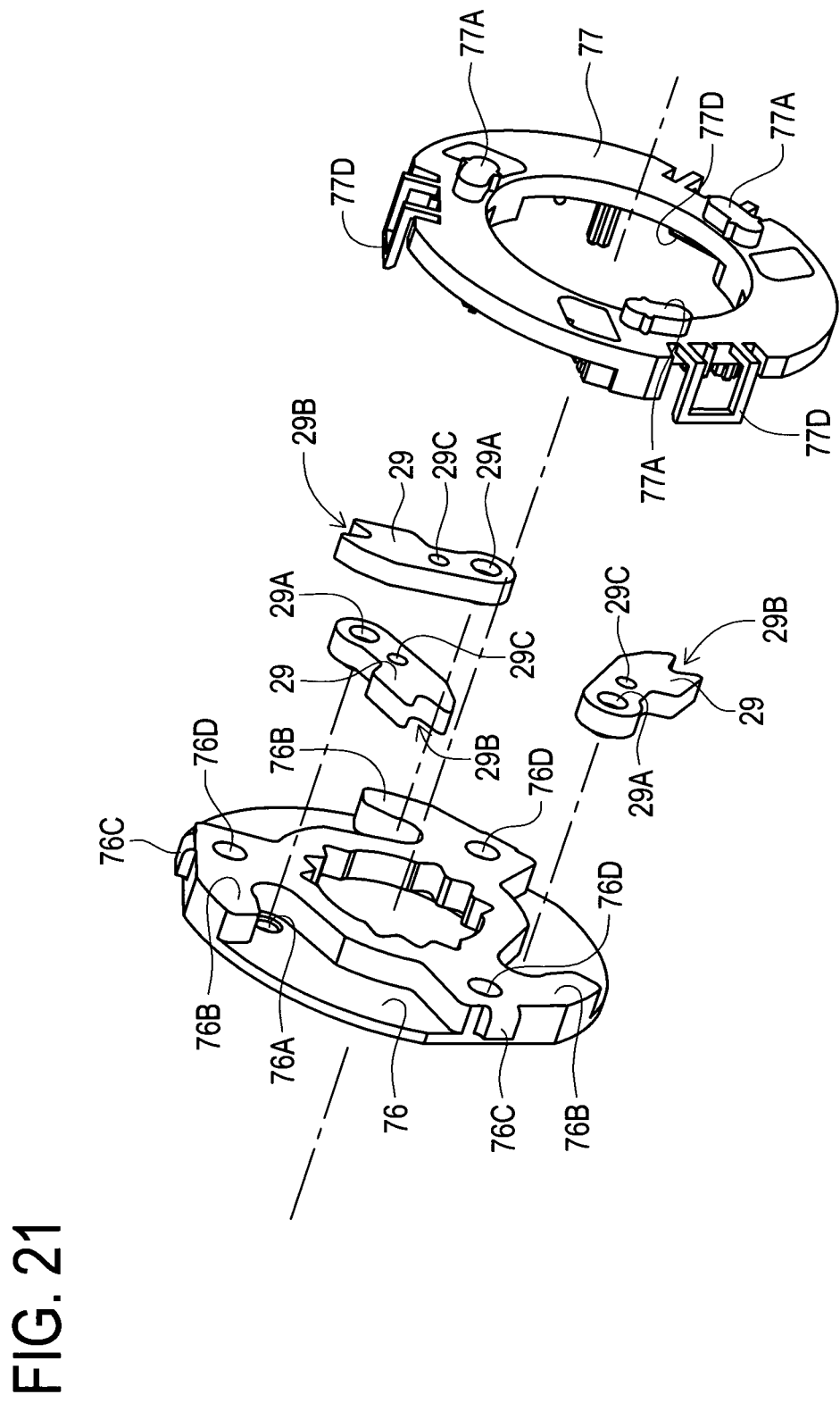
FIG. 21 is an exploded perspective view showing a configuration of the clutch mechanism.
Figure 22:
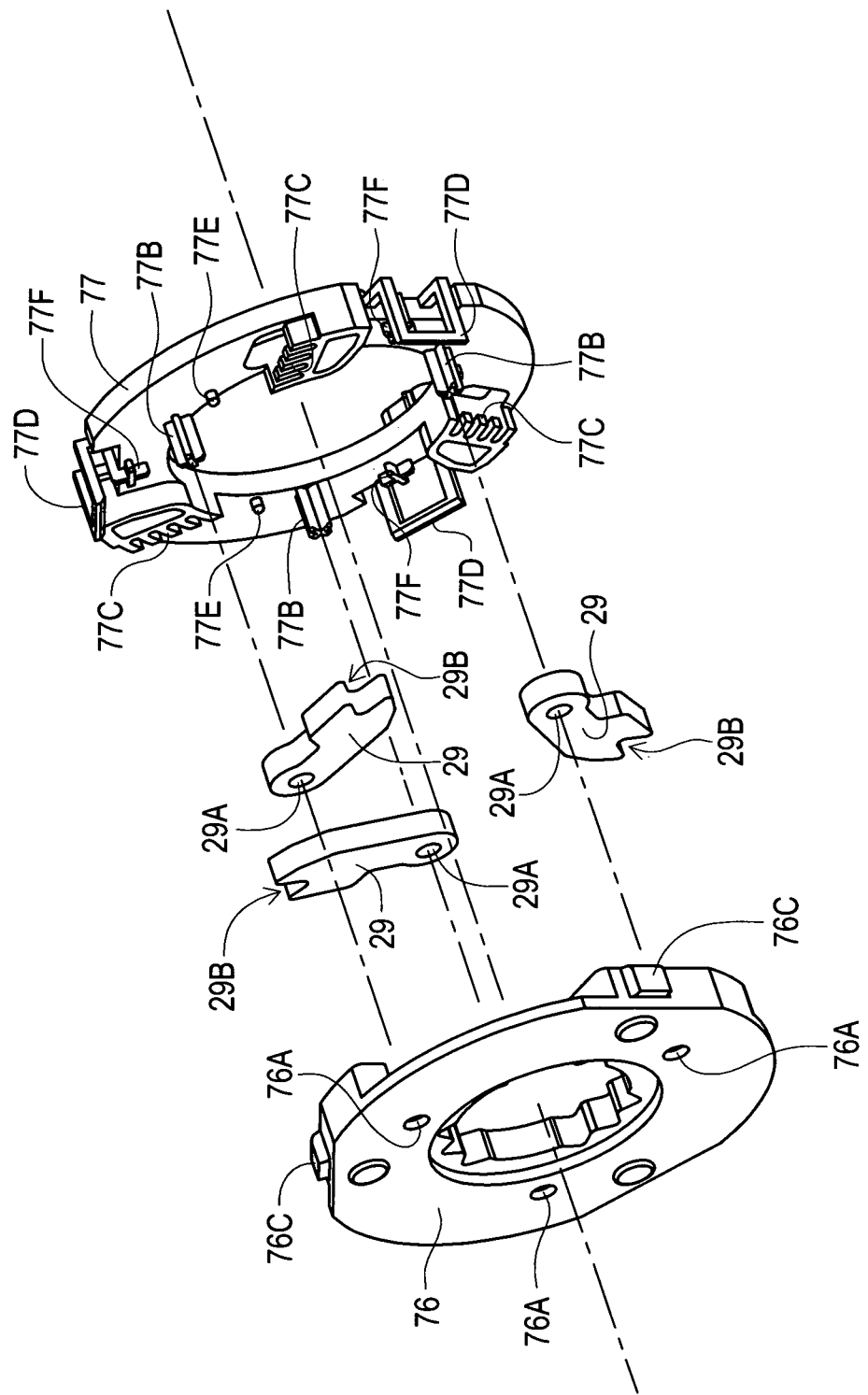
FIG. 22 is an exploded perspective view showing a configuration of a clutch mechanism.

FIG. 21 and FIG. 22 are exploded perspective view showing the configuration of the clutch mechanism 68. FIG. 21 is an exploded perspective view as seen from the take-up spring unit 8 side. FIG. 22 is an exploded perspective view as seen from the take-up drum unit 6 side.

As shown in FIG. 21 and FIG. 22, the clutch mechanism 68 is comprised of the pawl base 76, clutch pawls 29 and the pawl guide 77.

A through hole 29A is opened in the bottom end portion of each clutch pawl 29, and will be press-fitted in a cross-bars projection 77B erected in the pawl guide 77. The cross-bars projection 77B is formed so that one bar of the cross-bars is longer than the diameter of the through hole 29A of the clutch pawl 29. This will help restrain the rotation of the clutch pawl 29 in a press-fitted state. In each clutch pawl 29, the side of the through hole 29A which faces the pawl guide 77 is subjected to a chamfering process. Also, in place of the chamfering process of the through hole 29A or together with this chamfering process, the cross-bars projection 77B may be formed so that one bar of the cross-bars are shorter at the tip end portions thereof, or alternatively, the tip end portions are formed thinner as compared to the other portions. As a result, the press-fitting operation can be carried out smoothly.

A concave portion 29C is provided at an intermediate position between the through hole 29A and the engagement tooth 29B in each clutch pawl 29 and a projection 77E is erected at a corresponding position in the pawl guide 77. The projection 77E and the concave portion 29C are engaged, with the clutch pawl 29 being press-fitted to the cross-bars projection 77B. The arrangement position of the concave portion 29C and the projection 77E has the effect of determining the rotating position of each clutch pawl 29 which is press-fitted in the cross-bars projection 77B. This configuration is for positioning each clutch pawl 29 press-fitted in the cross-bars projection 77B at a storing position. Due to the engagement between the concave portion 29C and the projection 77E and the through hole 29A being press-fitted in the cross-bars projection 77B, each clutch pawl 29 is prevented from rotating from the storing position in normal operation and the engagement tooth 29B is prevented from protruding outside.

Each guiding portion 77C is provided close to the inner side of each clutch pawl 29 on the pawl guide 77. At an initial stage when the pretensioner unit 7 is activated, rotation of the pawl guide 77 is disabled. This is because the positioning projections 77A are engaged with the base plate 65. In this state, the pawl base 76 rotates. In response to this rotation, the clutch pawls 29 depressed by the pawl support block 76B move in a rotating direction, while fracturing the cross-bars projections 77B and the projections 77E. The side faces on the inner side of the moved clutch pawls 29 are depressed against the guiding portions 77C. As the pawl base 76 rotates ever further, the clutch pawls 29 are depressed in the pawl support blocks 76B and the guiding portions 77C. As a result, the clutch pawls 29 are slidably guided outwardly along the guiding portion 77C and protrude from the pawl base 76 outwardly.

Through holes 76A are provided in the pawl base 76. Here, the projecting amount of the cross-bars projections 77B is formed to be longer than the thickness of the clutch pawls 29. Once the clutch pawls 29 are press-fitted in the cross-bars projections 77B, the tip end portion of the cross-bars projections 77B will protrude from an opposite side of the through holes 29A of the clutch pawls 29. When the pawl guides 77 and the pawl base 76 are coupled, the portions of the cross-bars projections 77B which protrudes from the clutch pawls 29 engage the through holes 76A.

The pawl supporting blocks 76B of enough thickness are provided so as to surround the insertion holes 76A at an outer diameter side of the pawl base 76. The pawl supporting blocks 76B are provided so as to receive the load which is in turn received by the clutch pawls 29 when the clutch pawls 29 depress and drive the guiding drum 21.

The clutch pawls 29 each have an engagement tooth 29B provided at a tip end portion thereof to engage with the clutch gear 30. In the present embodiment, three clutch pawls 29 are provided. When the guiding drum 21 is depressed and driven for activation of the pretensioner, the load for driving the guiding drum 21 is dispersed, which makes it possible to achieve efficient pressure capabilities and load bearing capabilities.

In the pawl base 76, the engaging blocks 76C are formed at an outer diameter end of the pawl supporting blocks 76B. The concave portions 76D are opened close to the engagement blocks 76C, at one corner of the pawl supporting blocks 76B.

In the pawl guide 77, there are formed locking hooks 77D which engage the locking blocks 76C, and cross-bars projections 77F which engage the concave portions 76D, when the pawl guide 77 engages the pawl base 76.

Here, engagement between the locking blocks 76C and the locking hooks 77D is preferably so that the pawl base 76 is relatively rotatable with respect to the pawl guide 77 at an initial stage in the rotation of the pinion gear body 33. At an initial stage of this rotation, the pawl base 76 rotates with the pawl guide 77 kept in a rotation-disabled state and the clutch pawls 29 is caused to protrude. The cross-bars projections 77F which engage the concave portions 76D fracture in response to rotation of the pawl base 76.

Here, the pawl base 76 and the clutch pawls 29 are made of metallic members, and the pawl guide 77 is made of a resin member. The projecting operation of the clutch pawl 29, following the projecting operation of the clutch pawl 29, the integral rotating operation of the pawl guide 77 with the pawl base 76 can thus be carried out easily and reliably.

[Description of Pretensioner Operation]

Next, the pretensioner operation will be described based on FIG. 23 through FIG. 29.

Figure 23:
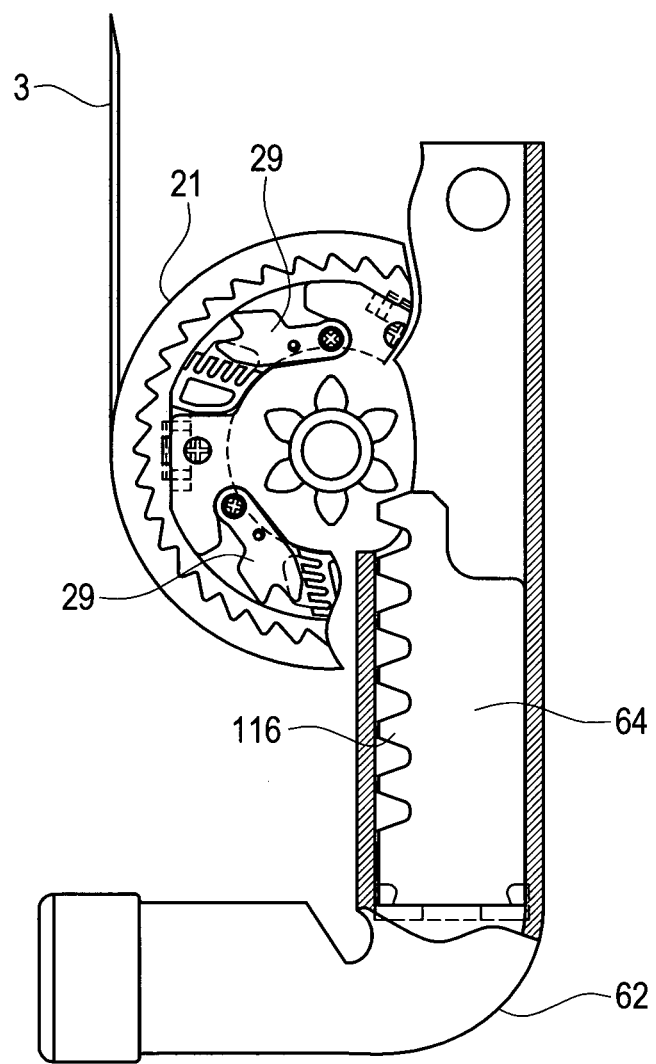
FIG. 23 is a view for describing a mechanism wherein the pretensioner operation is transmitted to the guiding drum (in normal operation)
Figure 25:
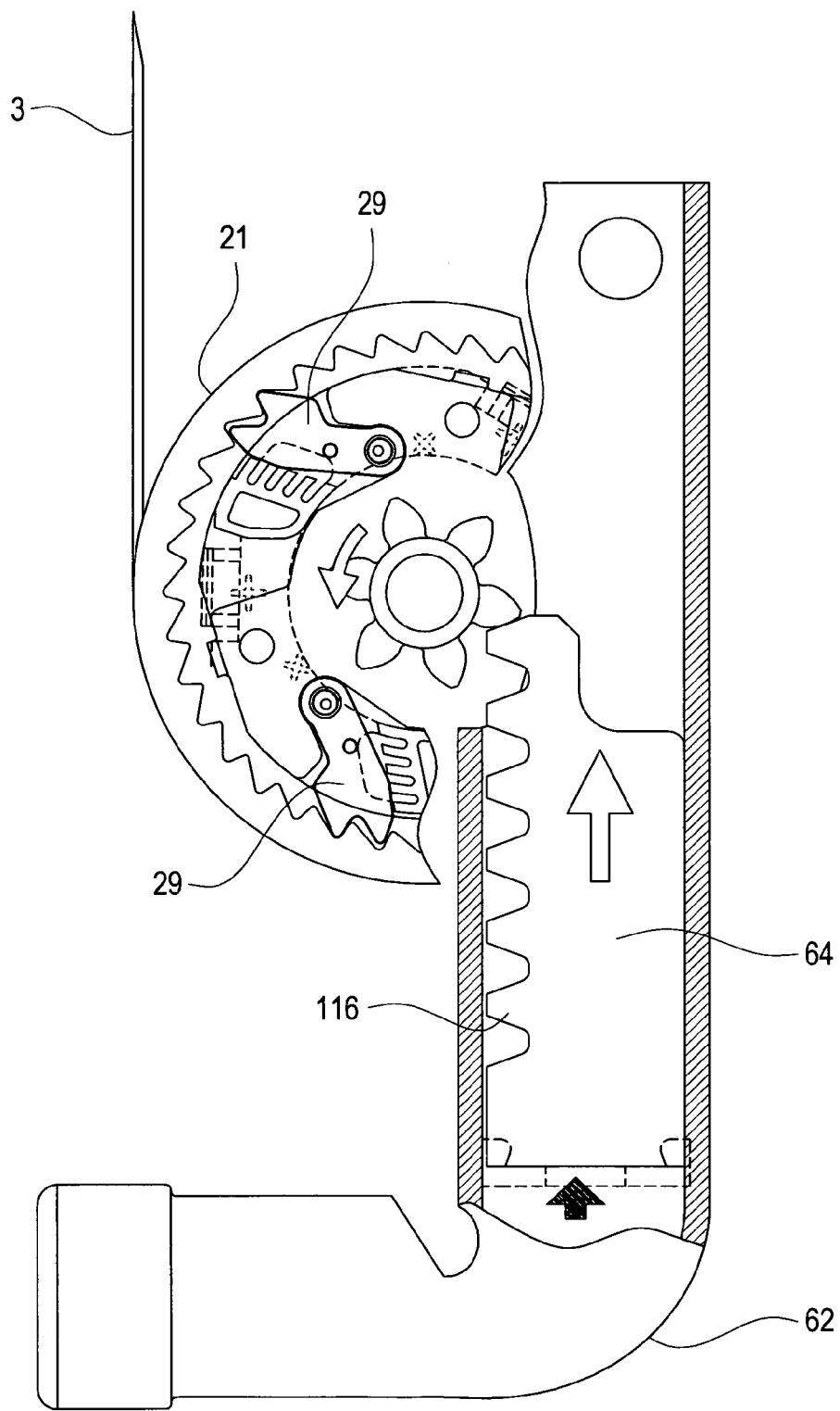
FIG. 25 is a view for describing a mechanism wherein the pretensioner operation is transmitted to the guiding drum (when engagement is initiated)
Figure 26:
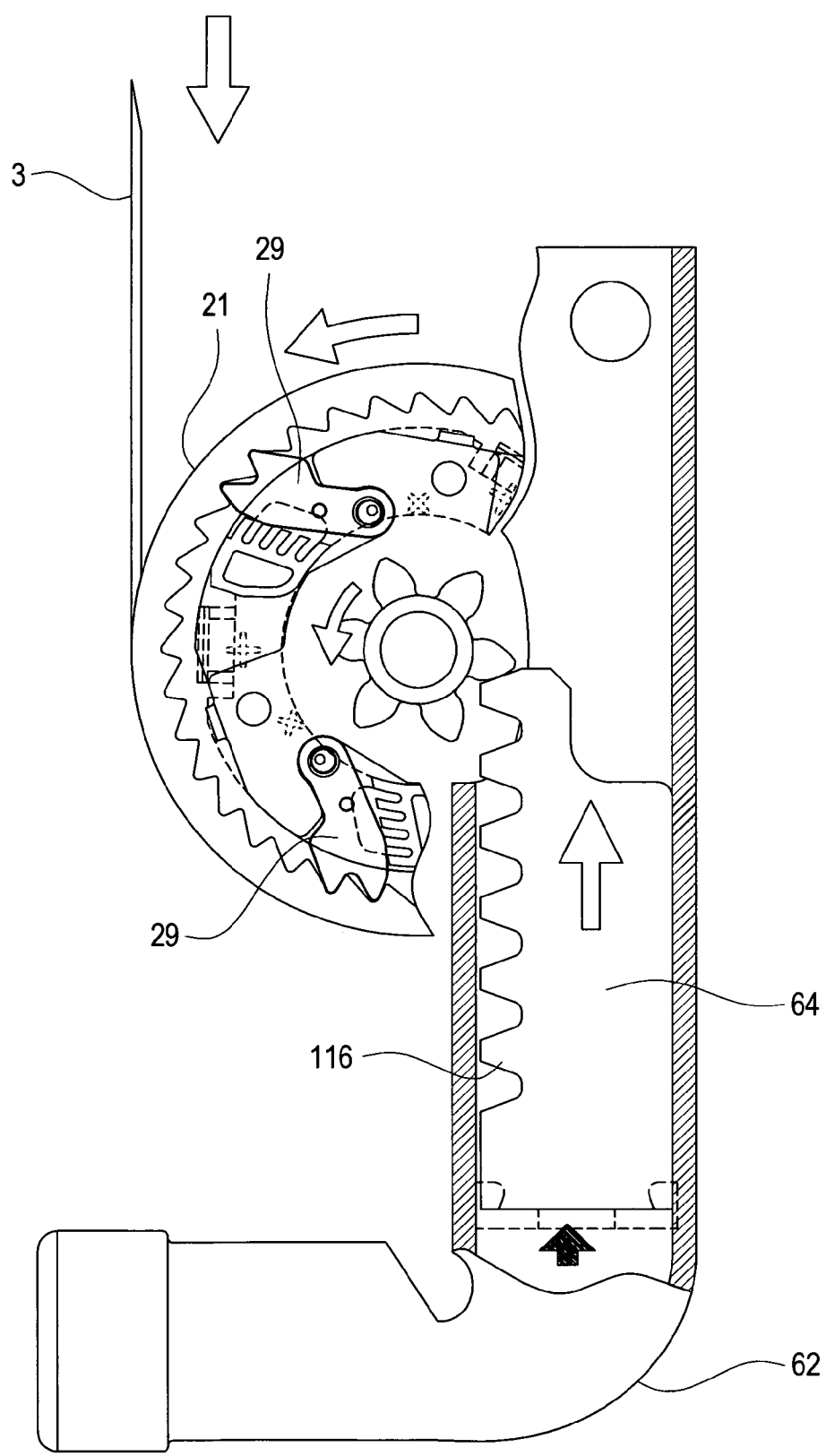
FIG. 26 is a view for describing a mechanism wherein the pretensioner operation is transmitted to the guiding drum (when engagement is completed)

FIG. 23, FIG. 25 and FIG. 26 show one part of the pipe cylinder 62 as a cross sectional view to describe the configuration wherein the pretensioner operation is transmitted to the guiding drum 21. The position where the piston 64 is arranged inside the pipe cylinder 62 will become apparent from these drawings. The drawings show the engaging state between the clutch pawls 29 and the guiding drum 21, excluding the base plate 65 and the pawl guide 77.

Figure 24:
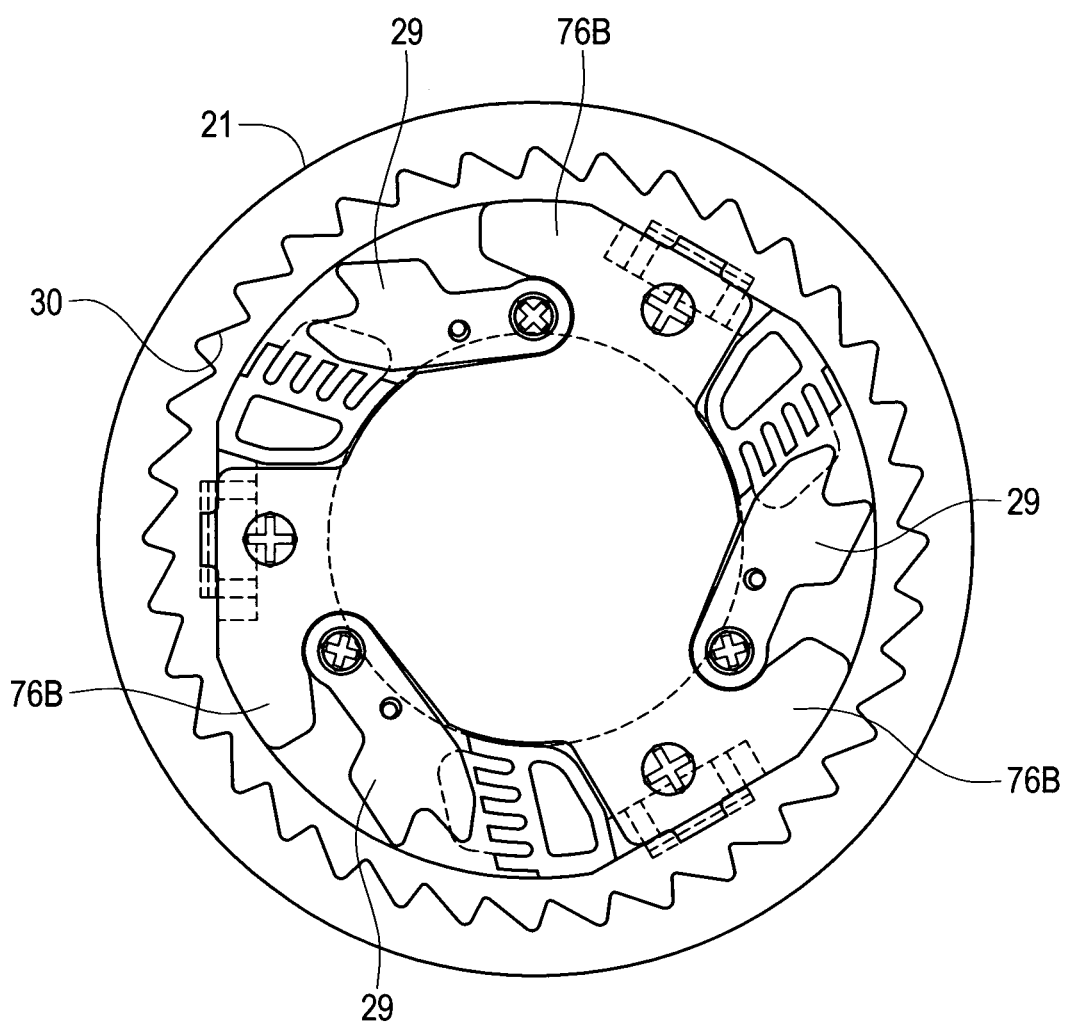
FIG. 24 is a partially enlarged view showing an engaged state between the clutch pawl and the guiding drum (when disengaged)
Figure 27:
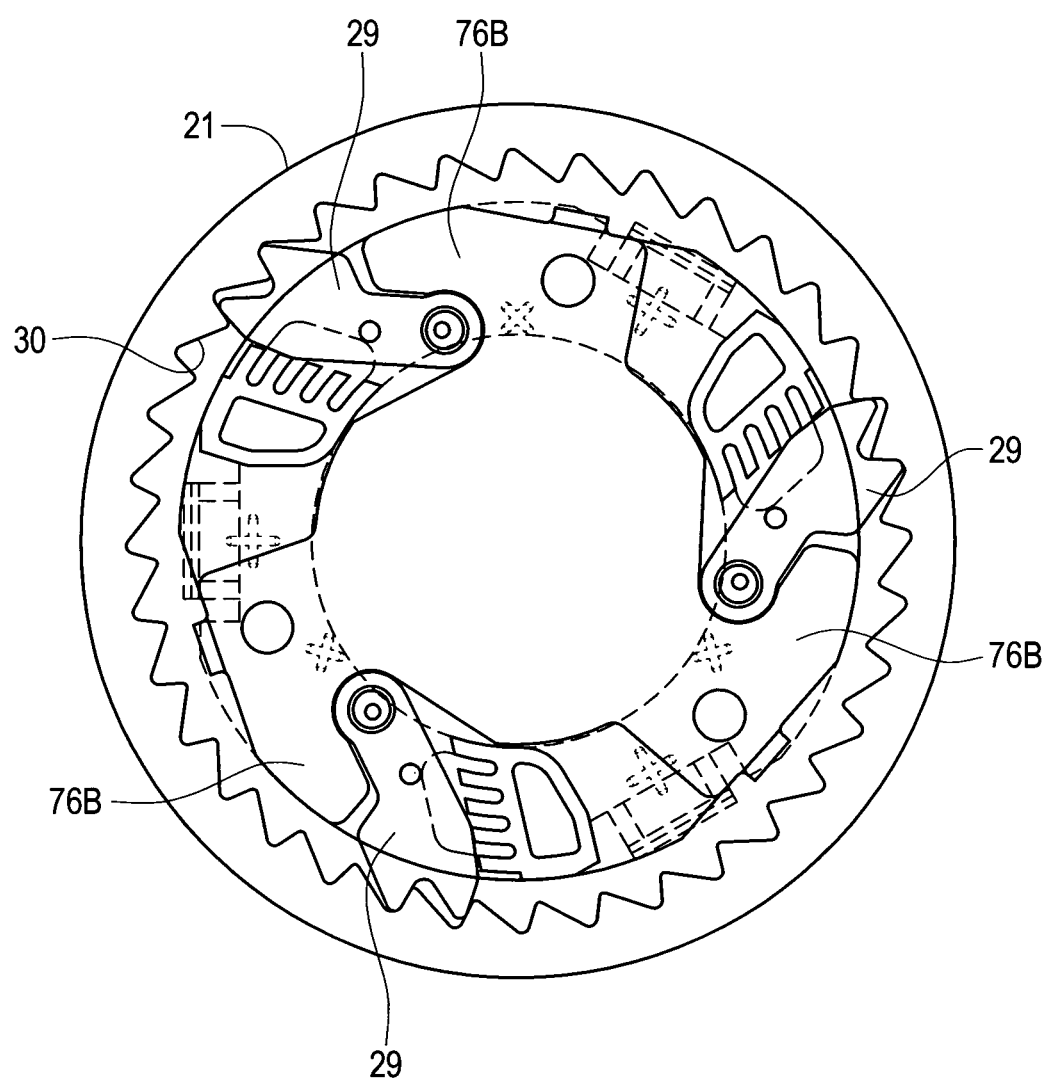
FIG. 27 is a partially enlarged view showing an engaged state between the clutch pawl and the guiding drum (when engagement is initiated in response to the pretensioner operation)
Figure 28:
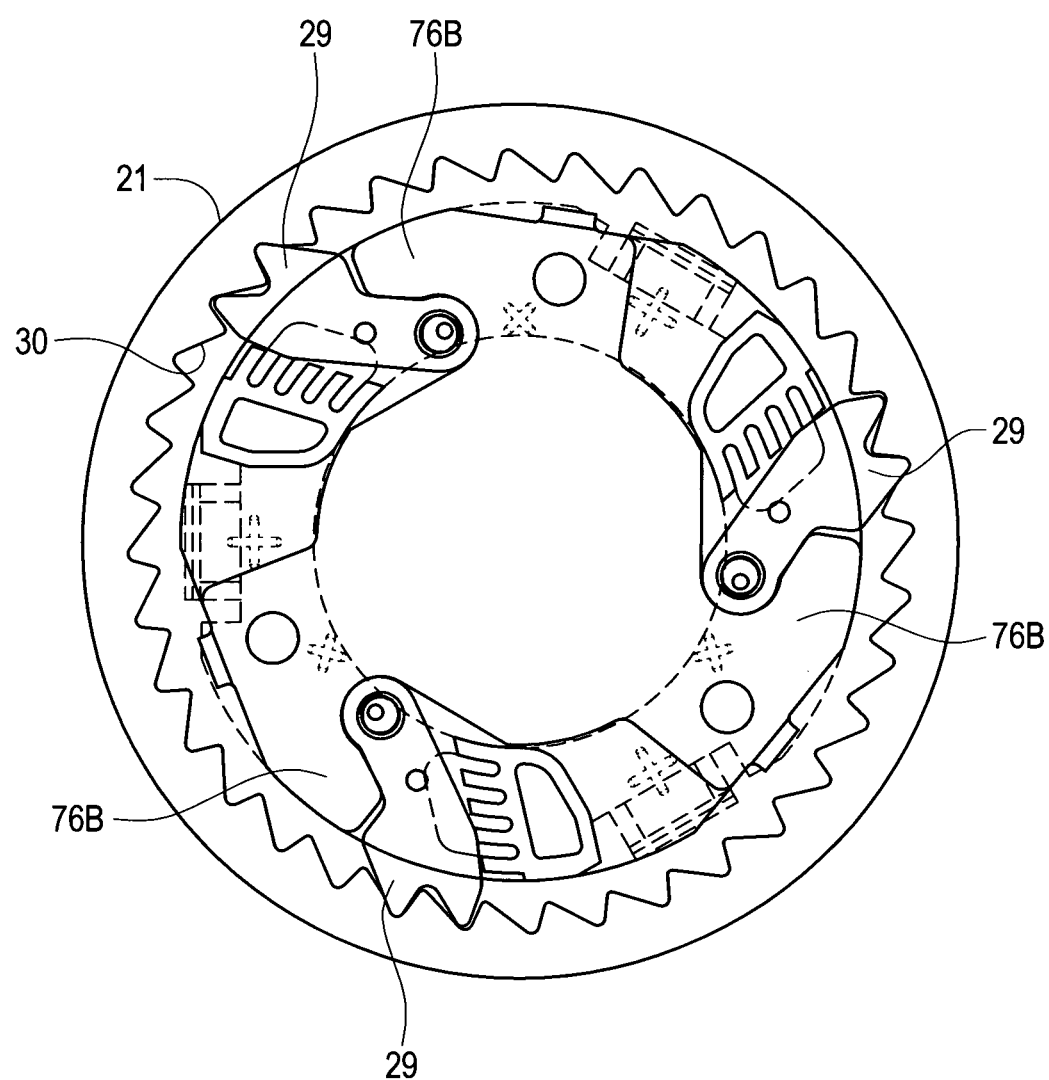
FIG. 28 is a partially enlarged view showing an engaged state between the clutch pawl and the guiding drum (when engagement is completed in response to the pretensioner operation)

FIG. 24, FIG. 27 and FIG. 28 are enlarged views of the engaging state between the clutch pawl 29 and the guiding drum 21.

FIG. 23 and FIG. 24 show the state prior to activation of the pretensioner.

As shown in FIG. 23 and FIG. 24, the piston 64 is provided at a bottom position inside the pipe cylinder 62, whereby the rack 116 carved in the piston 64 is prevented from engaging with the pinion gear body 33. The clutch pawl 29 is kept at the storing position.

FIG. 25 shows a state that gas generation has started inside the pipe cylinder 62. FIG. 27 shows the state corresponding to FIG. 25. Specifically, FIG. 27 shows the state that the clutch pawls 29 which were protruding outwardly start engaging the clutch gear 30.

As shown in FIG. 25, the piston 64 starts to be depressed and driven in the direction of the tip end portion of the pipe cylinder 62 in response to gas pressure. The rack 116 engages the pinion gear body 33 so that the pawl base 76 is caused to start rotating. As a result, the clutch pawls 29 starts protruding outwardly.

FIG. 26 shows the succeeding state of depressing and driving of the piston 64 under the gas pressure. FIG. 28 shows a state corresponding to FIG. 26.

As shown in FIG. 26, the pinion gear body 33 which is engaged with the rack 116 keeps rotating. The clutch mechanism 68 keeps rotating, whereby the clutch pawls 29 is kept in a protruded state. As shown in FIG. 28, the clutch pawls 29 finish protruding outwardly, whereby engagement with the clutch gear 30 is completed. As a result, engagement between the clutch pawls 29 and the guiding drum 21 is completed, and thereafter, the webbing 3 is retracted by the guiding drum 21.

[Description of Pretensioner Operation (Tooth Contact State)]

Here, a description will be given of the case that the tip end portions of the protruded clutch pawls 29 come in contact with the tip end portion of the clutch gear 30 of the guiding drum 21, based on FIG. 29.

Figure 29:
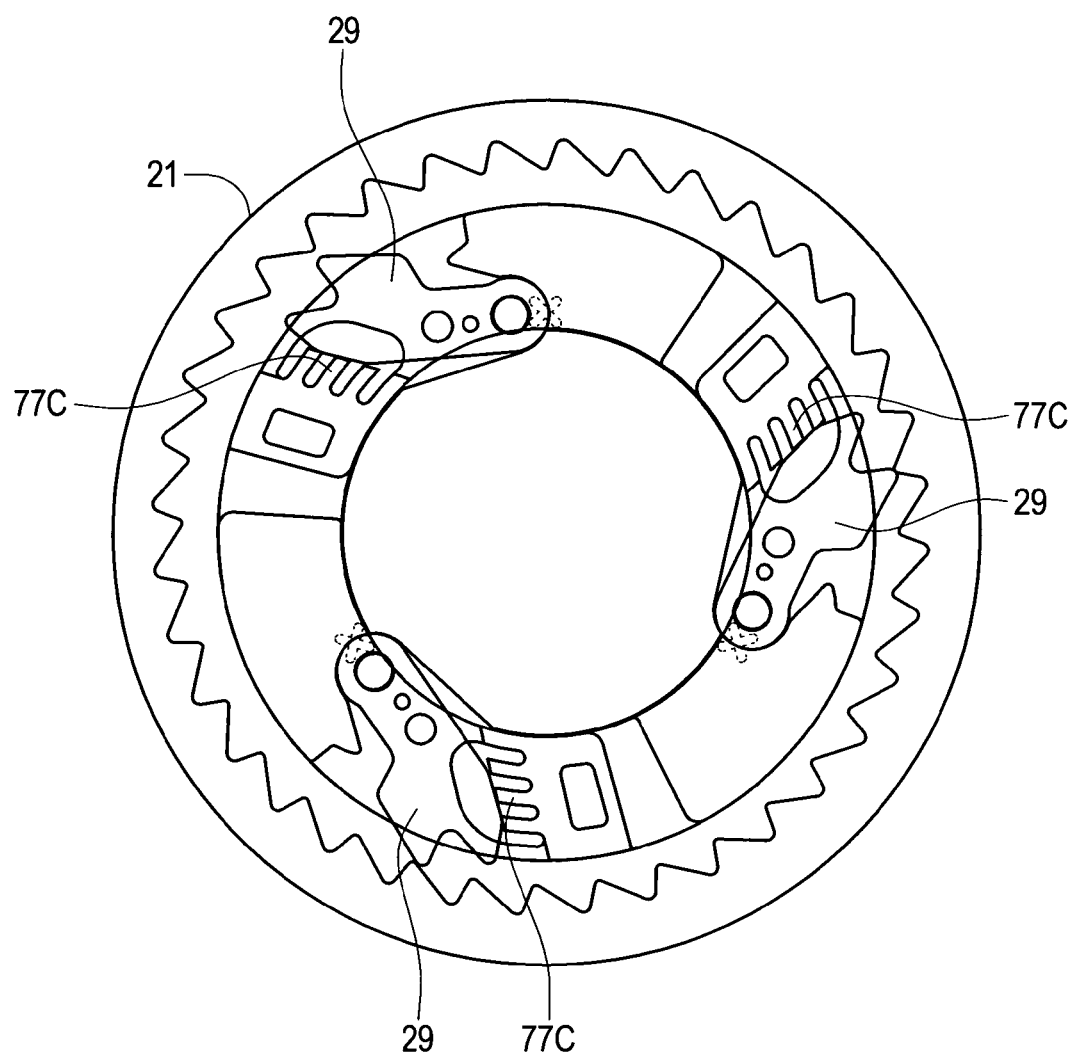
FIG. 29 is a partially enlarged view showing the clutch pawl and the clutch gear in tooth contact.

FIG. 29 shows the state that the tip end portion of one of the three clutch pawls 29 which have protruded comes in contact with the tip end portion of the clutch gear 30 in the guiding drum 21. Specifically, this is the tooth contact state. In this state, the clutch pawl 29 and the guiding drum 21 are in a state wherein relative movement thereof is disabled. As the pawl base 76 continues rotating, the clutch pawls 29 which came in tooth-contact rotate integrally with the guiding drum 21.

At this time, the clutch pawls 29 are depressed against the guiding portions 77C of the pawl guide 77 which is kept in a state where relative rotation thereof with respect to the clutch pawls 29 is disabled. The guiding portions 77C receive the clutch pawls 29 while being elastically deformed, in response to the rotation of the pawl base 76. The pawl base 76 rotates at a predetermined angle and the rest of the clutch pawls 29 engage the clutch gear 30.

Normally, even if the tip end portions of the clutch pawls 29 and the tip end portion of the clutch gear 30 in the guiding drum 21 are in a tooth-contact state, this tooth-state state rarely continues. Specifically, the counteracting force of the clutch pawls 29 and the clutch gear 30 due to the elastic deformation of the guiding portions 77C acts on a slant with the contact surface. Accordingly, if the elastic deformation of the guiding portions 77C progresses, a force acts on the clutch pawls 29 in a rotating direction, whereby the clutch pawls 29 is pushed back. As a result, the tooth-contact state can be released and the clutch pawls 29 and the clutch gear 30 can shift to an engaged state.

Even if the tooth-contact state cannot be released, as shown in FIG. 21 and FIG. 22, there are provided the three clutch pawls 29 arranged in three directions of the clutch mechanism 68. Thus, even if a clutch pawl 29 which is in a tooth-contact state is not released from the tooth-contact state, the projection operation of the other clutch pawls 29 is continued, whereby the engagement with the clutch gear 30 can be secured. In case there is at least one clutch pawl 29 which is not in a tooth-contact state, the clutch pawls 29 can still engage the clutch gear 30, and the pretensioner operation can be carried out without any problems.

[Energy Absorption Mechanism]

Next, an energy absorption mechanism will be described based on FIG. 30 through FIG. 39. According to this energy absorption mechanism, after activation of the above-described forced locking mechanism 53 or the normal emergency locking mechanism, the impact energy which occurs at the vehicle occupants when the webbing 3 is pulled out under a predetermined load is absorbed, if the pull out force which acts on the webbing 3 exceeds a predetermined value set in advance.

Based on FIG. 30 through FIG. 34, there will firstly be described on the mounting mechanism of the wire 24 which is mounted between the guiding drum 21 and the wire plate 25.

Figure 30:
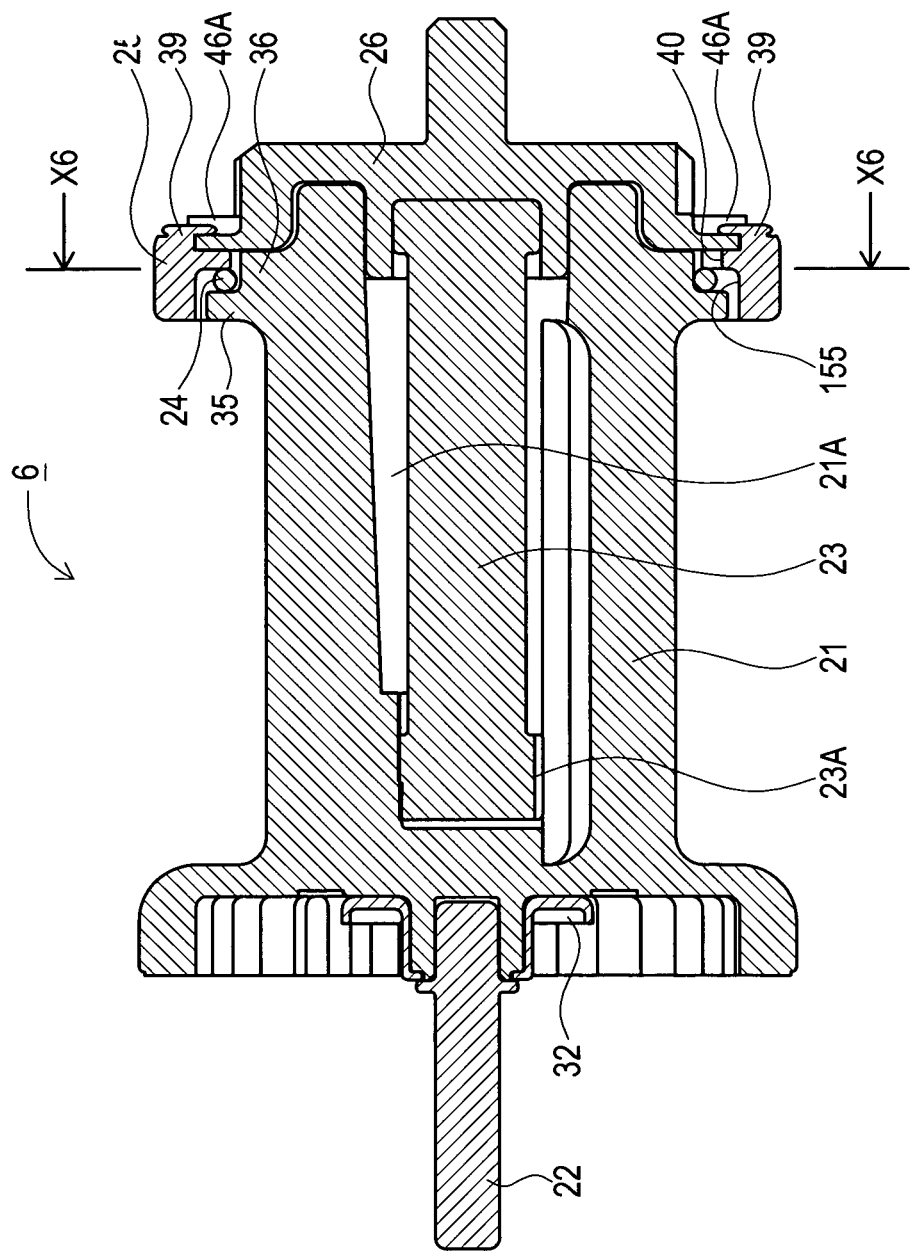
FIG. 30 is a cross sectional view including a shaft center and rivet pins of the take-up drum unit.
Figure 32:
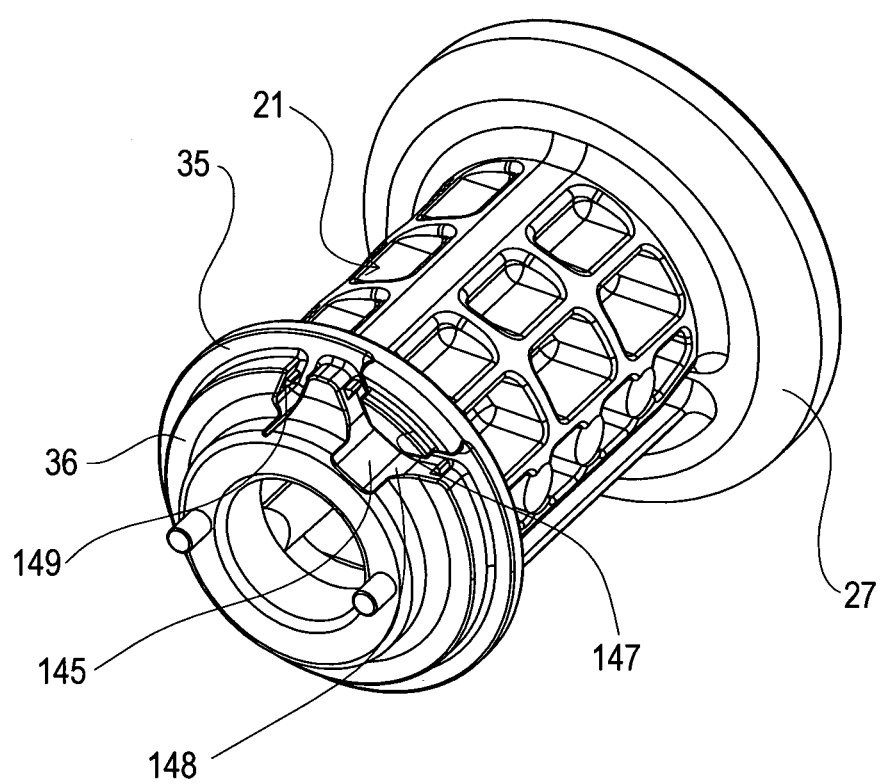
FIG. 32 is a perspective view of a drum guide as seen from a wire plate mounting side thereof.
Figure 33:
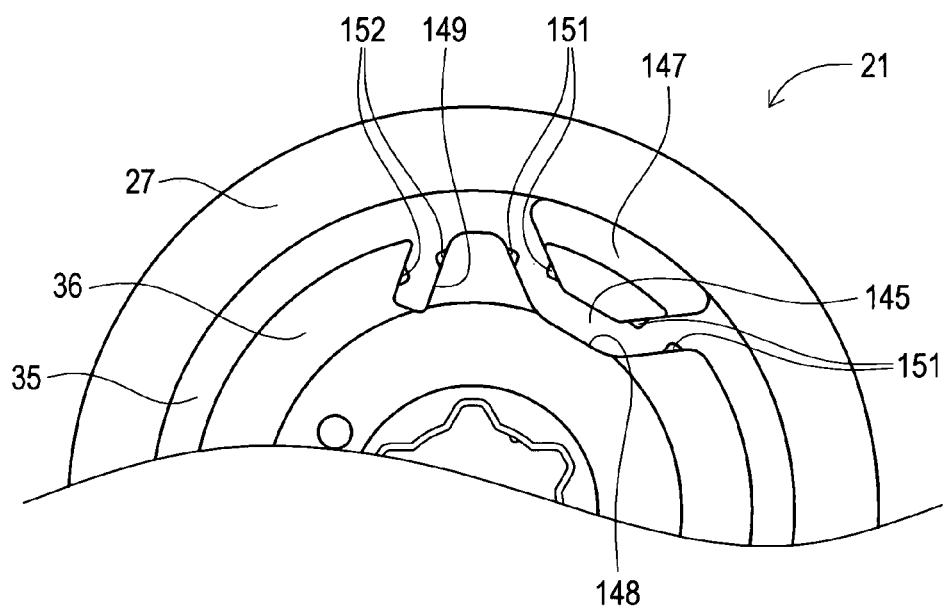
FIG. 33 is a partially enlarged view showing a crooked path formed in a stepped portion of the drum guide.
Figure 34:
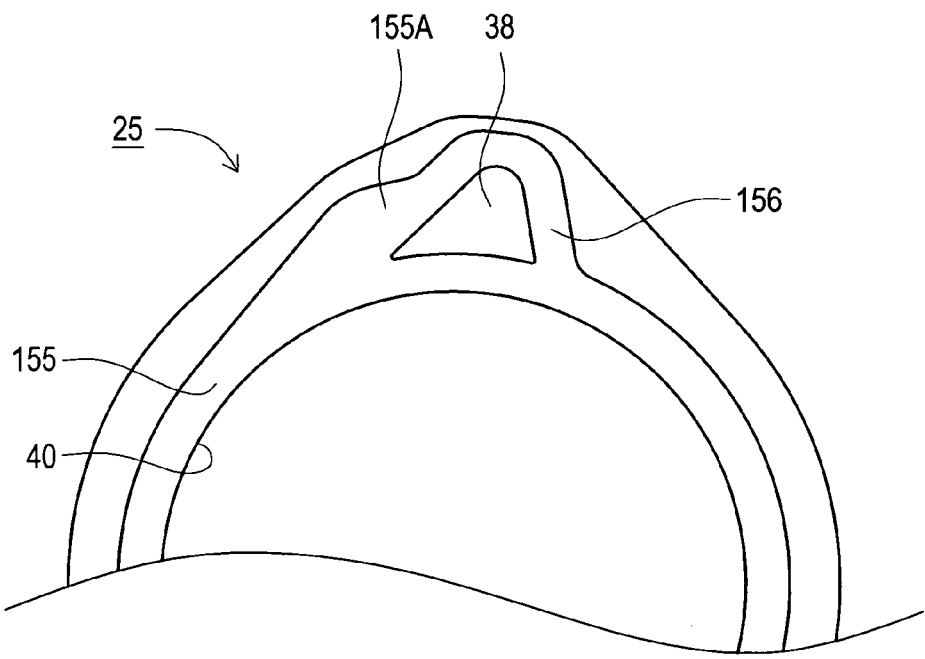
FIG. 34 is a partially enlarged view showing the crooked path of the wire plate.

FIG. 30 is a cross sectional view including the shaft center and the rivet pins 39 of the take-up drum unit 6. FIG. 31 is a cross sectional view taken along arrow X6-X6 in FIG. 30. FIG. 32 is a perspective view of the drum guide 21 as seen from a mounting side of the wire plate 25. FIG. 33 is a partially enlarged view showing a crooked path formed in the stepped portion 36 of the drum guide 21. FIG. 34 is a partially enlarged view showing a crooked path of the wire plate 25.

Figure 31:
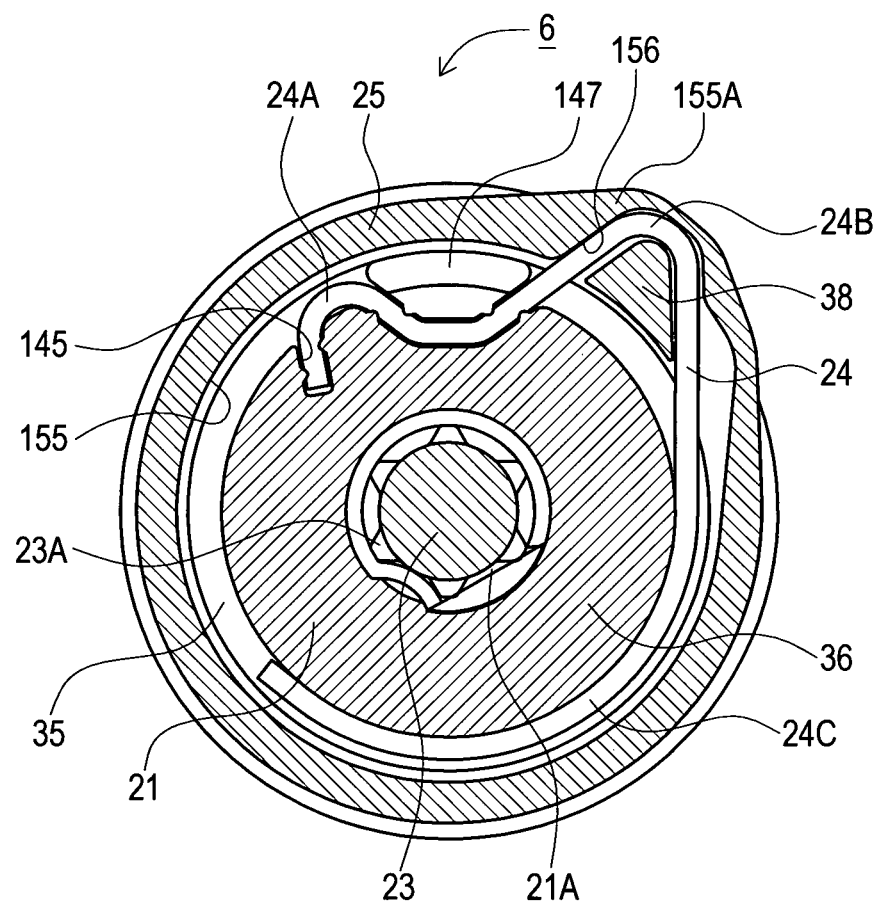
FIG. 31 is a cross sectional view taken along arrow X6-X6 in FIG. 30.

As shown in FIG. 30 and FIG. 31, the drum shaft 22 is fixed by press-fitting to a center position in an end portion, on the pretensioner unit 7 side, of the guiding drum 21 constituting the take-up drum unit 6. The bearing 32 is fitted to a bottom end portion of the drum shaft 22. The spline 23A of the torsion bar 23 is press-fitted for mounting to the back side of the shaft hole 21A of the guiding drum 21 so as to disable relative rotation thereof with respect to the shaft hole 21A.

As shown in FIG. 31, at the outer periphery of the stepped portion 36 which has a substantially circular shape when seen in front view and is formed in an outer surface of the flange portion 35 in the guiding drum 21, there is formed the crooked path 145 having a crooked portion 24A wherein one end of the wire 24 is fitted and held is integrally formed.

As shown in FIG. 32, the crooked path 145 is formed of: a convex portion 147; a concave portion 148; a groove portion 149; and an outer surface between the concave portion 148 of the stepped portion 36 and the groove portion 149. The convex portion 147 is formed in a substantially trapezoidal shape oriented downward as seen from a front view and protrudes from the outer surface in an axial direction of the flange portion 35. The concave portion 148 faces the convex portion 147 formed at the outer periphery of the stepped portion 36. The groove portion 149 is formed in an inward direction from and on a slant with the outer peripheral surface of the stepped portion 36 which is slightly away from the left end (left end in FIG. 33) of the concave portion 148 as seen from a front view.

As shown in FIG. 33, two sets of opposite ribs 151 are provided in opposite faces of the convex portion 147 and the concave portion 148 along a depth direction of the crooked path 145. Also, one set of ribs 152 are formed in opposite faces of the groove portion 149 along the depth direction of the crooked path 145. The distance between the opposing ribs 151 and 152 is smaller than the outer diameter of the wire 24.

As shown in FIG. 31, the crooked portion 24A at one end portion of the wire 24 is fitted in the crooked path 145 while squeezing the respective ribs 151 and 152, whereby the crooked portion 24A is fixed and held thereat. The crooked portion 24B has a substantially V-shape when viewed from a front view and is formed so as to be continuous with the crooked portion 24A of the wire 24. The crooked portion 24B is formed so as to protrude further out than the outer periphery of the flange portion 35. The crooked portion 24C which is continuous with the crooked portion 24B of the wire 24 is formed in a circular arcuate shape along the outer peripheral surface of the stepped portion 36.

As shown in FIG. 5, FIG. 30, FIG. 31 and FIG. 34, there is formed a housing concave portion 155 for housing the wire 24, the flange portion 35 and the convex portion 147. This housing concave portion 155 is formed in the state the inner periphery of the through hole 40 in the wire plate 25 is substantially opposite the outer peripheral portion of the stepped portion 36, and comes in contact with the wire 24 at the peripheral edge portion of this through hole 40. The housing concave portion 155 is formed so that the diameter of an inner peripheral face which covers the outer peripheral portion of the flange portion 35 becomes substantially the same as the outer diameter of the flange portion 35.

At a portion of the housing concave portion 155 facing the crooked portion 24B of the wire 24, there is formed a bulging portion 155A which bulges outside in the direction of the diameter for housing the crooked portion 24B. At an inner surface of the bulging portion 155A, there is integrally formed a convex portion 38 which has a substantially angled shape as seen from a front view and is inserted inside the crooked portion 24B of the wire 24, whereby a crooked portion 156 is thus formed wherein the wire 24 is guided in a slidable fashion. An end portion of the convex portion 38 at an inner side in a radial direction of the wire plate 25 is formed in a circular arcuate shape along an outer peripheral surface of the stepped portion 36.

Accordingly, as shown in FIG. 31, to mount the wire 24 to the guiding drum 21, the spline 23A of the torsion bar 23 is press-fitted and fixed to the back side in a depth direction of the shaft hole 21A in the guiding drum 21. The crooked portion 24A of the wire 24 is tucked in the crooked path 145 formed in the stepped portion 36, and arranged along the outer peripheral surface of the stepped portion 36. Then, the convex portion 38 of the wire plate 25 is inserted inside the crooked portion 24B of the wire 24 and the crooked portion 24B of the wire 24 is inserted inside the crooked path 156. Also, the peripheral edge portion of the through hole 40 is brought in contact with the wire 24, so that the wire 24, the stepped portion 36 and the convex portion 147 are housed inside the housing concave portion 155.

Thereafter, as was described earlier, the spline 23B formed at the other end of the torsion bar 23 is fitted inside the mounting boss 49 of the ratchet gear 26 and the respective ejector pins 37 of the guiding drum 21 which have been inserted in the respective through holes 47 are rivet. As a result, the ratchet gear 26 and the wire plate 25 are fixed to the guiding drum 21 through the respective ejector pins 37 so that relative rotation thereof with respect to the guiding drum 21 is disabled. The ratchet gear 26 and the wire plate 25 are fixed to the torsion bar 23 so that relative rotation thereof with the torsion bar is disabled, by riveting the respective rivet pins 39 of the wire plate 25.

Next, when the above-described forced locking mechanism 53 or the normal emergency locking mechanism as will be described later are activated in case of a vehicle collision, and the pawl 43 is engaged with the ratchet gear 26 of the take-up drum unit 6, rotation of the ratchet gear 26 in the direction to pull out the webbing 3 is prevented. In this state, if the pull out force which acts on the webbing 3 exceeds a predetermined value set in advance, the respective ejector pins 37 which are fitted in the respective through holes 47 of the ratchet gear 26 and riveted will be rotated together with the guiding drum 21 and sheared under the rotating torque which acts on the guiding drum 21. At this time, the impact energy is absorbed by shearing of the respective ejector pins 37 in a [first energy absorption mechanism].

Simultaneously, if the guiding drum 21 is rotated, there is rotated the spline 23A side of the torsion bar 23 which has been press-fitted and fixed to the back side of the shaft hole 21A in the guiding drum 21, whereby torsional deformation of the torsion bar 23 is caused to start. The guiding drum 21 starts rotating in the pull out direction of the webbing 3 in response to the torsional deformation of the torsion bar 23. Here, the impact energy is absorbed by the torsional deformation of the torsion bar 23 in a [second energy absorption mechanism].

Simultaneously, as the wire plate 25 and the ratchet gear 26 are fitted with the respective engagement convex portions 41 and the engagement concave portions 46B when the guiding drum 21 is rotated, a relative rotation occurs even between the wire plate 25 and the guiding drum 21. Thus, relative rotation occurs even between the wire 24 and the wire plate 25 in response to the rotation of the guiding drum 21, and the impact energy is absorbed by the wire 24 in a [third energy absorption mechanism].

[Pull-out-wire Operation]

Here, the operation of the wire 24 at the time of impact energy absorption will be described based on FIG. 31, and FIG. 35 through FIG. 38. FIG. 35 through FIG. 38 are explanatory views of an operation to pull out the wire 24.

As shown in FIG. 31, in an initial state of the wire plate 25 and the guiding drum 21, one end in a peripheral direction of the convex portion 147 constituting the crooked path 145 is positioned close to the end portion on the pull-out side of the convex portion 38 constituting the crooked path 156. Also, the respective end portions of the crooked paths 145 and 156 face each other in a substantially straight line.

Figure 35:
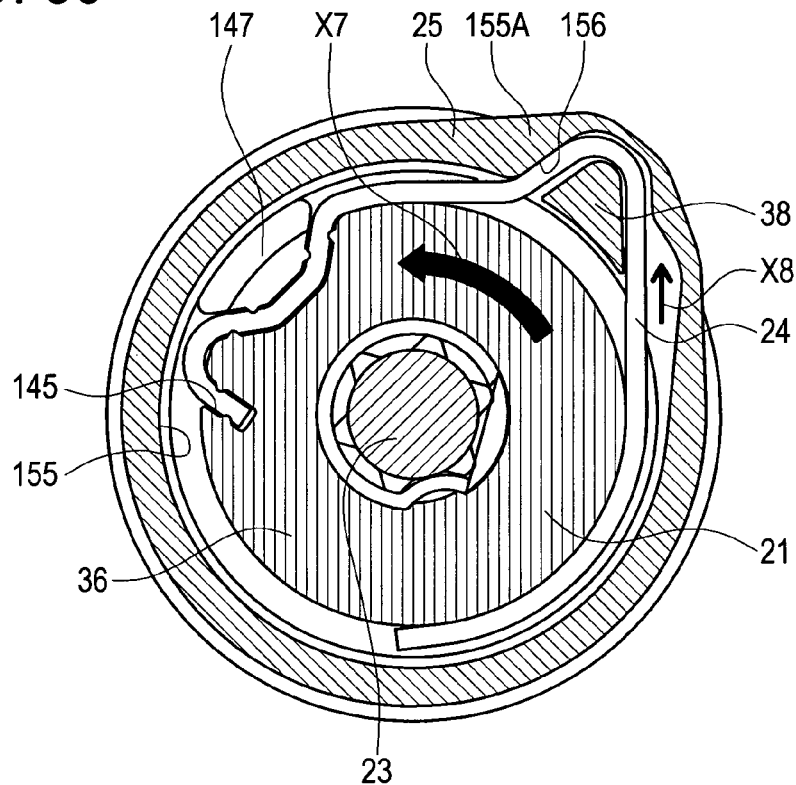
FIG. 35 is a view for describing a pull-out-wire operation.
Figure 36:
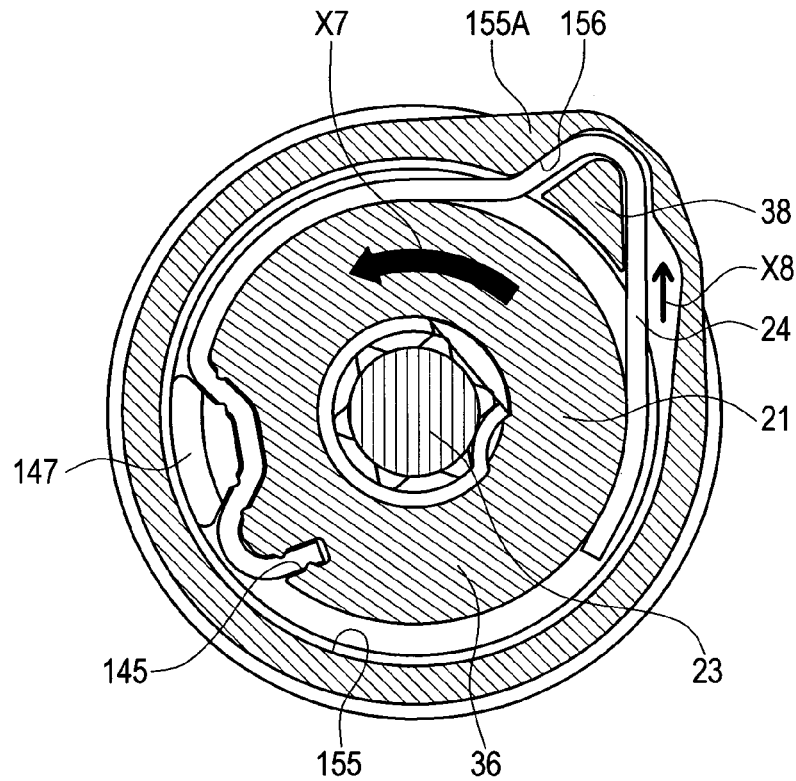
FIG. 36 is a view for describing the pull-out-wire operation.
Figure 37:
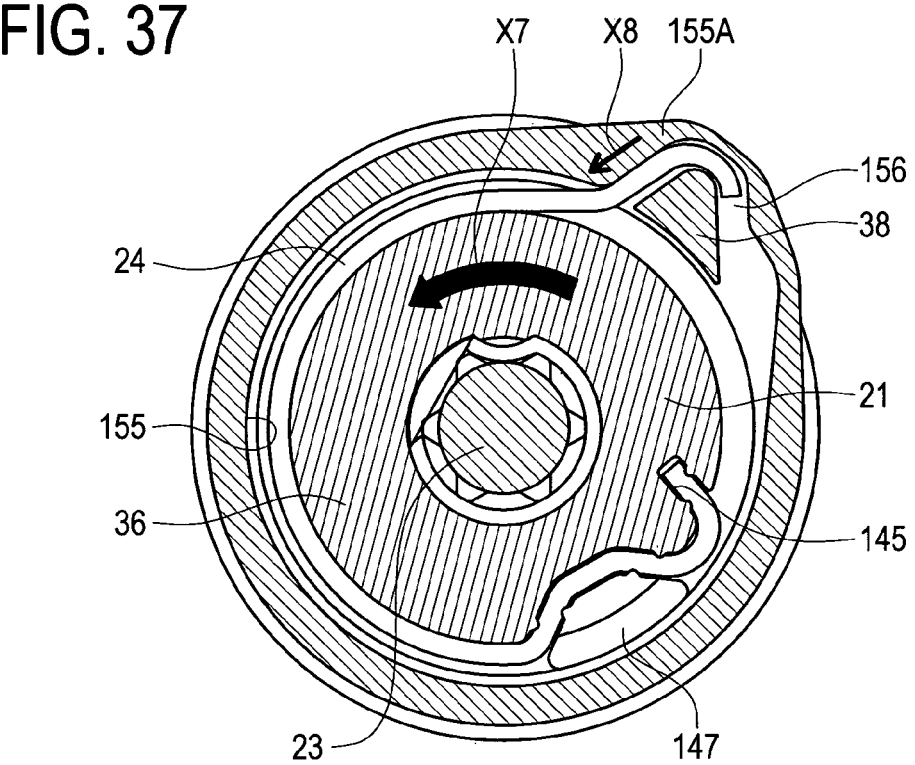
FIG. 37 is a view for describing the pull-out-wire operation.

As shown in FIG. 35 through FIG. 37, if the guiding drum 21 is rotated in the pull out direction of the webbing 3 when the webbing 3 is pulled out, the wire plate 25 is prevented from rotating. Also, the stepped portion 36 is relatively rotated in the pull-out direction X7 of the webbing 3 due to the rotation of the guiding drum 21. As a result, the wire 24 with its crooked portion 24A fixed and held in the crooked path 145 of the stepped portion 36 is drawn in the direction of arrow X8 while being sequentially drawn from the crooked path 156 which has a substantially V shape as seen from a front view and is formed by the convex portion 38 inside the bulging portion 155A. The wire 24 is thus taken-up on the outer peripheral surface of the stepped portion 36. Simultaneously with pull out of the wire 24, the torsion bar 23 undergoes torsional deformation in response to rotation of the guiding drum 21.

When the wire 24 passes through the substantially V-shaped crooked path 156 in front view while being deformed, a sliding resistance occurs between the convex portion 38 and the wire 24, and a winding resistance occurs in the wire 24 itself. Thus, the impact energy of the wire 24 is absorbed by this sliding resistance and the winding resistance.

Figure 38:
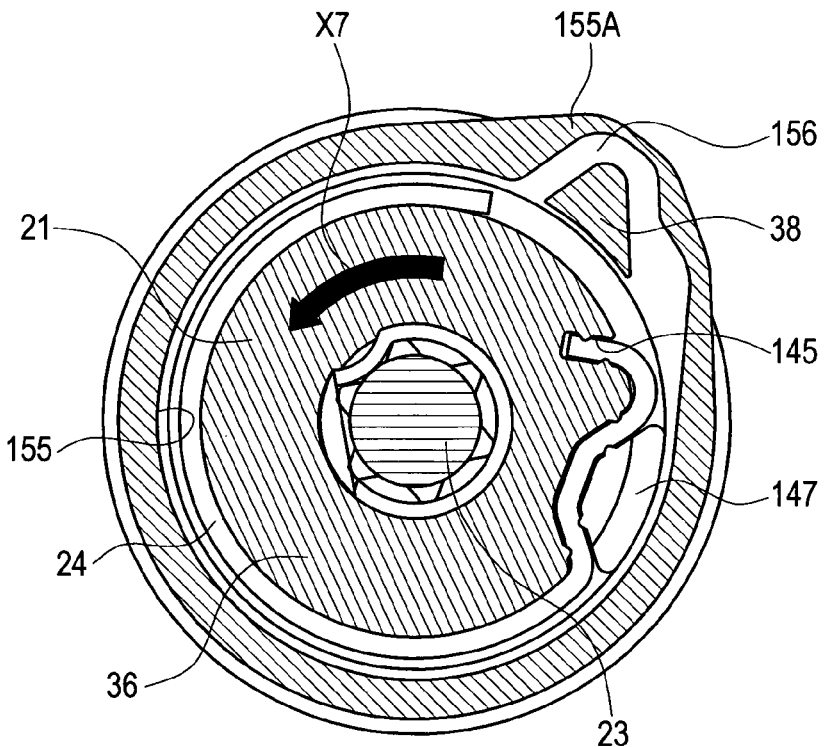
FIG. 38 is a view for describing the pull-out-wire operation.

As shown in FIG. 38, when the other end of the wire 24 has moved away from the crooked path 156 in response to rotation of the guiding drum 21, absorption of impact energy by the wire 24 is ended. Subsequent absorption includes only absorption of impact energy by torsional deformation of the torsion bar 23 in response to rotation of the guiding drum 21.

Figure 39:
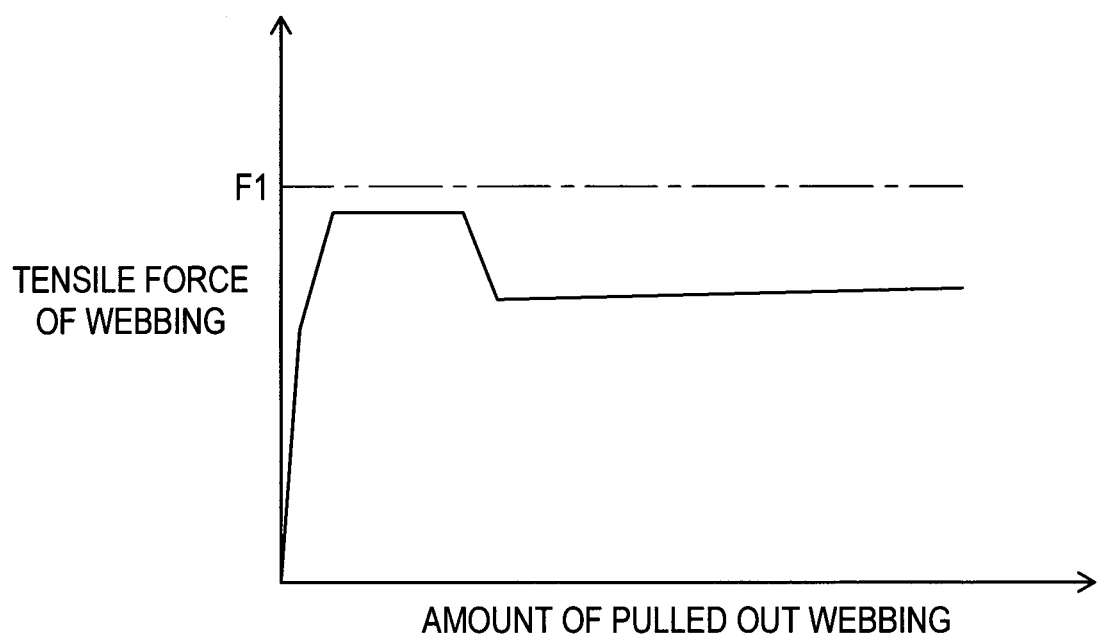
FIG. 39 is an absorption characteristic diagram showing one example of impact energy absorption by the respective ejector pins, wire and torsion bar.

The absorption characteristics of the impact energy by the respective ejector pins 37, the wire 24 and the torsion bar 23 will next be described based on FIG. 39. FIG. 39 is an absorption characteristic diagram showing one example of impact energy absorption by the respective ejector pins 37, the wire 24 and the torsion bar 23.

As shown in FIG. 39, in the period of time from the start of the operation to pull out the webbing 3 operation until the respective ejector pins 37 are sheared, absorption of impact energy by the respective ejector pins 37 and the torsion bar 23 is carried out simultaneously. Accordingly, from the start of the operation to pull out the webbing 3 till the ejector pins 37 are sheared, energy is absorbed by the ejector pins 37 and the torsion bar 23, as well as the wire 24.

Further, in a period of time from the operation to pull out the webbing 3 and shearing of the ejector pins 37 until the wire 24 moves away from the crooked path 156, absorption of impact energy by the torsional deformation of the torsion bar 23 and impact energy absorption by the wire 24 are carried out simultaneously. Also, in the period of time from the shearing of the ejector pins 37 till the operation to pull out the wire 24 from the crooked path 156 ends, the energy absorption load can be set so as to meet, as possible, a predetermined load which is smaller than a maximum load F1 which does not adversely influence the vehicle occupants.

Further, when the wire 24 is moved away from the crooked path 156, the absorption operation of the impact energy by the wire 24 ends. Subsequent absorptions include only absorption of the impact energy by torsional deformation of the torsion bar 23 in response to rotation of the guiding drum 21.

Accordingly, as the wire 24 is fixed and held in place by the respective ribs 151 and 152 by tucking the crooked portion 24A of the wire 24 in the crooked path 145, the configuration can be simplified and the efficiency of the assembly operation of the wire 24 can be improved.

With respect to absorption of impact energy in case of a vehicle collision or the like, absorption of energy at an initial stage right after absorption of this impact energy starts is carried out by the ejector pins 37, the torsion bar 23 and the wire 24. Thereafter, energy absorption is increased so as that energy is absorbed by the torsion bar 23 and the wire 24, whereby efficient energy absorption can be carried out efficiently.

The forced locking mechanism 53 of the webbing as described above is a locking mechanism which is activated in case of vehicle collision. Specifically, according this mechanism, after the retract operation of the webbing is ended when the pretensioner is activated in an emergency situation in case of vehicle collision, movement of the vehicle occupants is promptly prevented by activation of the normal emergency locking mechanism as will be described later. The locking mechanism is activated immediately after impact in the vehicle collision.

The seatbelt retractor 1 according to the present embodiment has two types of locking mechanisms, in addition to the forced locking mechanism 53 as described above. These two types include a webbing-sensitive locking system which is activated in response to sudden pull out of the webbing, and a vehicle-body-sensitive locking system which is activated in response to acceleration caused by vehicle rocking or tilting. Hereinafter, for clear distinction with the forced locking mechanism 53, these two types of locking mechanisms will be designated as emergency locking mechanisms in the following description.

[Schematic Configuration of Emergency Locking Mechanism]

Figure 40:
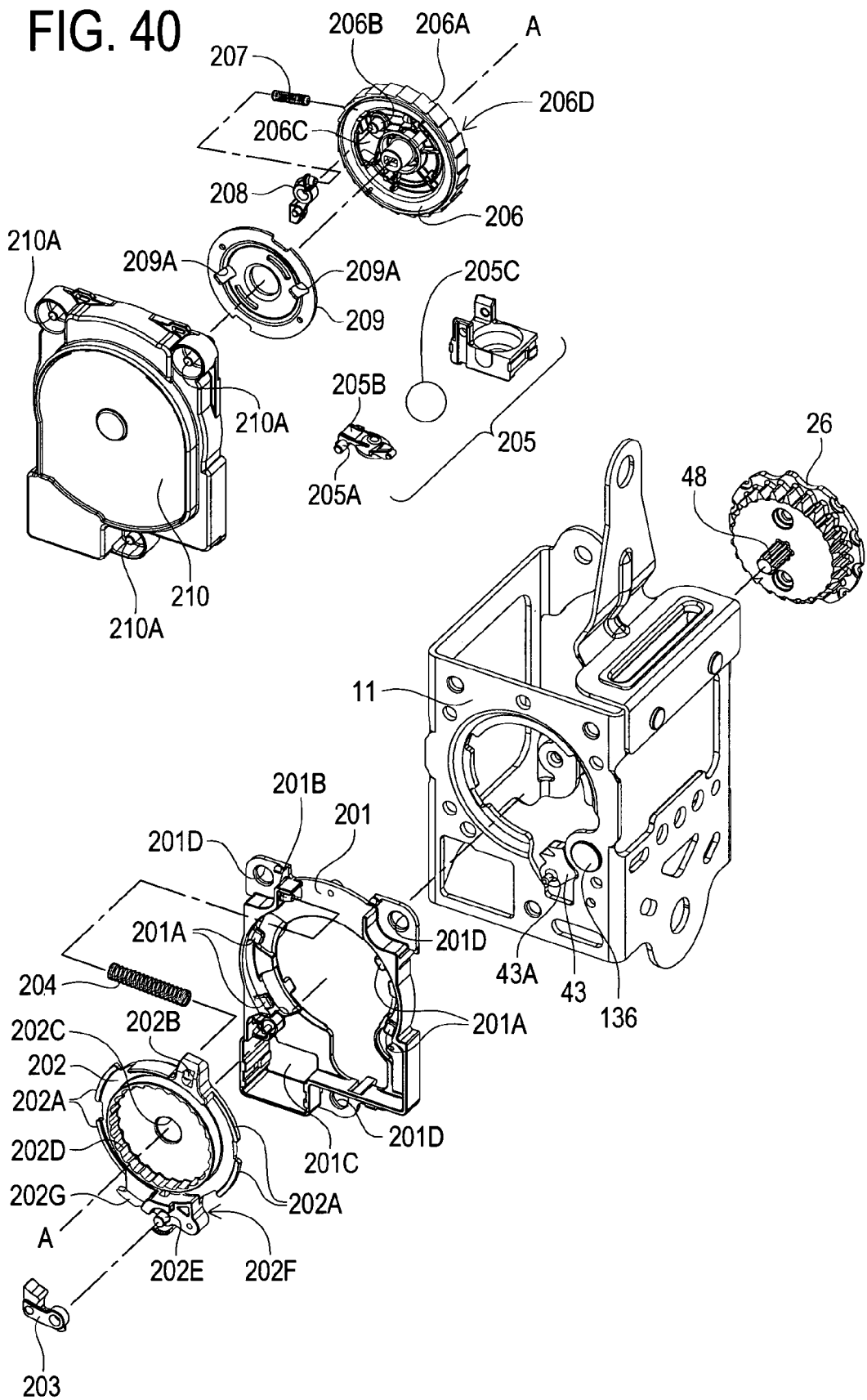
FIG. 40 is an exploded perspective view of the locking unit.

FIG. 40 is an exploded perspective view showing the configuration of the locking unit 9 representing the emergency locking mechanism. Also, FIG. 4 shows the cross sectional view thereof.

As shown in FIG. 40 and FIG. 4, the locking unit 9 carries out the operation of the webbing-sensitive locking mechanism and the vehicle-body-sensitive locking mechanism. The locking unit 9 is made of a mechanism block 201, a clutch 202, a pilot arm 203, a return spring 204, a vehicle sensor 205, a locking gear 206, a sensor spring 207, a locking arm 208, an inertia mass 209 and a mechanism cover 210.

Ribs 202A are provided at an outer peripheral edge of the clutch 202. The clutch 202 is mounted to the mechanism block 201 in a rotatable fashion by engagement with the engagement portions 201A of the mechanism block 201. The return spring 204 is held between the projective holding portions 201B and 202B of the mechanism block 201 and the clutch 202 which oppose each other at top end portions of the locking unit 9. Thus, the clutch 202 is urged to a predetermined position.

The mechanism block 201 has an opening formed at a center part thereof. The opening has a substantially inverted guitar-like shape. The opening portion with the larger diameter is larger than the diameter of the ratchet gear 26, and is smaller than the diameter of the clutch 202. As a result, in the larger diameter opening portion, the back surface of the clutch 202 and the ratchet gear 26 are arranged close to each other and so as to face each other. The connecting portion between the smaller diameter opening portion and the larger diameter opening portion forms a movable region of the pawl 43. A pawl 43 which is rotatably supported on a shaft by the pawl rivet 136 is installed in the housing 11. The pawl 43 engages the ratchet gear portion 45 of the ratchet gear 26 in response to rotation of the pawl 43 towards the larger diameter opening portion.

In the mechanism block 201, a sensor installation portion 201C is provided at an opposite end to the smaller diameter opening portion. The vehicle sensor 205 is composed of the ball sensor 205C and the vehicle sensor lever 205A thereon, with its lever 205A directed upwards.

The clutch 202 has an opening portion 202C formed at a center thereof. The shaft portion 48 of the ratchet gear 26 is loosely inserted therein. Clutch teeth 202D which are coaxial with the opening portion 202C and extend in the direction of the shaft center are erected in a circular shape at a front face portion of the clutch 202.

A mounting pin 202E and a guide groove 202F are provided at a substantially lower central part in the clutch 202. The mounting pin 202E is provided at a front surface so that the pilot arm 203 is rotatably supported. The pilot arm 203 is forced upwards by the vehicle sensor lever 205A. The guide groove 202F is provided at a back surface, so that the guiding pin 43A of the pawl 43 is loosely fitted therein. The guiding groove 202F is formed so as to extend close to the shaft center of the opening portion 202C in a leftward direction. As a result, the pawl 43 is driven so as to come close to the ratchet gear 26 by rotating the clutch 202 in a counter-clockwise direction.

Further, the guiding block 202G extends in a leftward lower direction from the mounting pin 202E. The guiding block 202G is provided so as to face the bottom lever portion 205B of the vehicle sensor 205. The guiding block 202G has a tapered configuration, becoming broader in a downward direction as it extends leftward from the mounting pin 202E. At a tip portion, the guiding block 202G has a region of a predetermined width.

The locking gear 206 has a circular-shaped grooved portion 206D formed on a back surface thereof. The locking gear 206 houses the clutch teeth 202D erected in a circular shape on the clutch 202. The locking gear 206 is arranged so as to come in contact with or be close to the clutch 202 so that the grooved portion 206D encloses the clutch teeth 202D. The shaft portion 48 which is loosely inserted in the opening portion 202C is pressed-fitted coaxially with the locking gear 206. The ratchet gear 26 and the locking gear 206 are installed coaxially.

An opening 206C which extends to the grooved portion 206D (refer to FIG. 4) is provided at one corner at an outer peripheral end portion of the locking gear 206. A shaft supporting pin 206B is provided in the vicinity of the opening portion 206C. The locking arm 208 is supported by the shaft supporting pin 206B in a rotatable fashion, wherein a tip end portion of the locking arm 208 is rotatable from the opening portion 206C to the grooved portion 206D. The locking arm 208 is coupled with the locking gear 206 through the sensor spring 207, and in normal operation, the locking arm 208 is urged so that a tip end portion thereof does not protrude from the opening portion 206C. In the locking operation carried out in the webbing-sensitive locking mechanism, the locking arm 208 protrudes in the grooved portion 206D through the opening portion 206C, and a tip end portion of the locking arm 208 is caused to engage the clutch teeth 202D.

At an outer peripheral edge of the locking gear 206, locking gear teeth 206A are engraved toward the direction of the outer diameter. The locking gear 206 is arranged in the clutch 202 so that the locking gear teeth 206 are in the vicinity of the pilot arm 203. In the locking operation carried out in the vehicle-body-sensitive locking mechanism, the pilot arm 203 is pushed upwards by the vehicle sensor lever 205A of the vehicle sensor 205, and the tip end portion of the pilot arm 203 is caused to engage the locking gear teeth 206A.

The inertia mass 209 is mounted to the front surface of the locking gear 206 in a rotatable fashion. The inertia mass 209 has a guide opening portion 209A. A guide pin 208A which extends in the locking arm 208 is loosely fitted in the guide opening portion 209A. The inertia mass 209 is made of a metallic member and serves to generate delay of inertia with respect to rapid pull out of a webbing. From a functionality point of view, provision of one guide opening portion 209A suffices. However, from the point of view of generating the inertial delay, dummy guide opening portions 209A may be provided at point-symmetric positions at a center of the inertia mass 209.

A front surface of the locking unit 9 is covered by a mechanism cover 210. The mechanism cover 210 is provided with nylon latches 210A. The nylon latches 210 have a similar configuration with the nylon latch 8A. The locking unit 9 is fixed to the housing 11 by the nylon latches 210A, through the openings 201D of the mechanism block 201.

In the locking unit 9, members other than the inertia mass 209, the return spring 204, the sensor spring 207 and the metallic ball of the vehicle sensor 205 are made of a resin material. Also, the coefficient of friction between these members in the case they come in contact with one another is small.

Next, the operation of the normal locking mechanism will be described based on FIG. 41 through FIG. 46. In these drawings, the webbing-pull-out direction is as shown. Rotation in the counter-clockwise direction is the webbing-pull-out direction. The following description is focused on the locking operation, while description of the remaining parts is omitted for convenience. In the description of this operation, contents of the drawings will be partly omitted as necessary. The operation of the pawl 43 is common both in the webbing-sensitive locking mechanism and the vehicle-body-sensitive locking mechanism. Also, in the following description, some portions obstacle to explain the relationship between the pawl 43 and the ratchet gear 26 are omitted.

[Description of Operation in Webbing-sensitive Locking Mechanism]

Figure 41:
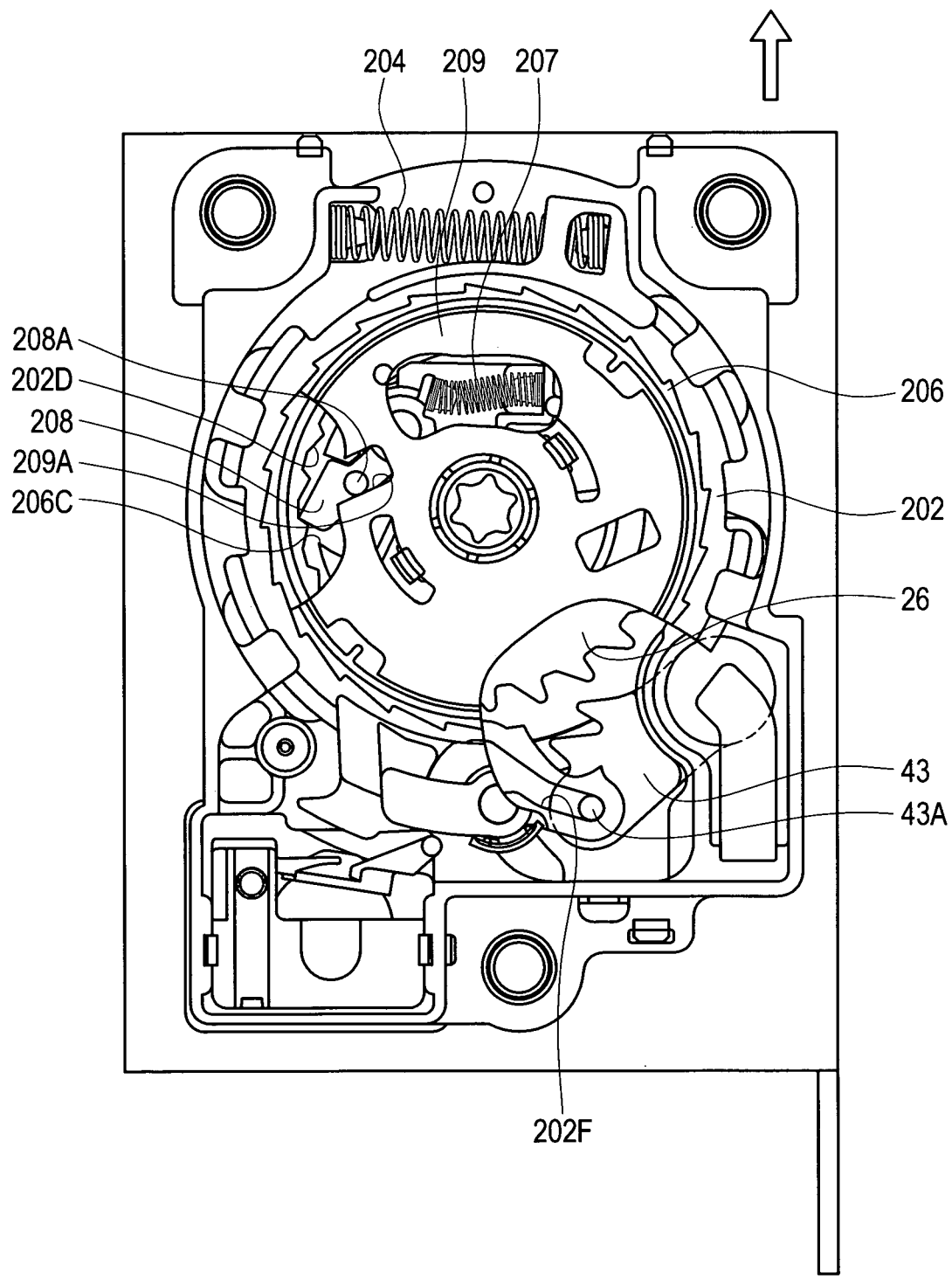
FIG. 41 is a view for explaining the operation of a webbing-sensitive-type locking mechanism (when operation is initiated)
Figure 42:
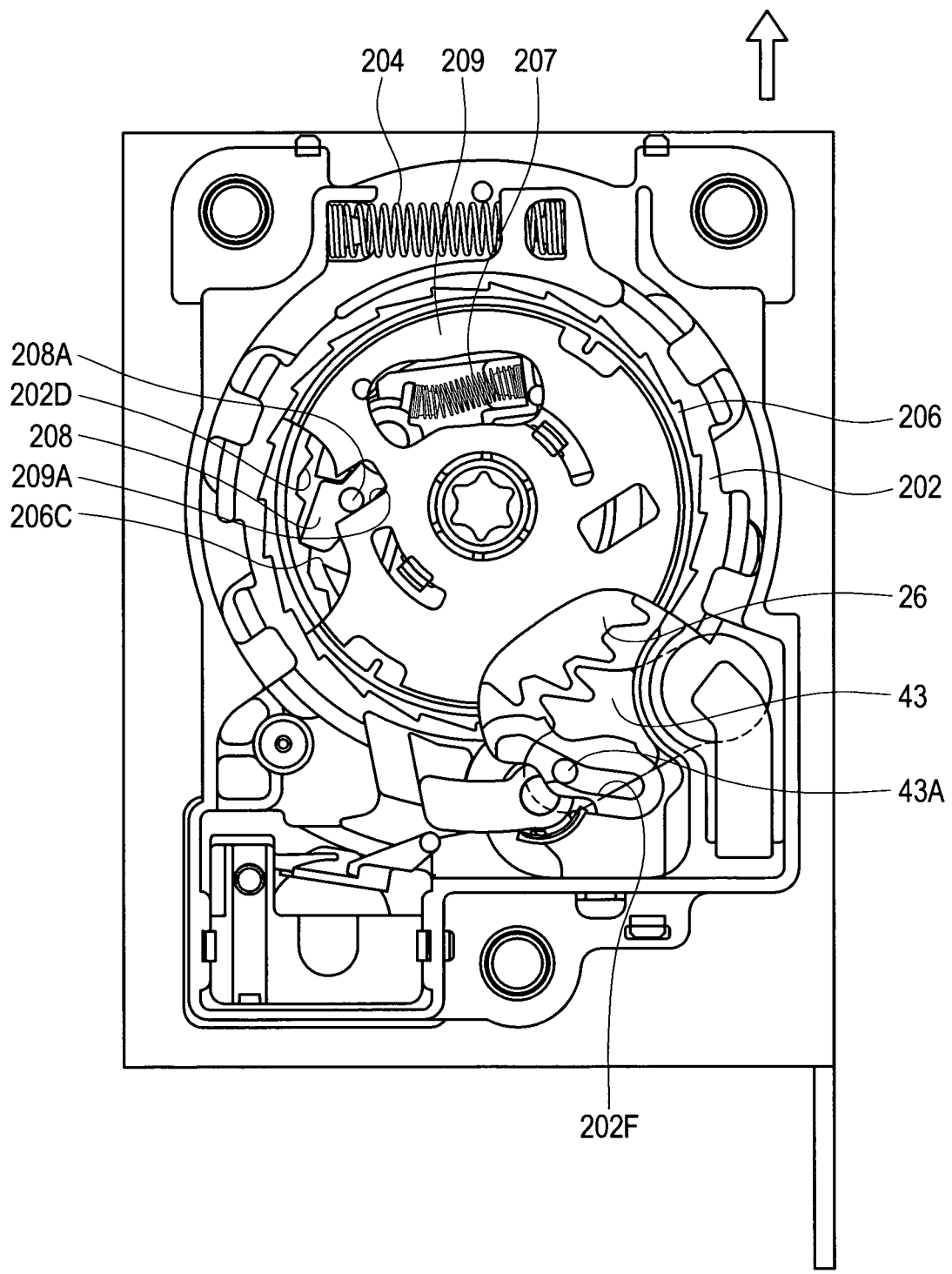
FIG. 42 is a view for explaining the operation of a webbing-sensitive-type locking mechanism (transitional phase to a locked state)
Figure 43:
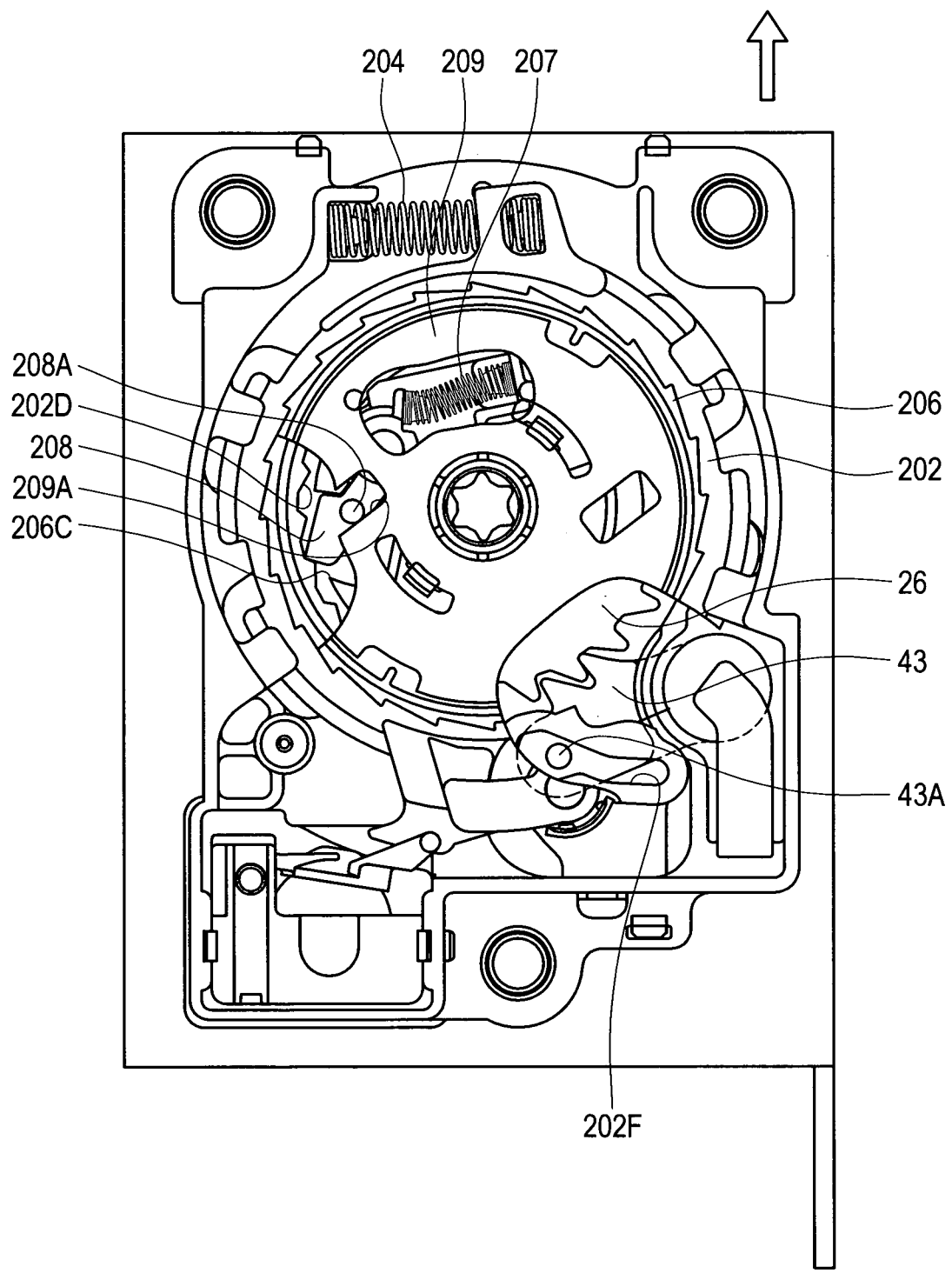
FIG. 43 is a view for explaining the operation of a webbing-sensitive-type locking mechanism (locked state)

FIG. 41 through FIG. 43 are explanatory diagrams showing the operation of the webbing-sensitive locking mechanism. Those diagrams omit some parts of the webbing-sensitive locking mechanism so as to clearly illustrate parts showing the relationship between the pawl 43 and the ratchet gear 26, the relationship between the locking arm 208 and the clutch teeth 202D, and the sensor spring 207.

Once the acceleration applied to the webbing in the webbing-pull-out direction exceeds a predetermined value, the sensor spring 207 can no longer maintain the initial position of the inertia mass 209. Specifically, inertia delay occurs in the inertia mass 209 and the locking gear 206 is rotated in a counter-clockwise direction with respect to the inertia mass 209.

As a result, the guide pin 208A of the locking arm 208 is guided in the guide opening portion 209A of the inertia mass 209 and the tip end portion of the locking arm 208 is caused to rotate in the direction of the outer diameter and engage the clutch teeth 202D. This is shown in FIG. 41.

If the operation to pull out the webbing is continued even after the locking arm 208 engages the clutch teeth 202D, the locking gear 206 which is installed coaxially with the ratchet gear 26 keeps rotating in a counter-clockwise direction. As the locking arm 208 is engaged with the clutch teeth 202D, the clutch 202 as well will rotate in a counter-clockwise direction.

As a result, the guide pin 43A of the pawl 43 is guided in the guiding groove 202F of the clutch 202 and the pawl 43 is caused to rotate toward the ratchet gear 26. This state is shown in FIG. 42.

The pawl 43 keeps rotating and engages the ratchet gear 26, then rotation of the ratchet gear 26 is prevented. The guiding drum 21 is locked in preventing rotation thereof, and further preventing the webbing from being pulled out. This state is shown in FIG. 43.

In the state shown in FIG. 43, the return spring 204 is kept in a compressed state. Accordingly, when the tensile force as applied to webbing-pull-out direction is relaxed and the guide drum 21 rotates in a retracting direction, the clutch 202 is rotated in the clockwise direction under the urging force of the compressed return spring 204. Thus, the guide pin 43A of the pawl 43 is guided in the guiding groove 202F of the clutch 202 in a reverse direction and the pawl 43 is caused to move away from the ratchet gear 26. The locked state is thus released.

[Description of Operation in Vehicle-body-sensitive Locking Mechanism]

Figure 44:
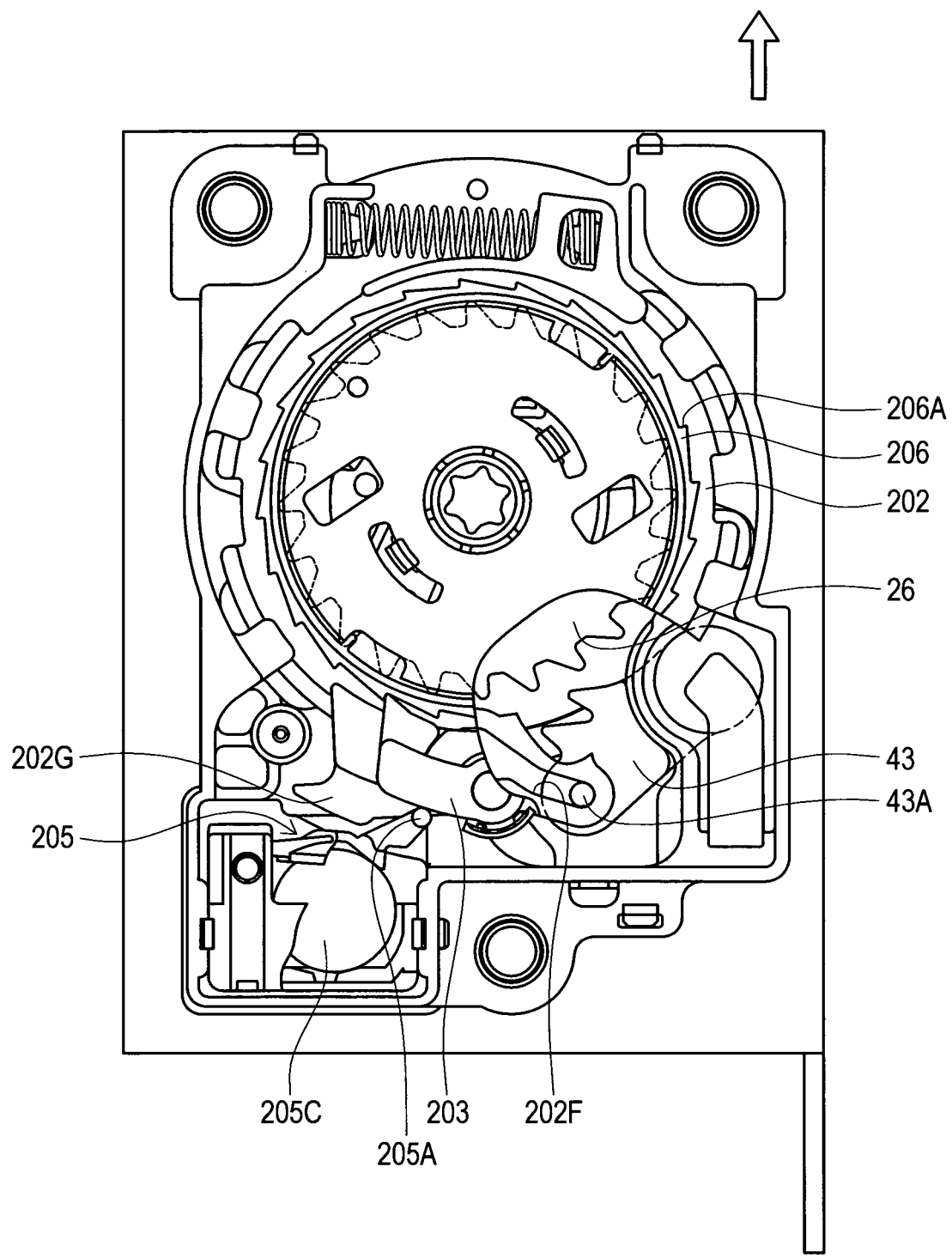
FIG. 44 is a view for explaining the operation of a vehicle-body-sensitive-type locking mechanism (when operation is initiated)
Figure 45:
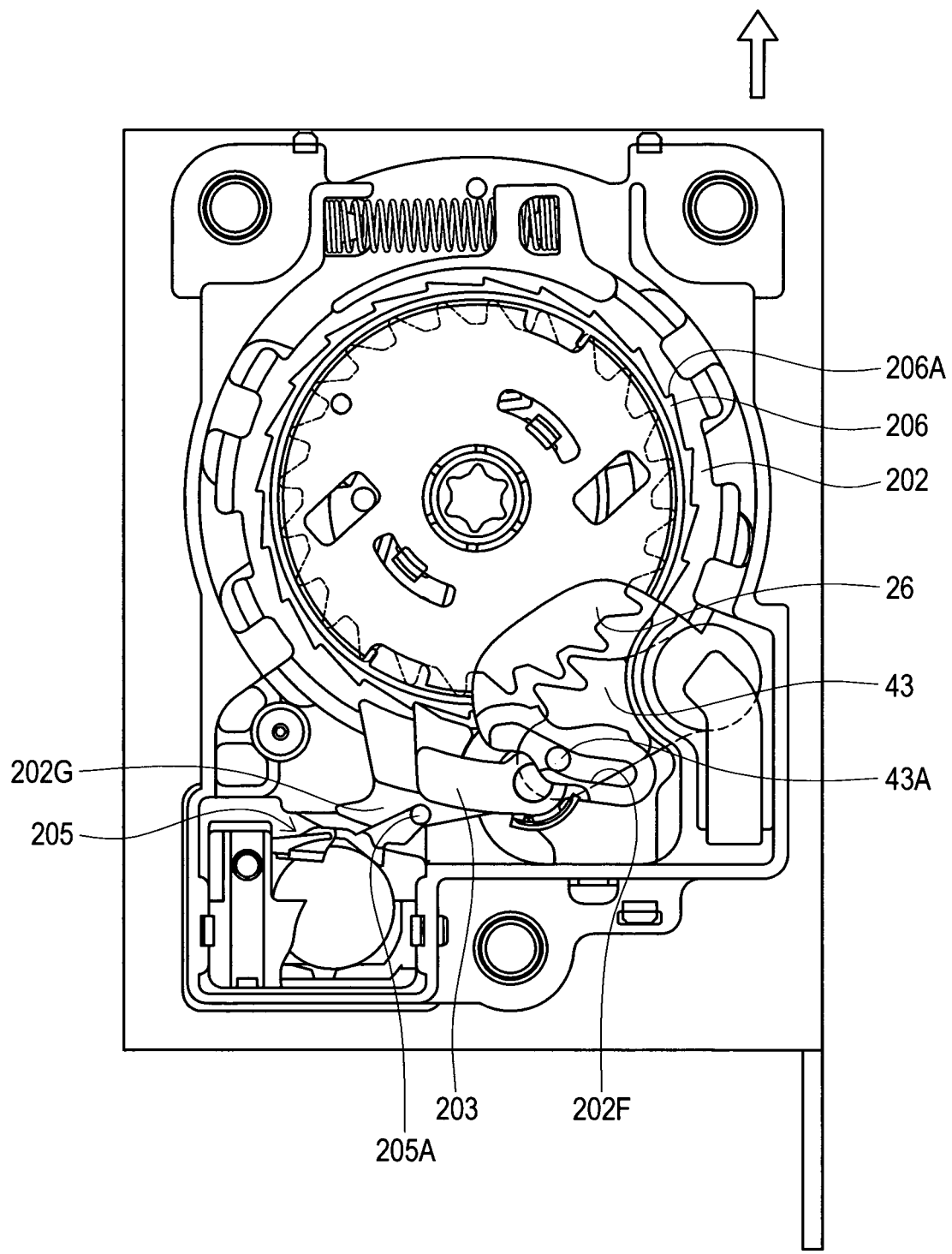
FIG. 45 is a view for explaining the operation of the vehicle-body-sensitive-type locking mechanism (transitional phase to a locked state)
Figure 46:
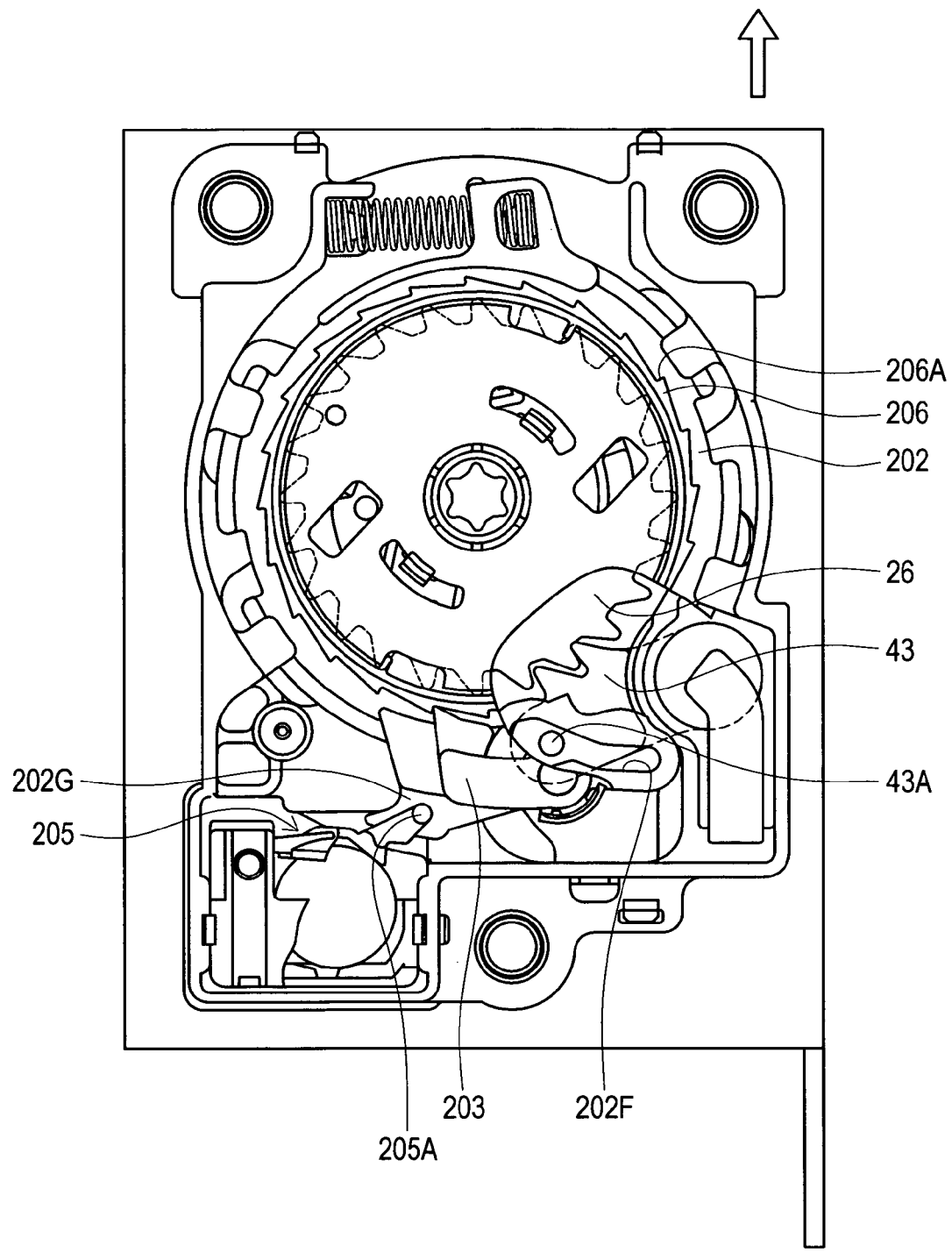
FIG. 46 is a view for explaining the operation of the vehicle-body-sensitive-type locking mechanism (locked state)

FIG. 44 through FIG. 46 are explanatory diagrams showing the operation in the vehicle-body-sensitive locking mechanism. Those diagrams omit some parts of the vehicle-body-sensitive locking mechanism so as to clearly illustrate parts showing the relationship between the pawl 43 and the ratchet gear 26.

Once acceleration caused by rocking or tilting of the vehicle body exceeds a predetermined value, a ball sensor 205C of the vehicle sensor 205 can no longer be maintained at the predetermined position and the vehicle sensor lever 205A is caused to push the pilot arm 203 upwards.

As a result, the tip end portion of the pilot arm 203 engages the locking gear teeth 206A. This state is shown in FIG. 44.

If the pilot arm 203 and the locking gear teeth 206A are kept in the engaged state, the rotating force in the counter-clockwise direction as applied to the locking gear 206 causes the clutch 202 onto which the pilot arm is rotatably supported through the pilot arm 203 to rotate in a counter-clockwise direction.

Thus, the guiding pin 43A of the pawl 43 is guided in the guiding groove 202F of the clutch 202 and the pawl 43 is caused to rotate toward the ratchet gear 26. This state is shown in FIG. 45.

When the pawl 43 keeps rotating and engages the ratchet gear 26, then rotation of the ratchet gear 26 is locked in. The guiding drum 21 is locked in so as to prevent the webbing from being pulled out. This state is shown in FIG. 46.

As is the case with the webbing-sensitive locking mechanism, once the webbing 3 is retracted, the clutch 202 rotates in a clock-wise direction, thereby the pawl 43 and the ratchet gear 26 are disengaged therefrom. The ball sensor 205C returns to the initial state once the acceleration of the vehicle reaches zero.

The guiding block 202G is a rocking restraining member which prevents the vehicle sensor lever 205A from elevating in response to acceleration of the vehicle, when the locked state has been released and the clutch 202 is caused to rotate in a clockwise direction and return to its normal position. This guiding block 202G is provided so as to prevent return of the clutch 202 from being restricted when the tip end portion of the pilot arm 203 comes in contact with the vehicle sensor lever 205A of the vehicle sensor 205.

In a locked state, the lower end portion of the wider region of the guiding block 202G comes in contact with the lever bottom portion 205B of the vehicle sensor 205. If the width of this wider region is set so that the tip end portion of the vehicle sensor lever 205A is kept below the moving path of the lower end portion of the pilot arm 203, the vehicle sensor lever 205A and the tip end portion of the pilot arm 203 will not come in contact even when the clutch 202 is rotated in a clockwise direction to be returned in its initial position. The lower end portion of the guiding block 202G which comes in contact with the lever bottom portion 205B has a tapered configuration becoming gradually narrower in response to rotation of the clutch 202 in the clockwise direction. Upon returning from the locked state, when the clutch 202 rotates in a clockwise direction to return to its normal position, the tip end portion of the pilot arm 203 comes in contact with the vehicle sensor lever 205A so as not to restrict the returning operation of the clutch 202. In normal operation, the lever bottom portion 205B will not come in contact with the guiding block 202G, and rocking of the vehicle sensor 205 caused by the acceleration of the vehicle will not be restricted by the guiding block 202G. The spline 23A of the torsion bar 23 is shown as one of the examples of the larger diameter portion of the torsion bar.

Figure 47B:
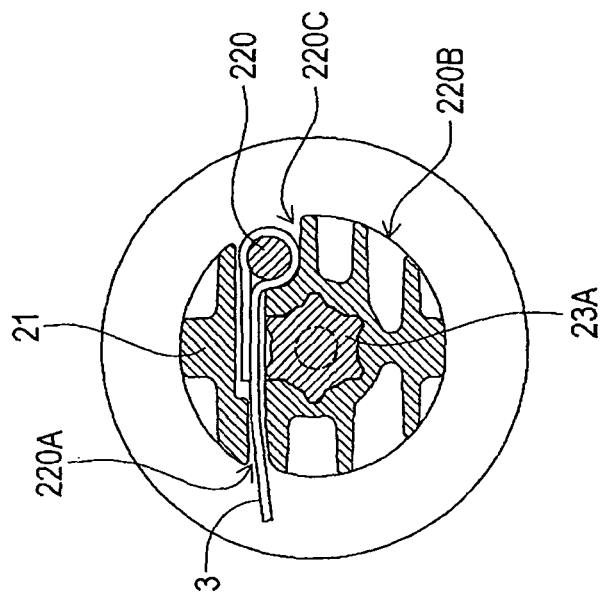
FIG. 47B is a cross-sectional view taken along arrow A-A in FIG. 47A.
Figure 47A:
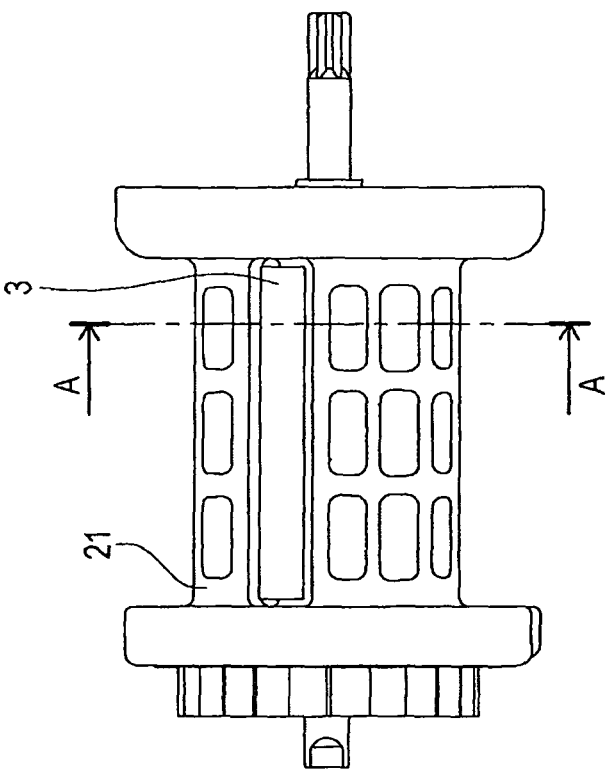
FIG. 47A is a front view showing a state of the guide drum from which the webbing has been pulled out.

FIG. 47 includes a cross sectional view showing a state of the guide drum 21 from which the webbing 3 has fully been pulled out. The cross sectional view is a cross sectional view of the guide drum 21 shown at the right side of FIG. 47 taken along A-A. At the guide drum 21, there is formed a slit 220A co-axially with the rotational axis of the guide drum 21. Of the two end surfaces of the slit 220A, one end surface at the inner-diameter side of the guide drum 21 is formed so as to be substantially even with the outer diameter end portion of the spline 23A provided at one end portion of the torsion bar 23 which is to be press-fitted to the guide drum 21 with its relative rotation being disabled. An end portion of the webbing 3 passes through the slit 220A and makes a U-turn around the slip-off prevention pin 220 to fix the slip-off prevention pin 220 itself thereat. The slip-off prevention pin 220 surrounded by the webbing 3 is placed at a holding portion 220C which adjoins to the slit 220A and has a concave shape formed in the guide drum 21 so as to extend from a drum-side surface 220B of the webbing 3 to the inner-diameter side of the guide drum 21. In this case, an end surface at which the holding portion 220C is to be provided is formed so as to be substantially even with one of the end surfaces of the slit 220A which is at the outer-diameter side of the guide drum 21.

The cross sectional view included in FIG. 47 shows the state that the webbing 3 is fully pulled out. The outer diameter of the webbing 3 end surrounding the slip-off prevention pin 220 is configured to be longer than the length (gap) of the slit 220A. Therefore, the slip-off prevention pin 220 is blocked at end portions of the slit 220A and prevented from going out from the slit 220A.

Further, the one end surface which makes up the holding portion 220C is formed so as to be substantially even with one of the end surfaces of the slit 220A which is at the outer diameter side of the guide drum 21. Accordingly, at the inner diameter side of the guide drum 21 where the slip-off prevention pin 220 surrounded by the webbing 3 is present, there is such positional relation that the spline 23A of the torsion bar 23 is an extension of the webbing-pull-out direction. Therefore, in case the slip-off prevention pin 200 applies load to the guide drum 21 when the webbing 3 is fully pulled out, some of the load is received by the spline 23A of the torsion bar 23.

The guide drum 21 is made of an aluminum material for reduction in weight and partially lightened by making hollow portions. The guide drum 21 is further lightened for inserting the torsion bar 23 at its central portion including its rotational axis. The thus lightened guide drum 21 is seemingly hard to receive working force when the webbing 3 is fully pulled out. The guide drum 21, however, can receive and bear the load that works when the webbing 3 is fully pulled out, owing to the aid of the spline 23A of the torsion bar 23 which is made of an iron material.

It is the spline 23A of the torsion bar 23 that receives the load to depress the guide drum 21 originated from the slip-off prevention pin 220. The load from the slip-off prevention pin 220 is not applied to the central portion (indicated with broken lines in FIG. 47) of the torsion bar 23 which is to absorb energy in case of vehicle emergency. Accordingly, thus configured guide drum 21 does not affect energy absorption function of the torsion bar 23.

As described, the seatbelt retractor 1 of the present embodiment comprises the guide drum 21 that takes up and stores the webbing 3, the slit 220A which is formed in parallel to a rotational axis of the guide drum 21 and allows one end of the webbing 3 to pass through, and the slip-off prevention pin 220 which is provided at the one end of the webbing 3 and prevents the webbing 3 from going out the slit 220A, wherein the seatbelt retractor 1 further comprises the torsion bar 23 which is mounted inside the guide drum 21 co-axially with the rotational axis of the guide drum 21 with one end of the torsion bar 23 being fixed to the guide drum 23 so that relative rotation with respect to the guide drum 21 is disabled, and a length consisting of a diameter of the slip-off prevention pin 220 and thickness of the webbing 3 that surrounds the slip-off prevention pin 220 is longer than a distance between an outer-diameter-side surface of the slit 220A at the guide drum 21 and an outer diameter surface of the torsion bar 23 housed inside the guide drum 21.

The torsion bar 23 is mounted inside the take-up drum 21 co-axially with its one end being fixed thereto for disabling its relative rotation with respect to the take-up drum 21. The slit 220A is formed in parallel to rotational axis of the take-up drum 21 and allows one end of the webbing 3 to pass through there. At the one end of the webbing 3, there is provided the slip-off prevention pin 220. The length consisting of diameter of the slip-off prevention member and thickness of the webbing 3 surrounding the slip-off prevention member is made longer than distance between outer-diameter-side surface of the slit 220A at the take-up drum 21 and outer diameter surface of the torsion bar 23 housed inside the take-up drum 21 so as to prevent the slip-off prevention pin 220 from going out the slit 220A. Such configuration can streamline the attachment of the webbing 3 to the take-up drum 21, which requires only a few steps as follows: firstly, the webbing 3 is inserted in the slit 220A of the guide drum 21; and next, the webbing 3 is set in the guide drum 21 by folding the end of the webbing 3 so as to surround the periphery of the slip-prevention pin 220. Further, in case the webbing 3 is fully pulled out and the slip-off prevention pin 220 is pulled and eventually pressing the guide drum 21 in the webbing-pull-out direction, the load that the slip-off prevention pin 220 depresses the guide drum 21 is received by both the guide drum 21 and the torsion bar, because they are provided to make smaller gap than thickness of the slip-off prevention pin 220. As a result, the attachment-portion strength when the webbing 3 is fully pulled out can be improved.

The outer diameter surface of the torsion bar 23 corresponds to the spline 23A for fixing the torsion bar 23 to the guide drum 21 without relative rotation of the torsion bar 23 with respect to the guide drum 21. Even though large load is added to the guide drum 21 when the webbing 3 is fully pulled out, the load is eventually applied to the spline 23A which is an end portion of the torsion bar 23. Since the load is not applied to a central portion of the torsion bar 23, i.e., the energy absorption portion of it, the energy absorption function of the torsion bar 23 is not affected.

It is preferable that the guide drum 21 is made of an aluminum material and the torsion bar 23 is made of an iron material. For reduction in weight, an aluminum material is used for the guide drum 21. In case the guide drum is configured to house the torsion bar 23 in its inner space including a rotational axis area therein, weight reduction of the guide drum 21 can be done more efficiently by more lightening the aluminum material of the guide drum 21. In this case, the torsion bar 23 made of an iron material can compensate strength poverty of the guide drum 21.

As was described in detail earlier, in the seatbelt retractor 1 according to the present embodiment, if the gas generating member 61 of the pretensioner mechanism 17 is activated in case of vehicle collision, the piston 64 is moved upwards inside the piston housing portion 62B of the pipe cylinder 62 from a normal state and comes in contact with the pinion gear portion 71 of the pinion gear body 33, whereby the pinion gear body 33 is caused to rotate. As a result, as the teeth of the pinion gear portion 71 in the pinion gear body 33 push the push block 87. Therefore, this push block 87 shears the positioning projection 94 erected on the bottom surface of the base block body 66. The push block 87 which has sheared the positioning projection 94 is pushed by the block urging spring 87A and comes in contact with the tip end portion of the rotating lever 88, whereby the rotating lever 88 is pushed and rotated. Thus, the lower end portion of the rotating lever 88 is disengaged from the tip end portion of the gear-side arm 89. The gear-side arm 89 is thus rotated in an outer direction by the urging spring 90, and simultaneously, the mechanical arm 92 is rotated through the coupling shaft 91. As a result, the pawl 43 engages the ratchet gear portion 45 of the ratchet gear 26 in the take-up drum unit 6.

If the gas generating member 61 of the pretensioner mechanism 17 is activated in case of vehicle collision, the pawl 43 is directly rotated by the push block 87, the block urging spring 87A, the rotating lever 88, the gear-side arm 89, the coupling shaft 91 and the mechanical arm 92 substantially simultaneously with rotation of the pinion gear body 33 by the piston 64, so as to engage the ratchet gear 26 of the take-up drum unit 6. Thus, the pawl 43 engages the ratchet gear 26 of the take-up drum unit 6 substantially simultaneously with activation of the pretensioner mechanism 17. As a result, the take-up drum can be locked in so as to prevent rotation thereof in the direction for the webbing 3 to be pulled out swiftly and reliably, whereby the operation to pull out the webbing 3 by vehicle occupants and a drop in the belt load can be prevented.

Further, the pretensioner unit 7 is constituted by mounting the pretensioner mechanism 17 and the forced locking mechanism 53 on the base plate 65, and then mounting the cover plate 57. Then, this pretensioner unit 7 is mounted to the housing unit 5 by screws 15 and the stopper screw 16. As a result, the mounting operation of the pretensioner mechanism 17 and the forced locking mechanism 53 to the housing unit 5 can be efficiently carried out.

Further, the pretensioner operation can be realized with simple and reliable structure.

Specifically, as soon as the pinion gear body 33 starts rotating, the clutch pawls 29 protrude outwardly and get engaged with the clutch gear 30 of the guide drum 21. The engagement of the clutch pawls 29 and the clutch gear 30 makes driving force of the pinion gear body 33 work on the guide drum 21 directly so as to start taking up the webbing 3. Here is realized a simple and direct mannered driving force transmission mechanism which is absolutely different from the mechanism described in the background art. Therefore, without the problems of the background art such as time lag to receive driving force transmission and inconstant timing to receive driving force transmission, the operation to take up the webbing 3 at the time of vehicle collision can be carried out at prompt and reliable timing without timing inconstancy.

Further, the pawl base 76 and the pawl guide 77 get engaged with each other owing to the engagement of the locking block 76C and the locking hook 77D. The engaged state of this case is such a state that the pawl base 76 engaged with the pawl guide 77 is allowed to relatively rotate at an initial rotation of the pinion gear body 33. Thereby, at the initial stage of rotation, the pawl base 76 rotates whereas the pawl guide 77 is kept in an unable-to-rotate state. As a result, the clutch pawls 29 can protrude.

Further, the positioning projections 77A provided on the pawl guide 77 get engaged with the positioning holes 81 formed at the base plate 65. In a normal condition and an initial stage of a pretensioner operation, the pawl guide 77 keeps resting state. Thereby, the pawl base 76 rotates relatively to the pawl guide 77, which allows the clutch pawls 29 to protrude. After protruding, the clutch pawls 29 depress the guiding portions 77C, whereby the pawl guide 77 is depressed. The depressing force of the clutch pawls 29 crushes the positioning projections 77A. After the positioning projections 77A get crushed, the pawl guide 77 and the pawl base 76 can rotate integrally.

Further, on the pawl base 76, there are provided the pawl supporting blocks 76 arrangement manner of which looks like the pawl supporting block 76 surrounds the through holes 76A as seen from the outer diameter side of the pawl base 76. When the clutch pawls 29 depress to drive the guide drum 21, the pawl supporting blocks 76 can endure loads the clutch pawls 29 receive.

Further, upon rotation of the pinion gear body 33, the clutch pawls 29 get engaged with the clutch gear 30 so that rotation force of the pinion gear body 33 is transmitted to the guide drum 21. In this case, at least one part of the transmission mechanism to transmit the rotation force of the pinion gear body 33 to the guide drum 21, namely, at least one of the pawl base 76, the pawl guide 77 and the clutch pawls 29 to be engaged with the both is housed in the drum concave portion 21B formed at one end portion of the guide drum 21. Therefore, in the axis-of-rotation direction for the guide drum 21, at least the pawl base 76, the pawl guide 77 and the clutch pawls 29 are placed in a buried-in condition towards the axis-of-rotation direction for the guide drum 21. Thereby, mounting volume the pretensioner mechanism occupies can be reduced with respect to the axis-of-rotation direction for the guide drum 21.

Further, the drum concave portion 21B includes: the mounting boss 31 which is a convex shaped and provided at the central portion of the guide drum 21 co-axially to the axis of rotation thereof; and the bearing 32 which rotates around the outer side surface of the mounting boss 31 on its inner side surface thereof and also rotates relatively to the pinion gear body 33 on its outer side surface. Thereby, the guide drum 21 and the pinion gear body 33 can be coupled co-axially with the intervention of the mounting boss 31 of the guide drum 21 and the bearing 32. Thereby, mechanical members can directly be coupled together with simple mechanical structure and an axial-dislocation free structure can be realized with ease and reliability.

Further, the mounting boss 31 includes an opening co-axially with the axis of rotation for the guide drum 21, and the drum shaft 22 which is engaged with the opening and coupled with the take-up spring unit 8 for urging the webbing 3 in the webbing-take-up direction. Thereby, the guide drum 21 and the take-up spring unit 8 are coupled co-axially by the drum shaft 22. Further, the drum shaft 22 is preferably made of a metallic material of which rigidity is more excellent than a material for the guide drum 21 so as to secure rigidity of the drum shaft 22 as coupling shaft.

In the vehicle-body-sensitive locking mechanism, the lower end portion of the wider region of the guiding block 202G comes in contact with the lever bottom portion 205B of the vehicle sensor 205. If the width of this wider region is set so that the tip end portion of the vehicle sensor lever 205A is kept below the moving path of the lower end portion of the pilot arm 203, the vehicle sensor lever 205A and the tip end portion of the pilot arm 203 will not come in contact even when the clutch 202 is rotated in a clockwise direction to be returned in its initial position. Further, in normal operation, the lever bottom portion 205B will not come in contact with the guiding block 202G, and movement of the vehicle sensor 205 caused by the acceleration of the vehicle will not be restricted by the guiding block 202G.

The present invention is not limited to the above-described embodiment, but various improvements and alterations can be made thereto without departing from the spirit of the present invention.

For instance, it is not necessary to make the bearing 23 from a resin material. As long as a material of which surface friction property is small is used or surface treatment for small friction is applied so that the bearing 23 can be placed rotatably between the guide drum 21 and the pinion gear body 33, the bearing 23 can be made anyhow.

Although it is described that the pawl base 76 and the clutch pawls 29 are made of metallic members and the pawl guide 77 is made of a resin member, the present invention is not restricted thereto. The pawl base 76 and the clutch pawls 29 may be made of a material which reliably enables them to deform the guiding portions 77C when the clutch pawls 29 protrude and to crush the positioning projections 77A after the clutch pawls 29 protrude. Further, as long as hardness of the clutch pawls 29 and that of the pawl supporting blocks 76B are sufficiently secured, any material satisfying the hardness can be used for them.

Further, as long as driving force can be transmitted and the webbing 3 can reliably be taken up, the number of the clutch pawls 29 can arbitrarily be determined.

Further, in the present embodiment, the clutch pawls 29 are described to be press-fitted in the pawl guide 77. The present invention, however, is not limited to this manner. The clutch pawls 29 can be press-fitted in the pawl base 76. Further, regarding relative rotation of the pawl base 76 and the pawl guide 77, it can be properly determined which one of them to fix for the other's relative rotation. Since the cross-bars projections 77B in which the clutch pawls 29 are press-fitted get crushed at the time of rotation, both the pawl supporting block 76B and the guiding portion 77C which depress the clutch pawls 29 to protrude outwardly from the crushed bars projections 77B may be arranged on either the pawl base 76 or the pawl guide 77. Any arrangement manner is applicable as long as the pawl supporting block 76B and the guiding portion 77C are configured to cooperatively catch and depress the clutch pawls 29.

The invention claimed is:

1. A seatbelt retractor comprising a take-up drum that takes up and stores a webbing, a torsion bar which is fixed to the take-up drum at one end thereof and twisted and deformed in response to a load in a webbing-pull-out direction in a case of vehicle collision, a slit which is formed in parallel to a rotational axis of the take-up drum and allows one end of the webbing to pass through, and a slip-off prevention member which is provided at the one end of the webbing and prevents the webbing from going out from the slit, wherein the take-up drum comprises:
a shaft hole which is a hollow extending from an opening provided at one-end side of the take-up drum to an other-end side thereof co-axially to the rotational axis and is closed at the other-end side thereof, the shaft hole housing the torsion bar;
a spline groove which is formed on an inner peripheral surface of the shaft hole at the other-end side of the take-up drum and houses a spline formed at the one-end side of the torsion bar; and
a flange portion which extends radially and outwardly from an outer peripheral portion at the one-end side of the take-up drum so as to be positioned axially outside with respect to a bottom face portion of the shaft hole at the other-end side of the take-up drum, and abuts on an end face in width direction of the webbing taken-up by the take-up drum, wherein the slit is formed in a direction of a tangent line of an outer diameter of the take-up drum so that a radially inner side face thereof with respect to the rotational axis of the take-up drum abuts on a projecting portion projecting radially and outwardly from the spline, and to reach the flange portion at the one-end side of the take-up drum in a direction of the rotational axis, and wherein the slip-off prevention member is formed to have substantially same length as width of the webbing, to be placed at a holding portion of the take-up drum which has a concave shape formed so as to be recessed inwardly in a radial direction of the take-up drum along one outer peripheral portion of the radially inner side face of the slit, and to be arranged so that a flange-side end portion of the slip-off prevention member faces the spline with the holding portion positioned therebetween.

2. The seatbelt retractor according to claim 1, wherein the take-up drum is made of an aluminum material and the torsion bar is made of an iron material.

\* \* \* \* \*